United States Patent
Umetsu et al.

(10) Patent No.: US 11,942,621 B2
(45) Date of Patent: Mar. 26, 2024

(54) POSITIVE ELECTRODE COATING LIQUID, POSITIVE ELECTRODE PRECURSOR, AND NONAQUEOUS LITHIUM ELECTRIC STORAGE ELEMENT

(71) Applicant: Asahi Kasei Kabushiki Kaisha, Tokyo (JP)

(72) Inventors: Kazuteru Umetsu, Tokyo (JP); Keita Kusuzaka, Tokyo (JP); Yuichiro Hirakawa, Tokyo (JP); Nobuhiro Okada, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 228 days.

(21) Appl. No.: 16/644,295

(22) PCT Filed: Nov. 13, 2018

(86) PCT No.: PCT/JP2018/042002
§ 371 (c)(1),
(2) Date: Mar. 4, 2020

(87) PCT Pub. No.: WO2019/098197
PCT Pub. Date: May 23, 2019

(65) Prior Publication Data
US 2020/0194775 A1 Jun. 18, 2020

(30) Foreign Application Priority Data

Nov. 14, 2017 (JP) .................................. 2017-219289
Nov. 14, 2017 (JP) .................................. 2017-219302

(51) Int. Cl.
| | | |
|---|---|---|
| *H01M 4/131* | (2010.01) | |
| *H01M 4/02* | (2006.01) | |
| *H01M 4/133* | (2010.01) | |
| *H01M 4/1391* | (2010.01) | |
| *H01M 4/505* | (2010.01) | |
| *H01M 4/66* | (2006.01) | |

(52) U.S. Cl.
CPC ........... *H01M 4/131* (2013.01); *H01M 4/133* (2013.01); *H01M 4/1391* (2013.01); *H01M 4/505* (2013.01); *H01M 4/66* (2013.01); *H01M 2004/028* (2013.01)

(58) Field of Classification Search
CPC .... H01M 4/131; H01M 4/133; H01M 4/1391; H01M 4/505; H01M 4/66; H01M 2004/028
See application file for complete search history.

(56) References Cited

U.S. PATENT DOCUMENTS

| | | |
|---|---|---|
| 2010/0040949 A1 | 2/2010 | Nanno et al. |
| 2012/0099246 A1* | 4/2012 | Cho ....................... H01G 11/32 361/505 |
| 2016/0300666 A1* | 10/2016 | Kamijo ................. H01G 11/26 |
| 2016/0372784 A1* | 12/2016 | Hayner ................. H01M 4/131 |
| 2018/0261399 A1 | 9/2018 | Umetsu et al. |
| 2019/0006677 A1 | 1/2019 | Matsuo et al. |
| 2019/0020034 A1 | 1/2019 | Umetsu et al. |
| 2019/0027754 A1 | 1/2019 | Kamijo et al. |

FOREIGN PATENT DOCUMENTS

| | | | |
|---|---|---|---|
| JP | 2007-103119 A | 4/2007 | |
| JP | 2012-089825 A | 5/2012 | |
| JP | 2014-127316 A | 7/2014 | |
| JP | 2016-038962 A | 3/2016 | |
| TW | 201737541 A | 10/2017 | |
| WO | 2009/078125 A1 | 6/2009 | |
| WO | 2017/126682 A1 | 7/2017 | |
| WO | 2017/126687 A1 | 7/2017 | |
| WO | WO-2017126682 A1 * | 7/2017 | ............. H01G 11/46 |
| WO | 2017/163806 A1 | 9/2017 | |

OTHER PUBLICATIONS

Supplementary European Search Report issued in corresponding European Patent Application No. 18879270.9 dated Jan. 14, 2021.
Barrett et al., "The Determination of Pore vol. and Area Distributions in Porous Substances. I. Computations from Nitrogen Isotherms," Journal of The American Chemical Society, 73: 373-380 (1951).
Mikhail et al., "Investigations of a Complete Pore Structure Analysis," Journal of Colloid and Interface Science, 26: 45-53 (1968).
Lippens et al., "Studies on Pore Systems in Catalysts. V. The t Method," Journal of Catalysis, 4: 319-323 (1965).
International Search Report issued in corresponding International Patent Application No. PCT/JP2018/042002 dated Jan. 29, 2019.
International Preliminary Report on Patentability and Written Opinion issued in corresponding International Patent Application No. PCT/JP2018/042002 dated May 19, 2020.

* cited by examiner

*Primary Examiner* — Matthew T Martin
*Assistant Examiner* — Bartholomew A Hornsby
(74) *Attorney, Agent, or Firm* — Morgan, Lewis & Bockius LLP

(57) ABSTRACT

Provided is a positive electrode precursor having a positive electrode active material layer, wherein the mass proportion $A_1$ of a carbon material in the positive electrode active material layer accounts for 15-65 mass %, the mass proportion $A_2$ of a lithium transition metal oxide in the positive electrode active material layer accounts for 5-35 mass %, the mass proportion $A_3$ of an alkali metal compound in the positive electrode active material layer accounts for 10-50 mass %, $A_2/A_1$ is 0.10-2.00, $A_1/A_3$ is 0.50-3.00, and the positive electrode active material layer has a peel strength of 0.02-3.00 N/cm.

11 Claims, No Drawings

POSITIVE ELECTRODE COATING LIQUID, POSITIVE ELECTRODE PRECURSOR, AND NONAQUEOUS LITHIUM ELECTRIC STORAGE ELEMENT

FIELD

The present invention relates to a positive electrode coating liquid as well as a positive electrode precursor using same, and a nonaqueous lithium electric storage element, etc.

BACKGROUND

In recent years, with an aim toward effective utilization of energy for greater environmental conservation and reduced usage of resources, a great deal of attention is being directed to power smoothing systems for wind power generation or overnight charging electric power storage systems, household dispersive electric storage systems based on solar power generation technology, and electric storage systems for electric vehicles, etc.

The number one requirement for batteries used in such electric storage systems is high energy density. The development of lithium ion batteries is advancing at a rapid pace, as an effective strategy for cells with high energy density that can meet this requirement.

The second requirement is a high output characteristic. A high power discharge characteristic is required for an electric storage system during acceleration in, for example, a combination of a high efficiency engine and an electric storage system (such as in a hybrid electric vehicle), or a combination of a fuel cell and an electric storage system (such as in a fuel cell electric vehicle).

Electrical double layer capacitors and nickel metal hydride batteries, etc., are currently under development as high output electric storage devices.

Electrical double layer capacitors that employ activated carbon in the electrodes have output characteristics of about 0.5 to 1 kW/L. Such electrical double layer capacitors have not only a high output but also high durability (cycle characteristics and elevated temperature storage characteristics) and have been considered optimal devices in fields where the high output mentioned above is required. However, their energy densities are no greater than about 1 to 5 Wh/L. A need therefore exists for even higher energy density.

On the other hand, nickel metal hydride batteries employed in existing hybrid electric vehicles exhibit high output equivalent to electrical double layer capacitors, and have energy densities of about 160 Wh/L. Still, research is being actively pursued toward further increasing their energy density and output and increasing their durability.

Research is also advancing toward increased outputs for lithium ion batteries as well. For example, lithium ion batteries are being developed that yield high output exceeding 3 kW/L at 50% depth of discharge (a value representing the state of the percentage of discharge of the service capacity of an electric storage element). However, the energy density is 100 Wh/L or lower, and the design is such that the high energy density, which is the major feature of a lithium ion battery, is reduced. Moreover, the durability (especially cycle characteristic and high-temperature storage characteristic) is inferior to that of an electrical double layer capacitor. In order to provide practical durability, therefore, such lithium batteries are used with a depth of discharge in a narrower range than 0 to 100%. Because the usable capacity is even lower, research is actively being pursued toward further increasing the durability of lithium ion batteries.

There is a strong demand for implementation of electric storage elements exhibiting high energy density, high output characteristics and durability, as mentioned above. Nevertheless, the existing electric storage elements mentioned above have their advantages and disadvantages. New electric storage elements are therefore desired that can meet these technical requirements. Promising candidates are electric storage elements known as lithium ion capacitors, which are being actively developed in recent years.

A lithium ion capacitor is a type of electric storage element using a nonaqueous electrolyte solution comprising a lithium salt (or, "nonaqueous lithium electric storage element"), wherein charge-discharge is accomplished by: non-Faraday reaction by adsorption/desorption of anions similar to an electrical double layer capacitor at about 3 V or higher, at the positive electrode; and Faraday reaction by intercalation/release of lithium ions similar to a lithium ion battery, at the negative electrode.

To summarize these electrode materials and their characteristics: when charge-discharge is carried out by using a material such as activated carbon, etc., as an electrode and by adsorption and desorption of ions on the activated carbon surface (non-Faraday reaction), it is possible to obtain high output and high durability, but with lower energy density (for example, 1×). When charge/discharge is carried out by Faraday reaction by using an oxide or carbon material as the electrode, the energy density is higher (for example, 10 times that of non-Faraday reaction using activated carbon), but then durability and output characteristic become issues.

Electrical double layer capacitors that combine these electrode materials employ activated carbon as the positive electrode and negative electrode (energy density: 1×), and carry out charge/discharge by non-Faraday reaction at both the positive and negative electrodes, and are characterized by having high output and high durability, but also low energy density (positive electrode: 1×× negative electrode: 1×=1).

Lithium ion secondary batteries use lithium transition metal oxide for the positive electrode (energy density: 10×) and a carbon material (energy density: 10×) for the negative electrode, carrying out charge-discharge by Faraday reaction at both the positive and negative electrodes, and have high energy density (positive electrode: 10×× negative electrode: 10×=100), but have issues in terms of output characteristic and durability. The depth of discharge must be restricted in order to satisfy the high durability required for hybrid electric vehicles, and with lithium ion secondary batteries only 10 to 50% of the energy can be utilized.

A lithium ion capacitor is a new type of asymmetric capacitor that employs activated carbon (energy density: 1×) for the positive electrode and a carbon material (energy density: 10×) for the negative electrode, and it is characterized by carrying out charge/discharge by non-Faraday reaction at the positive electrode and Faraday reaction at the negative electrode, and thus having the characteristics of both an electrical double layer capacitor and a lithium ion secondary battery. A lithium ion capacitor exhibits high output and high durability, while also having high energy density (positive electrode: 1×× negative electrode: 10×=10) and requiring no restrictions on depth of discharge as with a lithium ion secondary battery.

Various investigations have been carried out in order to further increase an energy density of the aforementioned lithium ion capacitors (PTLs 1 to 3).

PTL1 discloses a lithium ion capacitor having a long service life and large capacity by using active materials containing activated carbon and lithium iron phosphate (LiFePO$_4$) for a positive electrode.

PTL 2 discloses a positive electrode precursor for high-capacity nonaqueous hybrid capacitors, wherein the positive electrode precursor promotes decomposition of an alkali metal compound contained in a positive electrode precursor to enable pre-doping to a negative electrode in a short time.

PTL 3 discloses a method for manufacturing a high-output lithium ion battery by using an aluminum current collector.

PTL 4 discloses a stable positive electrode composition for lithium secondary batteries, wherein a positive electrode active material consists of lithium transition metal composite oxide and a ratio of viscosity change defined as a ratio of a viscosity with an elapse of 30 minutes after homogenization treatment to a viscosity with an elapse of 2 hours is small.

PTL 5 discloses a coating liquid excellent in storage stability and capable of high-density filling of active materials, wherein the coating liquid contains an active material with a large particle size and an active material with a small particle size at a specific compounding ratio and a specific mean particle size ratio.

However, no literature has considered maximization of capacity by promoting decomposition of an alkali metal compound during a pre-doping step in a positive electrode active material layer containing a carbon material and lithium transition metal oxide, or missing of the positive electrode active material due to gas generation produced in the pre-doping, which results in micro short-circuit.

Incidentally, throughout the present description, a mesopore volume is determined by a BJH method and a micropore volume is determined by a MP method, respectively. The BJH method has been advocated in NPL 1. The MP method refers to a method of obtaining the micropore volume, a micropore area, and a distribution of micropores by using the "t-plot method" (NPL 2). These methods concerned are described in NPL 3.

CITATION LIST

Patent Literature

[PTL 1] Japanese Unexamined Patent Publication No. 2012-89825
[PTL 2] WO2017/126687
[PTL 3] Japanese Unexamined Patent Publication No. 2016-38962
[PTL 3] Japanese Unexamined Patent Publication No. 1998 (H10)-64518
[PTL 4] WO2009/078125

Non Patent Literature

[NPL 1] E. P. Barrett, L. G. Joyner and P. Halenda, J. Am. Chem. Soc., 1951, 73, p 373
[NPL 2] B. C. Lippens, J. H. de Boer, J. Catalysis, 1965, p 4319
[NPL 3] R. S. Mikhail, S. Brunauer, E. E. Bodor, J. Colloid Interface Sci., 1968, 26, p 45

SUMMARY

Technical Problem

In light of the above situation, the first object to be solved by the invention is to provide a positive electrode precursor comprising a carbon material and lithium transition metal oxide, which has a high capacity and a low resistance and excellent high-load charge/discharge cycle characteristics, and is capable of pre-doping to a negative electrode in a short time by promoting decomposition of an alkali metal compound and suppressing missing of a positive electrode active material upon pre-doping. Moreover, the second object of the present invention is to provide a positive electrode coating liquid, which has a high capacity and a low resistance, inhibits a change in thixotropic properties of the positive electrode coating liquid, and is capable of pre-doping to a negative electrode in a short time by promoting decomposition of an alkali metal compound, and suppressing missing of the positive electrode active material upon pre-doping. The third problem to be solved by the present invention is to provide a nonaqueous lithium electric storage element having a low micro short-circuit rate, a high capacity and a low resistance, and having a small increase in resistance upon a high-load charge/discharge cycle. The present invention has been completed based on such knowledge.

The problems described above will be solved by the following technological means. Namely, the present invention is as follows:

[1]

A positive electrode precursor having a current collector and a positive electrode active material layer disposed on the current collector, wherein the positive electrode active material layer comprises all of a carbon material, lithium transition metal oxide, and an alkali metal compound, a weight proportion $A_1$ of the carbon material in the positive electrode active material layer accounts for 15% by weight or greater and 65% by weight or less, a weight proportion $A_2$ of the lithium transition metal oxide in the positive electrode active material layer accounts for 5% by weight or greater and 35% by weight or less, a weight proportion $A_3$ of the alkali metal compound in the positive electrode active material layer accounts for 10% by weight or greater and 50% by weight or less, $A_2/A_1$ is 0.10 or greater and 2.00 or less, $A_1/A_3$ is 0.50 or greater and 3.00 or less, and the positive electrode active material layer has a peel strength of 0.02 N/cm or greater and 3.00 N/cm or less.

[2]

The positive electrode precursor according to [1], wherein the expression $0.20 \leq B_1 \leq 10.00$ is satisfied, where a specific surface area per unit area measured by a BET method per one side of the positive electrode precursor is $B_1$ (m$^2$/cm$^2$).

[3]

The positive electrode precursor according to [1] or [2], wherein in oxygen mapping obtained by scanning electron microscope-energy dispersive X-ray spectroscopy (SEM-EDX) on a surface of the positive electrode precursor, the expressions $25.0 \leq C_1 \leq 76.0$ and $0.80 \leq C_1/A_3 \leq 2.40$ are satisfied, where an area of oxygen mapping binarized based on an average value of luminance values is $C_1$%.

[4]

The positive electrode precursor according to any one of [1] to [3], wherein in oxygen mapping obtained by scanning electron microscope-energy dispersive X-ray spectroscopy (SEM-EDX) on a cross section of the positive electrode precursor processed by a broad ion beam (BIB), the expressions $25.0 \leq C_2 \leq 76.0$ and $0.80 \leq C_2/A_3 \leq 2.40$ are satisfied, where an area of oxygen mapping binarized based on an average value of luminance values is $C_2$%.

[5]

The positive electrode precursor according to any one of [1] to [4], wherein the expressions $0.10 \leq D_1 \leq 5.00$ and $0.20 \leq E_1 \leq 10.00$ are satisfied, where a mesopore volume per unit area due to pores with a diameter of 20 Å or greater and 500 Å or less calculated by a BJH method per one side of the positive electrode precursor is $D_1$ (μL/cm$^2$), and a micropore volume per unit area due to pores with a diameter of less than 20 Å calculated by a MP method is $E_1$ (μL/cm$^2$).

[6]

The positive electrode precursor according to any one of [1] to [5], wherein the lithium transition metal oxide is at least one compound selected from the group consisting of layered-based lithium transition metal oxide, spinel-based lithium transition metal oxide, and olivine-based lithium transition metal oxide.

[7]

The positive electrode precursor according to any one of [1] to [6], wherein the lithium transition metal oxide is at least one selected from the group consisting of $Li_xNi_aCo_bAl_{(1-a-b)}O_2$, wherein, in the formula, a and b satisfy the expressions $0.2<a<0.97$ and $0.2<b<0.97$, $Li_xNi_cCo_dMn_{(1-c-d)}O_2$, wherein, in the formula, c and d satisfy the expressions $0.2<c<0.97$ and $0.2<d<0.97$, $Li_xCoO_2$, $Li_xMn_2O_4$, or $Li_xFePO_4$, wherein, in the formulae, x satisfies the expression $0 \leq x \leq 1$, $Li_xMnPO_4$, wherein, in the formula, x satisfies the expression $0 \leq x \leq 1$, and $Li_zV_2(PO_4)_3$, wherein, in the formula, z satisfies the expression $0 \leq z \leq 3$.

[8]

A positive electrode coating liquid comprising all solid contents containing a carbon material, lithium transition metal oxide, and an alkali metal compound in a dispersion solvent, wherein a weight proportion $X_1$ of the carbon material accounts for 15% by weight or greater and 65% by weight or less, a weight proportion $X_2$ of the lithium transition metal oxide accounts for 5% by weight or greater and 35% by weight or less, a weight proportion $X_3$ of the alkali metal compound accounts for 10% by weight or greater and 50% by weight or less, with respect to a total solid content in the positive electrode coating liquid, $X_2/X_1$ is 0.10 or greater and 2.00 or less, $X_1/X_3$ is 0.50 or greater and 3.00 or less, and $TI_2/TI_1$ is 0.50 or greater and 1.20 or less, where a thixotropy index value of the positive electrode coating liquid is $TI_1$ and a thixotropy index value after the electrode coating liquid has been allowed to stand for 24 hours following measurement of $TI_1$ is $TI_2$.

[9]

The positive electrode coating liquid according to [8], wherein $\eta b_2/\eta b_1$ is 0.40 or greater and 1.30 or less, where a viscosity of the positive electrode coating liquid is $\eta b_1$ and a viscosity after the positive electrode coating liquid has been allowed to stand for 24 hours following measurement of $\eta b_1$ is $\eta b_2$.

[10]

A nonaqueous lithium electric storage element comprising a positive electrode having a current collector and a positive electrode active material layer disposed on the current collector, a negative electrode, a separator, a non-aqueous electrolytic solution containing lithium ions, wherein the positive electrode active material layer comprises all of a carbon material, lithium transition metal oxide, and an alkali metal compound, a weight proportion $Y_1$ of the carbon material in the positive electrode active material layer accounts for 37.5% by weight or greater and 87.5% by weight or less, a weight proportion $Y_2$ of the lithium transition metal oxide in the positive electrode active material layer accounts for 9.0% by weight or greater and 58.5% by weight or less, a weight proportion $Y_3$ of the alkali metal compound in the positive electrode active material layer accounts for 0.6% by weight or greater and 6.3% by weight or less, $Y_2/Y_1$ is 0.10 or greater and 1.90 or less, $Y_1/Y_3$ is 9.0 or greater and 100.0 or less, and the positive electrode active material layer has a peel strength of 0.02 N/cm or greater and 2.40 N/cm or less.

[11]

The nonaqueous lithium electric storage element according to [10], wherein the expression $0.20 \leq B_2 \leq 10.00$ is satisfied, where a specific surface area per unit area measured by a BET method per one side of the positive electrode is $B_2$ (m$^2$/cm$^2$).

[12]

The nonaqueous lithium electric storage element according to [10] or [11], wherein the expressions $0.10 \leq D_2 \leq 5.00$ and $0.20 \leq E_2 \leq 10.00$ are satisfied, where a mesopore volume per unit area due to pores with a diameter of 20 Å or more and 500 Å or less calculated by a BJH method per one side of the positive electrode is $D_2$ (μL/cm$^2$), and a micropore volume per unit area due to pores with a diameter of less than 20 Å calculated by a MP method is $E_2$ (μL/cm$^2$).

[13]

At least one electric storage module selected from the group consisting of a power regeneration assist system, a power load leveling system, an uninterruptable power source system, a non-contact power supply system, an energy harvesting system, an electric storage system, solar power generation and storage system, electric power steering system, emergency power supply system, in-wheel motor system, idling stop systems, electric vehicles, plug-in hybrid vehicles, hybrid vehicles, electric motorcycles, rapid charging system, and smart grid system, comprising the nonaqueous lithium electric storage element according to any one of [10] to [12].

[14]

An electric storage system in which the nonaqueous lithium electric storage element according to any one of [10] to [12] is connected in series or in parallel with a lead-acid battery, a nickel metal hydride battery, a lithium ion secondary battery or a fuel cell.

Advantageous of Effects of Invention

According to the invention, a positive electrode precursor comprising a carbon material and lithium transition metal oxide has a high capacity, a low resistance, and excellent high-load charge/discharge cycle characteristics, and is capable of pre-doping in a short time to a negative electrode by promoting decomposition of an alkali metal compound, and suppressing missing of a positive electrode active material upon pre-doping. Moreover, a positive electrode coating liquid having a high capacity and a low resistance, and being capable of pre-doping to a negative electrode in a short time by promoting decomposition of an alkali metal compound and suppressing missing of the positive electrode active material upon pre-doping, is provided.

Further, a nonaqueous lithium electric storage element having a low micro short-circuit rate, a high capacity, a low resistance, and a small increase in resistance upon a high-load charge/discharge cycle, is provided.

DESCRIPTION OF EMBODIMENTS

Details of the embodiment of the invention (hereunder referred to as "the present embodiment") will be explained below and it is to be understood, however, that the invention is not limited to the embodiments below. The upper limits and lower limits of the range of various numerals can be arbitrarily combined with each other to constitute arbitrary numerical ranges. Incidentally, throughout the present description, "to" means that numerals before and after "to" are included as upper limit values and lower limit values unless otherwise specified in the present description.

The nonaqueous lithium electric storage element consists of, in general, a positive electrode, a negative electrode, a separator, and an electrolytic solution as main constituents. An organic solvent containing an alkali metal ion (hereinafter referred to as "nonaqueous electrolytic solution") is used as an electrolytic solution.

<Positive Electrode>

The positive electrode precursor or positive electrode according to the present embodiment has a positive electrode current collector and a positive electrode active material layer containing a positive electrode active material, disposed thereon (in more detail, disposed on one or both sides thereof). The positive electrode active material layer according to the present embodiment is characteristic of containing a carbon material, lithium transition metal oxide, and an alkali metal compound. As mentioned below, in the present embodiment, when assembling the electric storage element, preferably the negative electrode is pre-doped with an alkali metal ion. The pre-doping method is preferably application of a voltage between the positive electrode precursor and negative electrode, after the electric storage element has been assembled by using the positive electrode precursor containing an alkali metal compound, the negative electrode, the separator, the casing, and the nonaqueous electrolytic solution. The alkali metal compound may be contained in any form in the positive electrode precursor. For example, it may exist between the positive electrode current collector and the positive electrode active material layer or exist on a surface of the positive electrode active material layer. The alkali metal compound is preferably contained in the positive electrode active material layer formed on the positive electrode current collector of the positive electrode precursor.

Throughout the present description, "positive electrode precursor" is defined as the state of the positive electrode before the alkali metal doping step, and "positive electrode" is defined as the state of the positive electrode after the alkali metal doping step.

In the present description, a coating liquid for producing the positive electrode precursor or the positive electrode refers to "positive electrode coating liquid". The positive electrode coating liquid may include not only the form of publicly known coating liquids but also the form of publicly known suspensions, dispersions, emulsions, compositions or mixtures. The positive electrode coating liquid according to the present embodiment may be simply referred to as a slurry, a coating liquid, etc.

[Positive Electrode Coating Liquid]

The positive electrode coating liquid in the present embodiment comprises solid contents containing all of a carbon material, lithium transition metal oxide, and an alkali metal compound in a dispersion solvent. The liquid may contain, in addition to them, optional components such as a conductive material, binder, dispersant, dispersion stabilizer, a pH adjuster, etc., if necessary.

[Positive Electrode Active Material Layer]

The positive electrode active material layer preferably comprises a positive electrode active material containing a carbon material and lithium transition metal oxide. The positive electrode active material layer may contain, in addition to them, optional components such as a conductive filler, binder, dispersant, dispersion stabilizer, a pH adjuster, etc., if necessary.

Moreover, the alkali metal compound is preferably contained in the positive electrode active material layer of the positive electrode precursor or on the surface of the positive electrode active material layer.

[Positive Electrode Active Material]

The positive electrode active material preferably contains a carbon material and lithium transition metal oxide. Carbon nanotubes, conductive polymers, or porous carbon materials are preferably used as the carbon material, and activated carbon is more preferably used. One or more carbon materials may be mixed and used.

Publicly known materials used for lithium ion batteries may be used as lithium transition metal oxide. One or more lithium transition metal oxides may be mixed and used for the positive electrode active material.

When activated carbon is used as the positive electrode active material, there are no particular restrictions on the type of activated carbon or its starting material. However, preferably the fine pores of the activated carbon are optimally controlled to obtain both high input/output characteristics and high energy density. Specifically, when $V_1$ (cc/g) is a mesopore volume due to fine pores with diameters of 20 Å or larger and 500 Å or smaller as calculated by the BJH method, and $V_2$ (cc/g) is a micropore volume due to fine pores with diameters of smaller than 20 Å as calculated by the MP method, then:

(1) in order to obtain high input/output characteristics, activated carbon satisfying $0.3<V_1\leq0.8$ and $0.5\leq V_2\leq1.0$ and exhibiting a specific surface of 1,500 m$^2$/g or greater and 3,000 m$^2$/g or less as measured by the BET method (hereunder also referred to as "activated carbon 1") is preferred, and (2) in order to obtain a high energy density, activated carbon satisfying $0.8<V_1\leq2.5$ and $0.8<V_2\leq3.0$ and exhibiting a specific surface area of 2,300 m$^2$/g or greater and 4,000 m$^2$/g or less as measured by the BET method (hereunder also referred to as "activated carbon 2"), is preferred.

The BET specific surface area and mesopore volume, micropore volume, and mean fine pore diameter for the present embodiment are each a value determined by the following respective methods. A sample is vacuum-dried at 200° C. for a day and a night, and the adsorption/desorption isotherm is measured by using nitrogen as the adsorbate. By using the obtained isotherm on the adsorption side, the BET specific surface area is calculated by the multipoint BET method or single point BET method, the mesopore volume is calculated by the BJH method, and the micropore volume is calculated by the MP method, respectively.

The BJH method is a method of calculation commonly used for analysis of mesopores, and it was advocated by Barrett, Joyner, Halenda et al. (NPL 1).

Moreover, the MP method is a method in which the "t-plot method" (NPL 2) is utilized to determine micropore volume, micropore area and micropore distribution, and it is the method advocated by R. S. Mikhail, Brunauer and Bodor (NPL 3).

Further, the mean fine pore diameter is calculated by dividing the total pore volume per weight obtained by measurement of each equilibrium adsorption amount of nitrogen gas at each relative pressure at the temperature of liquid nitrogen, by the BET specific surface area.

Incidentally, in addition to the case where $V_1$ is the upper limit and $V_2$ is the lower limit, the combination of the upper limits and the lower limits is arbitrary.

Hereinafter, the (1) activated carbon 1 and the (2) activated carbon 2 will each be explained in order.

(Activated Carbon 1)

The mesopore volume $V_1$ of activated carbon 1 is preferably a value larger than 0.3 cc/g, from the viewpoint of greater input/output characteristics when the positive electrode material is incorporated into an electric storage element. The mesopore volume $V_1$ of activated carbon 1 is also preferably no greater than 0.8 cc/g from the viewpoint of minimizing reduction in the bulk density of the positive electrode. $V_1$ is more preferably 0.35 cc/g or greater and 0.7 cc/g or less and even more preferably 0.4 cc/g or greater and 0.6 cc/g or less.

The micropore volume $V_2$ of activated carbon 1 is preferably 0.5 cc/g or greater in order to increase the specific surface area of the activated carbon and increase capacitance. From the viewpoint of reducing the bulk of the activated carbon, increasing the density as an electrode and increasing the capacitance per unit volume, the micropore volume $V_2$ of the activated carbon 1 is preferably no greater than 1.0 cc/g. $V_2$ is more preferably 0.6 cc/g or greater and 1.0 cc/g or less and even more preferably 0.8 cc/g or greater and 1.0 cc/g or less.

The ratio ($V_1/V_2$) of the mesopore volume $V_1$ to the micropore volume $V_2$ of the activated carbon 1 is preferably in the range of $0.3 \leq V_1/V_2 \leq 0.9$. Namely, $V_1/V_2$ is preferably 0.3 or greater from the viewpoint of increasing the proportion of the mesopore volume to the micropore volume to a degree allowing reduction in the input/output characteristics to be minimized while maintaining high capacitance. On the other hand, from the viewpoint of increasing the proportion of the micropore volume with respect to the mesopore volume, to an extent allowing reduction in capacitance to be minimized while maintaining high output characteristic, $V_1/V_2$ is preferably no greater than 0.9, more preferably $0.4 \leq V_1/V_2 \leq 0.7$ and even more preferably $0.55 \leq V_1/V_2 \leq 0.7$.

From the viewpoint of maximizing the output of the obtained electric storage element, the mean fine pore diameter of activated carbon 1 is preferably 17 Å or greater, more preferably 18 Å or greater and even more preferably 20 Å or greater. From the viewpoint of maximizing the capacitance, the mean fine pore diameter of activated carbon 1 is preferably no greater than 25 Å.

The BET specific surface area of activated carbon 1 is preferably 1,500 m$^2$/g or larger and 3,000 m$^2$/g or lower, and more preferably 1,500 m$^2$/g or larger and 2,500 m$^2$/g or lower. When the BET specific surface area is 1,500 m$^2$/g or greater, satisfactory energy density is facilitated to be obtained, and when the BET specific surface area is 3,000 m$^2$/g or lower there will be no need to add large amounts of a binder to maintain the strength of the electrode, and therefore the performance per volume of the electrode will be higher.

The activated carbon 1 having such features can be obtained, for example by using the starting material and treatment method described below.

In the present embodiment, the carbon source to be used as the starting material for activated carbon 1 is not particularly restricted. Examples of the carbon source include plant-based starting materials such as wood, wood dust, coconut shell, by-products of pulp production, bagasse, molasses, etc.; fossil-based starting materials such as peat, lignite, brown coal, bituminous coal, anthracite, petroleum distillation residue components, petroleum pitch, coke, coal tar, etc.; various synthetic resins such as phenol resin, vinyl chloride resin, vinyl acetate resin, melamine resin, urea resin, resorcinol resin, celluloid, epoxy resin, polyurethane resin, polyester resin, polyamide resin, etc.; synthetic rubbers such as polybutylene, polybutadiene, polychloroprene, etc.; synthetic wood, synthetic pulp materials, etc., and carbides of the foregoing. From the viewpoint of suitability for mass-production and of cost, the starting materials preferred among them are plant-based starting materials such as coconut shell, wood dust, etc., and carbides thereof, with coconut shell carbides being particularly preferred.

The system used for carbonization and activation to obtain the activated carbon 1 from these starting materials may be known systems such as, for example, a fixed bed system, moving bed system, fluidized bed system, slurry system, rotary kiln system, etc.

The carbonization method for these starting materials is a method in which an inert gas such as nitrogen, carbon dioxide, helium, argon, xenon, neon, carbon monoxide, an exhaust gas, etc., or a mixed gas composed mainly of such inert gases with other gases, is used for calcinating at about 400 to 700° C. (preferably 450 to 600° C.), over a period of about 30 minutes to 10 hours.

The activation method for a carbide obtained by the carbonization method described above is preferably a gas activation method in which an activating gas such as water vapor, carbon dioxide or oxygen, etc., is used for calcination. A method by using water vapor or carbon dioxide as the activating gas is preferred among these.

In this activation method, the activating gas is supplied at a rate of preferably 0.5 to 3.0 kg/h (more preferably 0.7 to 2.0 kg/h) while the temperature of the carbide is raised to 800 to 1,000° C. for 3 to 12 hours (preferably 5 to 11 hours and more preferably 6 to 10 hours), for activation.

Further, the carbide may be subjected to a primary activation before activation treatment of the carbide describe above. In the primary activation, usually a method of calcinating the carbon material at a temperature of below 900° C. by using an activating gas such as water vapor, carbon dioxide or oxygen, etc., for gas activation, is preferably employed.

By appropriate combinations of the calcination temperature and calcination time for the carbonization method described above, and the activating gas supply volume, temperature-elevating rate and maximum activation temperature in the activation method, it is possible to produce activated carbon 1 that can be used in the present embodiment.

The mean particle diameter of the activated carbon 1 is preferably 2 to 20 μm. When the mean particle diameter is 2 μm or greater, the capacitance per electrode volume will tend to be higher due to the higher density of the active material layer. Incidentally, a small mean particle diameter may lead to the disadvantage of low durability, but a mean particle diameter of at least 2 μm will help avoid this disadvantage. A mean particle diameter of no larger than 20 μm, on the other hand, will tend to be more suitable for rapid charge/discharge. The mean particle diameter of activated 1 is more preferably 2 to 15 μm and even more preferably 3 to 10 μm.

(Activated Carbon 2)

The mesopore volume $V_1$ of activated carbon 2 is preferably a value larger than 0.8 cc/g, from the viewpoint of a greater output characteristic when the positive electrode material has been incorporated into an electric storage element. $V_1$ is preferably 2.5 cc/g or less from the viewpoint of inhibiting reduction of the capacity of the electric storage element. $V_1$ is more preferably 1.00 cc/g or larger and 2.0 cc/g or less and even more preferably 1.2 cc/g or larger and 1.8 cc/g or less.

The micropore volume $V_2$ of activated carbon 2 is preferably larger than 0.8 cc/g for a larger specific surface area of the activated carbon and to increase the capacitance. $V_2$ is preferably no greater than 3.0 cc/g to increase the density as an activated carbon electrode, and to increase the capacitance per unit volume. $V_2$ is more preferably larger than 1.0 cc/g and no larger than 2.5 cc/g, and even more preferably 1.5 cc/g or larger and 2.5 cc/g or less.

Activated carbon 2 having the mesopore volume and micropore volume described above has a higher BET specific surface area than activated carbon used in conventional electrical double layer capacitors or lithium ion capacitors. The specific value of the BET specific surface area of the activated carbon 2 is preferably 2,300 $m^2/g$ or greater and 4,000 $m^2/g$ or lower, more preferably 3,000 $m^2/g$ or greater and 4,000 $m^2/g$ or lower, and still more preferably 3,200 $m^2/g$ or greater and 3,800 $m^2/g$ or lower. When the BET specific surface area is 2,300 $m^2/g$ or greater it will be easier to obtain satisfactory energy density, and when the BET specific surface area is 4,000 $m^2/g$ or lower there will be no need to add an enormous amount of a binder to maintain the strength of the electrode, and therefore the performance per volume of the electrode will be higher.

Activated carbon 2 having such features can be obtained, for example, by using the starting material and treatment method described below.

The carbonaceous material used as the starting material for activated carbon 2 is not particularly restricted provided that it is a carbon source commonly used as a starting material for activated carbon, and examples of the carbonaceous material include plant-based starting materials such as wood, wood dust, coconut shell, etc.; petroleum-based starting materials such as petroleum pitch, coke, etc.; and various synthetic resins such as phenol resins, furan resins, vinyl chloride resins, vinyl acetate resins, melamine resins, urea resins, resorcinol resins, etc. Of these starting materials, phenol resins and furan resins are especially preferred, being suitable for fabrication of activated carbon with a high specific surface area.

The system used for carbonization of these starting materials, or the heating method during activation treatment, may be known systems such as, for example, a fixed bed system, moving bed system, fluidized bed system, slurry system, rotary kiln system, etc. The atmosphere during heating is an inert gas such as nitrogen, carbon dioxide, helium, or argon, or a mixed gas composed mainly of such inert gases in admixture with other gases. A carbonization temperature is, in general, about 400 to 700° C. and a calcination time is about 0.5 to 10 hours.

The activation method for the carbide may be a gas activation method in which calcination is accomplished by using an activating gas such as water vapor, carbon dioxide or oxygen, etc., or an alkali metal activation method in which heat treatment is carried out after mixture with an alkali metal compound, but an alkali metal activation method is preferred for fabrication of activated carbon with a high specific surface area.

In this activation method, a carbide and an alkali metal compound such as KOH or NaOH, etc., are mixed so that the weight ratio is 1≤1 (the amount of the alkali metal compound is equal to or greater than the amount of the carbide.), after which heat treatment is carried out in a range of 600 to 900° C. for 0.5 to 5 hours under an inert gas atmosphere, and then the alkali metal compound is subjected to cleaning removal with acid or water, and drying is further carried out.

In order to increase the micropore volume and not increase the mesopore volume, the amount of carbide may be increased during activation, and mixed with KOH. In order to increase both the micropore volume and mesopore volume, a larger amount of KOH may be used. In order to increase mainly the mesopore volume, steam-activation is preferably carried out after alkaline activation treatment.

The mean particle diameter of the activated carbon 2 is preferably 2 μm or larger and 20 μm or smaller and more preferably 3 μm or larger and 10 μm or smaller.

(Use of Activated Carbon)

The activated carbons 1 and 2 may each be a single type of activated carbon, or a mixture of two or more different types of activated carbons, such that the mixture as a whole exhibit the characteristic values described above.

Either of activated carbon 1 or 2 may be selected for use, or both may be used in admixture.

The positive electrode active material may include materials other than activated carbons 1 and 2 (for example, activated carbon without the specified $V_1$ and/or $V_2$ values explained above, or materials other than activated carbon (such as conductive polymers, etc.)). In the exemplary aspect, when the content of the activated carbon 1 in the positive electrode active material layer of the positive electrode precursor, the content of the activated carbon 2, or the total content of the activated carbons 1 and 2, namely the weight proportion of the carbon materials in the positive electrode active material layer refers to $A_1$, and in the case of containing a conductive filler, binder, and dispersion stabilizer, etc., in the positive electrode precursor, the total amount of these materials refers to $A_1$, and $A_1$ is preferably 15% by weight or more and 65% by weight or less and more preferably 20% by weight or more and 50% by weight or less. When $A_1$ is 15% by weight or more, since the contact area between the carbon material having high electric conductivity and the alkali metal compound increases, the oxidation reaction of the alkali metal compound is promoted in the pre-doping step, and the pre-doping can be carried out in a short time. When $A_1$ is 65% by weight or less, the bulk density of the positive electrode active material layer is increased, which leads to increase in the capacity.

When the weight proportion of the carbon material to the total solid content in the positive electrode coating liquid is $X_1$, $X_1$ is 15% by weight or more and 65% by weight or less and preferably 20% by weight or more and 50% by weight or less. Incidentally, the weight proportion of the carbon material is, namely, a weight proportion of the total of the carbon materials including activated carbon 1 and/or activated carbon 2, activated carbon other than activated carbons 1 and 2, etc.

When the content of activated carbon 1 in the positive electrode active material layer of the positive electrode, the content of activated carbon 2, or the total content of activated carbons 1 and 2, namely, the weight proportion of the carbon material in the positive electrode active material layer refers to $Y_1$, or when the positive electrode contains a conductive filler, binder, dispersion stabilizer, etc., the total amount of the carbon material and these materials refers to $Y_1$, and $Y_1$ is 37.5% by weight or more and 87.5% by weight or less. When $Y_1$ is 37.5% by weight or more, the area of adsorption and desorption of ions upon charge/discharge becomes large, so that the resistance can be reduced. When $Y_1$ is 87.5% by weight or less, the capacity can be increased.

(Lithium Transition Metal Oxide)

The lithium transition metal oxide contains transition metal oxide capable of intercalating and releasing lithium ions. The transition metal oxide used as a positive electrode active material is not particularly restricted, and includes, for example, oxides containing at least one element selected from the group consisting of cobalt (Co), nickel (Ni), manganese (Mn), iron (Fe), vanadium (V), titanium (Ti), and chromium (Cr). Examples of the transition metal oxide are not, of course, restricted thereto. The transition metal oxide includes, specifically, compounds represented by the formulae:

$Li_xCoO_2$ wherein, in the formula, x satisfies $0 \leq x \leq 1$, $Li_xNiO_2$ wherein, in the formula, x satisfies $0 \leq x \leq 1$, $Li_xNi_yM_{(1-y)}O_2$ wherein, in the formula, M is at least one element selected from the group consisting of Co, Mn, Al, Fe, Mg and Ti, x satisfies $0 \leq x \leq 2$, and y satisfies $0.2 < y < 0.97$, $Li_xNi_{1/3}Co_{1/3}Mn_{1/3}O_2$ wherein in the formula, x satisfies $0 \leq x \leq 1$, $Li_xMnO_2$ wherein, in the formula, x satisfies $0 \leq x \leq 1$, $\alpha$-$Li_xFeO_2$ wherein, in the formula, x1 satisfies $0 \leq x \leq 1$, $Li_xVO_2$ wherein, in the formula, x satisfies $0 \leq x \leq 1$, $Li_xCrO_2$ wherein, in the formula, x satisfies $0 \leq x \leq 1$, $Li_xFePO_4$ wherein, in the formula, x satisfies $0 \leq x \leq 1$, $Li_xMnPO_4$ wherein, in the formula, x satisfies $0 \leq x \leq 1$, $Li_zV_2(PO_4)_3$ wherein, in the formula, z satisfies $0 \leq z \leq 3$, $Li_xMn_2O_4$ wherein, in the formula, x satisfies $0 \leq x \leq 1$, $Li_xM_yMn_{(2-y)}O_4$ wherein, in the formula, M is at least one element selected from the group consisting of Co, Ni, $A_1$, Fe, Mg and Ti, x satisfies $0 \leq x \leq 2$, and y satisfies $0.2 < y < 0.97$, $Li_xNi_aCo_bAl_{(1-a-b)}O_2$ wherein, in the formula, x satisfies $0 \leq x \leq 1$, a satisfies $0.2 < a < 0.97$ and b satisfies $0.2 < b < 0.97$, and $Li_xNi_cCo_dMn_{(1-c-d)}O_2$ wherein, in the formula, x satisfies $0 \leq x \leq 2$, c satisfies $0.2 < c < 0.97$, and d satisfies $0.2 < d < 0.97$, etc. Among them, from the viewpoint of a high capacity, low resistance, cycle characteristics, decomposition of the alkali metal compound, and suppression of missing of the positive electrode active material upon pre-doping, the compound represented by the above formulae $Li_xNi_aCo_bAl_{(1-a-b)}O_2$, $Li_xNi_cCo_dMn_{(1-c-d)}O_2$, $Li_xCoO_2$, $Li_xMn_2O_4$, $Li_xFePO_4$, $Li_xMnPO_4$ or $Li_zV_2(PO_4)_3$, is preferred.

In the present embodiment, if an alkali metal compound other than the positive electrode active material is contained in the positive electrode precursor, the alkali metal compound becomes a dopant source of the alkali metal during pre-doping to enable pre-doping to the negative electrode, and even if lithium ions are not preliminarily contained in the transition metal compound (i.e., even if x=0 or z=0 in the above formulae), electrochemical charge and discharge can be carried out as a nonaqueous lithium electric storage element.

The mean particle diameter of the lithium transition metal oxide is preferably 0.1 to 20 μm. When the mean particle diameter is 0.1 μm or larger, the capacity per electrode volume tends to increase due to the high density of the active material layer. A smaller mean particle diameter may lead to the disadvantage of low durability, but a mean particle diameter of 0.1 μm or larger will help avoid such disadvantage. The mean particle diameter of 20 μm or smaller tends to facilitate adaption for rapid charge and discharge. The mean particle diameter of the lithium transition metal oxide is more preferably 0.5 to 15 μm, and even more preferably 1 to 10 μm.

Further, the mean particle diameter of the lithium transition metal oxide is preferably smaller than the mean particle diameter of the carbon material described above. When the mean particle diameter of the lithium transition metal oxide is small, the lithium transition metal oxide can be arranged in a void formed by the carbon material having a large mean particle diameter, which leads to a lower resistance.

With regard to the structure of lithium transition metal oxide, the lithium transition metal oxide is preferably at least one selected from the group consisting of a layered-based compound, spinel-based compound, and an olivine-based compound from the standpoint of a high capacity, low resistance, cycle characteristics, decomposition of the alkali metal compound, inhibition of capacity deterioration of the lithium transition metal oxide upon pre-doping, and suppression of missing of the positive electrode active material upon pre-doping.

(Use of Lithium Transition Metal Oxide)

The lithium transition metal oxide may be a single type or a mixture of two or more types of materials, such that the mixture as a whole exhibit the characteristic values described above.

The positive electrode active material may include a material other than the aforementioned lithium transition metal oxide (for example, a conductive polymer, etc.). In the exemplified aspect, when the content of the lithium transition metal oxide in the positive electrode active material layer of the positive electrode precursor is $A_2$ and the content of the lithium transition metal oxide occupied in the total solid content in the positive electrode coating liquid is $X_2$, $A_2$ or $X_2$ is 5% by weight or greater and 35% by weight or less and more preferably 10% by weight or greater and 30% by weight or less. When $A_2$ or $X_2$ is 5% by weight or greater, the bulk density of the positive electrode active material layer is increased and the capacity becomes high. When $A_2$ or $X_2$ is 35% by weight or less, the contact area between a carbon material having a high electrical conductivity and the alkali metal compound is increased, which promotes the oxidation reaction of the alkali metal compound in the pre-doping step and enables pre-doping in a short time.

Moreover, when the content of the lithium transition metal oxide in the positive electrode active material layer of the positive electrode is $Y_2$, $Y_2$ is 9.0% by weight or greater and 58.5% by weight or less. When $Y_2$ is 9.0% by weight or greater, the capacity becomes high. When $Y_2$ is 58.5% by weight or less, the region of adsorption and desorption of ions becomes large and the resistance can be lowered.

(Use of Positive Electrode Active Material)

In the present embodiment, the ratio $A_2/A_1$ (or $X_2/X_1$) of the weight proportion $A_2$ of the lithium transition metal oxide in the positive electrode precursor or the weight proportion $X_2$ of the lithium transition metal oxide occupied in the total solid content of the positive electrode coating liquid, to the weight proportion $A_1$ of the carbon material or to the weight proportion $X_1$ of the carbon material occupied in the total solid content of the positive electrode coating liquid, is 0.10 or greater and 2.00 or less, preferably 0.20 or greater and 1.20 or less, and still more preferably 0.20 or greater and 1.10 or less. When $A_2/A_1$ ($X_2/X_1$) is 0.10 or greater, the bulk density of the positive electrode active material layer is increased and the capacity can be increased. When $A_2/A_1$ ($X_2/X_1$) is 2.00 or less, the resistance can be reduced because electron conduction between activated carbons increases, and decomposition of the alkali metal compound can be promoted because the contact area between the activated carbon and the alkali metal compound increases.

Moreover, $Y_2/Y_1$ of the weight proportion $Y_2$ of the lithium transition metal oxide in the positive electrode to the weight proportion $Y_1$ of the carbon material is 0.10 or greater and 1.90 or less. When $Y_2/Y_1$ is 0.10 or greater, the bulk density of the positive electrode active material layer is increased and the capacity is increased. When $Y_2/Y_1$ is 1.90 or less, the electron conduction between the activated carbons is increased and the resistance can be lowered.

(Alkali Metal Compound)

Alkali metal compounds according to the present embodiment include lithium carbonate, sodium carbonate, potassium carbonate, rubidium carbonate, cesium carbonate, lithium oxide, and lithium hydroxide, which are capable of decomposing in the positive electrode precursor to release cation ions and pre-doping by reduction in the negative electrode. One or more of alkali metal carboxylates selected from lithium carbonate, sodium carbonate, potassium carbonate, rubidium carbonate, and cesium carbonate are preferably used, more preferably lithium carbonate, sodium carbonate, and potassium carbonate are used, and from the viewpoint of a high capacity per unit weight, lithium carbonate is still more preferably used.

One, two or more of alkali metal compounds may be contained in the positive electrode precursor and the positive electrode coating liquid. Moreover, the positive electrode precursor and the positive electrode coating liquid according to the present embodiment may contain at least one type of the alkali metal compounds, and one or more of oxides such as $M_2O$, etc., hydroxides such as MOH, etc., halides such as MF and MCl, etc., and carboxylates such as RCOOM, wherein in the formula, R is H, an alkyl group and an aryl group, etc., may be contained, where M refers to one or more selected from lithium (Li), sodium (Na), potassium (K), rubidium (Rb) and cesium (Cs). Further, the alkali metal compound according to the present embodiment may contain one or more of alkaline earth metal carbonates selected from the group consisting of $BeCO_3$, $MgCO_3$, $CaCO_3$, $SrCO_3$, and $BaCO_3$, alkaline earth metal oxides, alkaline earth metal hydroxides, alkaline earth metal halides or alkaline earth metal carboxylates.

The positive electrode precursor is prepared such that the weight proportion $A_3$ of the alkali metal compound contained in the positive electrode active material layer of the positive electrode precursor or the weight proportion $X_3$ of the alkali metal compound occupied in the total solid content of the positive electrode coating liquid is 10% by weight or greater and 50% by weight or less. When $A_3$ or $X_3$ is 10% by weight or greater, a sufficient amount of alkali metal ions can be pre-doped to the negative electrode, and the capacity of the nonaqueous lithium electric storage element increases. When $A_3$ or $X_3$ is 50% by weight or less, electron conduction in the positive electrode precursor can be improved, so that the alkali metal compound can be efficiently decomposed.

Moreover, the weight proportion $Y_3$ of the alkali metal compound contained in the positive electrode active material layer of the positive electrode is 0.6% by weight or greater and 6.3% by weight or less. When $Y_3$ is 0.6% by weight or greater, fluorine ions formed in the high-load charge/discharge cycle can be adsorbed, which improves the high-load charge/discharge cycle characteristics. When $Y_3$ is 6.3% by weight or less, gas generation due to decomposition of the alkali metal compound can be inhibited and the high-load charge/discharge cycle characteristics can be enhanced.

When the positive electrode precursor contains the above two or more types of alkali metal compounds or an alkaline earth metal compound in addition to the alkali metal compound, the positive electrode precursor is preferably prepared such that the alkali metal compound and the alkaline earth metal compound as total are contained in the positive electrode active material layer at a proportion of 10% by weight or greater and 50% by weight or less per one side of the positive electrode precursor.

When the positive electrode coating liquid contains the above two or more types of alkali metal compounds or an alkaline earth metal compound in addition to the alkali metal compound, the positive electrode coating solution is preferably prepared such that the alkali metal compound and the alkaline earth metal compound as total are contained at a proportion of 10% by weight or greater and 50% by weight or less with respect to the total solid content in the positive electrode coating liquid.

When the positive electrode contains the above two or more types of alkali metal compounds or an alkaline earth metal compound in addition to the alkali metal compound, the positive electrode is preferably prepared such that the alkali metal compound and the alkaline earth metal compound as total are contained in the positive electrode active material layer at a proportion of 0.6% by weight or greater and 6.3% by weight or less per one side of the positive electrode.

In the present embodiment, the ratio $A_1/A_3$ or $X_1/X_3$ of the content $A_1$ or $X_1$ of the carbon material described above to the content $A_3$ or $X_3$ of the alkali metal compound, is 0.5 or greater and 3.00 or less, preferably 0.55 or greater and 2.94 or less, and still more preferably 0.65 or greater and 2.88 or less. When $A_1/A_3$ or $X_1/X_3$ is 0.50 or greater, the sufficient amount of alkali metal ions which contributes to charge and discharge of the carbon material is present, which enables to increase a capacity. Moreover, since decomposition of alkali metal compound is promoted on the surface of the carbon material, when $A_1/A_3$ or $X_1/X_3$ is 3.00 or less, decomposition of the alkali metal compound is promoted.

Further, the ratio $Y_1/Y_3$ of the content $Y_1$ of the carbon material described above to the content $Y_3$ of the alkali metal compound is 9.0 or greater and 100.0 or less. When $Y_1/Y_3$ is 9.0 or greater, fluorine ions produced in the high-load charge/discharge step can be adsorbed and the high-load charge/discharge characteristics are improved. When $Y_1/Y_3$ is 100.0 or less, gas generation due to decomposition of the alkali metal compound is inhibited and the high-load charge/discharge characteristics are improved.

(High-Load Charge/Discharge Characteristics)

When charging and discharging a nonaqueous lithium electric storage element, alkali metal ions and anions in the electrolytic solution move accompanying the charge and discharge and react with the active material. Here, the activation energy of the insertion reaction of ions into the active material and that of the desorption reaction differ with each other. Therefore, in particular, when the load of the charge and discharge is large, ions cannot follow the change of the charge/discharge and are accumulated in the active material. As a result, the electrolyte concentration in the bulk electrolytic solution is decreased, which brings about an increase in the resistance of the nonaqueous lithium electric storage element.

However, when an alkali metal compound is contained in the positive electrode precursor, the alkali metal compound is oxidized and decomposed to release alkali metal ions for pre-doping to the negative electrode and also form favorable pores capable of holding an electrolytic solution in the positive electrode. It is assumed that the ions are at any time supplied from the electrolytic solution in the pores formed in the vicinity of the active material during charge/discharge to the positive electrode having such pores, which improves the high-load charge/discharge cycle characteristics.

The alkali metal compound contained in the positive electrode precursor is oxidized and decomposed by applying a high voltage to release alkali metal ions when a nonaqueous lithium electric storage element is formed and the alkali metal ions are reduced at the negative electrode to proceed pre-doping. Therefore, the pre-doping step can be carried out in a short time by promoting the oxidation reaction. In order to promote the oxidation reaction, it is important to contact the alkali metal compound as an insulator with the positive electrode active material to enable electron conduction, and to diffuse cations that are formed by the reaction and released into the electrolytic solution. Therefore, it is important to moderately cover the surface of the positive electrode active material with the alkali metal compound.

Therefore, in oxygen mapping obtained by scanning electron microscope-energy dispersive X-ray spectroscopy (SEM-EDX) on the surface of the positive electrode precursor, when the expression $25.0 \leq C_1 \leq 76.0$ is satisfied and the expression $0.80 \leq C_1/A_3 \leq 2.40$ is satisfied, where the area of oxygen mapping binarized based on the average value of the luminance values refers to $C_1$ (%), the oxidative decomposition of the alkali metal compound is promoted, which is preferable. When $C_1$ is 25.0% or greater, electron conduction between the alkali metal compound and the positive electrode active material is ensured to promote pre-doping. When $C_1$ is 76.0% or less, diffusion of alkali metal ions in the electrolytic solution is promoted, so that pre-doping is promoted. When $C_1/A_3$ is 0.80 or greater, diffusion of the electrolytic solution in the positive electrode precursor is promoted, and thereby pre-doping is promoted. When $C_1/A_3$ is 2.40 or less, electron conduction between the alkali metal compound and the positive electrode active material is ensured to promote pre-doping. From the same viewpoint, the expressions $29.5 \leq C_1 \leq 75.1$ and/or $0.87 \leq C_1/A_3 \leq 2.37$ are preferably satisfied.

Further, in oxygen mapping obtained by SEM-EDX on the cross section of the positive electrode precursor processed by a broad ion beam (BIB), the expression $25.0 \leq C_2 \leq 76.0$ is satisfied, and the expression $0.80 \leq C_2/A_3 \leq 2.40$ is preferably satisfied, where the area of oxygen mapping binarized based on the average value of the luminance values is $C_2$ (%). When $C_2$ is 25.0% or greater, electron conduction between the alkali metal compound and the positive electrode active material is secured to promote pre-doping. When $C_2$ is 76.0% or less, diffusion of alkali metal ions in the electrolytic solution is promoted, so that pre-doping is promoted. When $C_2/A_3$ is 0.80 or greater, diffusion of the electrolytic solution in the positive electrode precursor is promoted, which promotes pre-doping. When $C_2/A_3$ is 2.40 or less, pre-doping is promoted because electron conduction between the alkali metal compound and the positive electrode active material is secured. From the same viewpoint, the expressions $25.6 \leq C_2 \leq 75.6$ and/or $0.81 \leq C_2/A_3 \leq 2.38$ are more preferably satisfied.

With regard to the measurement of $C_1$ and $C_2$, they are determined as the areas of oxygen mapping binarized based on the average value of luminance values in element mapping obtained by SEM-EDX on the surface of the positive electrode precursor and the cross section of the positive electrode precursor. A method of forming the cross section of the positive electrode precursor by BIB processing in which an Ar beam is irradiated from above the positive electrode precursor and a smooth cross section is formed along the edge of the shielding plate disposed right above the sample, can be employed.

The measuring conditions for SEM-EDX element mapping are not particularly restricted and are preferably a pixel count in the range of 128×128 pixels to 512×512 pixels, and adjustment of the luminance and contrast so that no pixel reaches the maximum luminance value in the mapping image, and the average value of luminance values falls within the range of 40% to 60% of the maximum luminance value.

Various methods may be used for micronization of the alkali metal compound and alkali earth metal compound. For example, a pulverizer such as a ball mill, bead mill, ring mill, jet mill or rod mill, etc., may be used.

The alkali metal element and alkali earth metal element described above can be quantified by using ICP-AES, atomic absorption analysis, X-ray fluorescence analysis, neutron activation analysis, ICP-MS, etc.

In the present embodiment, the mean particle diameter of the alkali metal compound is preferably 0.1 µm or greater and 10 µm or smaller. When the mean particle diameter is 0.1 µm or greater, it is excellent in dispersibility in the positive electrode precursor. When a mean particle diameter of no larger than 10 µm, the surface area of the alkali metal compound is increased, which efficiently proceeds the decomposition reaction.

Moreover, the mean particle diameter of the alkali metal compound is preferably smaller than the mean particle diameter of the carbon material described above. When the mean particle diameter of the alkali metal compound is smaller than the mean particle diameter of the carbon material, electron conductance of the positive electrode active material layer is increased, which can contribute to lowering the resistance of the electrode body or the electric storage element.

The method for measuring the mean particle diameter of the alkali metal compound in the positive electrode precursor is not particularly limited, but it can be calculated from an SEM image and an SEM-EDX image of the cross section of the positive electrode. The method of forming the cross section of the positive electrode by BIB processing in which an Ar beam is irradiated from above the positive electrode and a smooth cross section is formed along the edge of the shielding plate disposed right above the sample, can be used.

(Optional Components of Positive Electrode Active Material Layer)

If necessary, the positive electrode active material layer of the positive electrode precursor of the present invention may also contain optional components such as a conductive filler, binder, dispersion stabilizer, pH adjuster, etc., in addition to the positive electrode active material and alkali metal compound.

The conductive filler includes conductive carbonaceous material having higher conductivity than the positive electrode active material. Such a conductive filler includes, for example, Ketjen black, acetylene black, vapor grown carbon fibers, graphite, flaky graphite, carbon nanotubes, graphenes as well as mixtures thereof, etc.

The mixed amount of conductive filler in the positive electrode active material layer of the positive electrode precursor is preferably 0 to 20 parts by weight and more preferably 1 to 15 parts by weight with respect to 100 parts by weight of the positive electrode active material. The conductive filler is preferably mixed from the viewpoint of a high input. However, as the amount of the conductive filler mixed is greater than 20 parts by weight, the content proportion of the positive electrode active material in the positive electrode active material layer becomes less, and the energy density per volume of the positive electrode active material layer is reduced, which is not preferred.

In the present invention, it is assumed that when adding a binder moderately other than for simply producing biding function, the binder is appropriately incorporated between the electrode components such as the positive electrode active material such as activated carbon, lithium transition metal oxide, and alkali metal compound to ensure the ion path as well, which results in achieving the remarkable effect such as inhibition of micro short-circuit, high capacity, and retention of the internal resistance after the cycle.

Therefore, the lower limit of the peel strength of the positive electrode precursor obtained by mixing the positive electrode active material, etc., at a specific ratio and further optimally adding the binder, is 0.02 N/cm or greater, and preferably 0.03 N/cm or greater, and the upper limit is 3.00 N/cm or less, and preferably 2.76 N/cm or less. As a result, the above effect can be obtained.

The binder is not particularly restricted, and for example, PVdF (polyvinylidene difluoride), PTFE (polytetrafluoroethylene), polyimide, latex, styrene-butadiene copolymer, fluorine rubber or an acrylic copolymer, etc., may be used. The amount of binder used is preferably 1 part by weight or greater and 30 parts by weight or less with respect to 100 parts by weight of the positive electrode active material. It is more preferably 3 parts by weight or greater and 27 parts by weight or less and even more preferably 5 parts by weight or greater and 25 parts by weight or less. When the amount of binder is 1 weight % or greater, adequate electrode strength will be exhibited. When the amount of binder is no greater than 30 parts by weight, on the other hand, high input/output characteristics will be exhibited without preventing movement or diffusion of ions in and from the positive electrode active material.

The dispersion stabilizer is not particularly restricted, and for example, PVP (polyvinylpyrrolidone), PVA (polyvinyl alcohol) or cellulose derivatives, etc., may be used. The amount of the dispersion stabilizer used is preferably 0 parts by weight or greater and no greater than 10 parts by weight with respect to 100 parts by weight of the positive electrode active material. When the amount of dispersion stabilizer is no greater than 10 parts by weight, high input/output characteristics will be exhibited without preventing movement or diffusion of ions in and from the positive electrode active material.

A dispersant is not particularly limited, for example, at least one selected from the group consisting of carboxymethylcellulose, methylcellulose, ethylcellulose, cellulose acetate phthalate, hydroxymethylcellulose, hydroxypropylmethylcellulose, hydroxyethylmethylcellulose, hydroxypropylmethylcellulose phthalate, polyvinylpyrrolidone, polyvinyl alcohol, and polyvinyl acetal, can be used. The amount of the dispersant used is preferably 0 parts by weight or greater and 10 parts by weight or less, more preferably greater than 0 parts by weight and 10 parts by weight or less based on 100 parts by weight of the positive electrode active material. When the amount of the dispersant is 10 parts by weight or less, high input/output characteristics are exhibited without preventing movement or diffusion of ions in and from the positive electrode active material.

A dispersion solvent for the positive electrode coating liquid includes water, N-methyl-2-pyrrolidone, methyl ethyl ketone, methyl isobutyl ketone, ethyl acetate, butyl acetate, dioxane, tetrahydrofuran, dimethylformamide, dimethylacetamide, tetramethylurea, dimethylsulfoxide, trimethylphosphate, alcohol, acetone, toluene, xylene, normal hexane, cyclohexane, a mixture thereof, etc.

When an organic solvent other than water is used as the dispersion solvent of the coating liquid, the amount of water contained in the dispersion solvent is preferably 0% by weight or greater and 10% by weight or less. When the water content is 0% by weight or greater (particularly if the water content exceeds 0% by weight), a small amount of the alkali metal compound is dissolved, and therefore the contact between the positive electrode active material and the conductive material, and the alkali metal compound increases, which promotes pre-doping. When the water content is 10% by weight or less, the basicity of the coating liquid does not become too high, and the modification of the binder can be inhibited. A method of inhibiting the amount of water from being contained to 10% by weight or less includes a method of adding a dehydrating agent such as magnesium sulfate or zeolite, etc.

When water is used as the solvent for the coating liquid, the coating liquid may be alkaline by adding an alkali metal compound, so that a pH adjuster may be added to the coating liquid as necessary. The pH adjuster is not particularly limited, and includes, for example, hydrogen halides such as hydrogen fluoride, hydrogen chloride, hydrogen bromide, etc., halogen oxoacids such as hypochlorous acid, chlorous acid, chloric acid, etc., carboxylic acids such as formic acid, acetic acid, citric acid, oxalic acid, lactic acid, maleic acid, fumaric acid, etc., sulfonic acids such as methanesulfonic acid, benzenesulfonic acid, p-toluenesulfonic acid, etc., acids such as nitric acid, sulfuric acid, phosphoric acid, boric acid, carbon dioxide, etc.

[Positive Electrode Current Collector]

The material composing the positive electrode current collector of the present embodiment is not particularly restricted provided it is a material that has high electron conductivity and does not undergo degradation by elution into the electrolytic solution or reaction with the electrolyte or ion, but a metal foil is preferred. The positive electrode current collector in the nonaqueous lithium electric storage element of the present embodiment is most preferably an aluminum foil.

The metal foil may be a common metal foil without ruggedness or through-holes, or it may be a metal foil having ruggedness formed by embossing, chemical etching, electrolytic deposition, blasting, etc., or it may be a metal foil having through-holes, such as an expanded metal, punching metal, etching foil, etc.

From the viewpoint of the pre-doping treatment as will be described below, a nonporous aluminum foil is furthermore preferred and the surface thereof is particularly preferably treated with surface roughening.

The thickness of the positive electrode current collector is not particularly restricted provided that the shape and strength of the positive electrode can be maintained, but 1 to 100 μm, for example, is preferred.

Moreover, an anchor layer containing conductive materials such as graphite, flaky graphite, carbon nanotubes, graphenes, Ketjen black, acetylene black, vapor grown carbon fibers, etc., is preferably provided on the surface of the metal foil described above. The anchor layer provided improves electric conductance between the positive electrode current collector and the positive electrode active material layer and reduces the resistance. The thickness of the anchor layer is preferably 0.1 μm or greater and 5 μm or less per one side of the positive electrode current collector.

[Production of Positive Electrode Coating Liquid]

In the present embodiment, the positive electrode coating liquid to be used for the nonaqueous lithium electric storage element can be produced by production techniques for publicly known lithium ion batteries, electrical double layer capacitors, etc. For example, the positive electrode active material and alkali metal compound, as well as the other optional components that are used as necessary, may be dispersed and dissolved in water or an organic solvent to prepare a slurry-like coating liquid.

In one embodiment, the method for producing the positive electrode coating liquid of the present embodiment includes a method of dry-mixing a solid content including a carbon material, lithium transition metal oxide, and an alkali metal compound, and then mixing the dry-mixed solid content with a dispersion solvent for dispersion. More specifically, for example, a part or all of the solid content containing the carbon material, lithium transition metal oxide, and an alkali metal compound is dry-mixed (also referred to as "dry blending"), and then adding a dispersion solvent and/or a liquid or slurry-like substance in which a binder, a dispersant, and a pH adjuster are dissolved or dispersed in the dispersion solvent to prepare a positive electrode coating liquid. Moreover, the coating liquid may be prepared by adding a solid content containing a carbon material, lithium transition metal oxide and alkali metal compound, which are preliminarily dry-mixed in a liquid or slurry-like substance in which a binder, a dispersant, and a pH adjuster are dissolved or dispersed in the dispersion solvent. The method of dry-mixing is not restricted, and for example, a method of using a ball mill, etc., can be carried out.

In another embodiment, a method of dry-mixing the carbon material and the alkali metal compound, and subsequently mixing and dispersing other solid contents and the dispersion solvent by an arbitrary procedure, may be applied. According to this procedure, the carbon material and the alkali metal compound are more intimately mixed to enhance electron conductance, which facilitates decomposition of the alkali metal compound in the pre-doping step and is preferred. More specifically, the coating liquid may be prepared by dry-mixing a part or all of the carbon material and the alkali metal compound, next adding the lithium transition oxide and dry-mixing it, and subsequently adding the dispersion solvent and/or a liquid or slurry-like substance in which a binder, a dispersant, and a pH adjuster are dissolved or dispersed in the dispersion solvent to prepare a coating liquid. Moreover, the coating liquid may be prepared by adding the carbon material, lithium transition metal oxide, the alkali metal compound, etc., which are preliminarily dry-mixed in a liquid or slurry-like substance in which a binder, a dispersant, and a pH adjuster are dissolved or dispersed in the dispersion solvent by an arbitrary procedure. The method of dry-mixing is not restricted, and for example, a method of using a ball mill, etc., can be carried out.

Furthermore, in other embodiment, a method of dry-mixing a conductive material and the aforementioned alkali metal compound, and subsequently mixing and dispersing other solid contents and the aforementioned dispersion solvent by an arbitrary procedure, may be applied. According to this procedure, the surface of the alkali metal compound having low conductivity is coated with the conductive material to increase the electron conductance of the alkali metal compound, which facilitates decomposition of the alkali metal compound in the pre-doping step and is preferred. More specifically, the coating liquid may be prepared by dry-mixing a part or all of the conductive material and the alkali metal compound, next adding the carbon material and the lithium transition oxide and dry-mixing them, and subsequently adding the dispersion solvent and/or a liquid or slurry-like substance in which a binder, a dispersant, and a pH adjuster are dissolved or dispersed in the dispersion solvent to prepare a coating liquid. Moreover, the coating liquid may be prepared by adding the conductive material and alkali metal compound, as well as the carbon material, lithium transition metal oxide, etc., which are preliminarily dry-mixed, in a liquid or slurry-like substance in which a binder, a dispersant, and a pH adjuster are dissolved or dispersed in the dispersion solvent by an arbitrary procedure. The method of dry-mixing is not restricted, and for example, a method of using a ball mill, etc., can be carried out.

The solid content ratio of the positive electrode coating liquid is preferably 15% or greater and 50% or less. When the solid content is 15% or greater, drying can be carried out under mild conditions upon coating. When the solid content is 50% or less, generation of coating streaks and cracks upon coating can be inhibited. The solid content ratio is a ratio of the total weight of solid contents such as a carbon material, lithium transition metal oxide, alkali metal compound, other binders, conductive materials, etc., to the total weight of the coating solution.

The dispersion method in the preparation of the positive electrode coating liquid is not particularly limited, and dispersing machines such as a bead mill, ball mill, jet mill, homogenizer, emulsifying disperser, rotation/revolution mixer, homodisper, multiscrew disperser, planetary mixer, thin-film rotating-type high speed mixer, etc., may be suitably used. Moreover, it is also possible to disperse by a combined use of a plurality of these dispersing machines. In order to obtain a coating liquid in a favorable dispersion state, for example, a peripheral velocity for dispersion of 1 m/s or faster and 50 m/s or slower is preferred when using a thin-film-rotating-type high speed mixer. When a peripheral velocity is 1 m/s or faster, various materials can be moderately dissolved or dispersed, which is favorable. The peripheral velocity of 50 m/s or slower is preferred because various materials are not broken down by heat or shear force during dispersion and reaggregation does not take place. In order to inhibit the destruction of various materials due to heat generated by the dispersion, the coating liquid is preferably dispersed with cooling.

The coating liquid is preferably defoamed following the dispersion thereof. The method of defoaming is not particularly limited, and includes a method of stirring the coating liquid at a low speed under a reduced pressure environment, a method of allowing the coating liquid to stand undisturbed, a method of stirring at a low speed by using a rotation/revolution mixer, etc.

Moreover, agglomerates in the coating liquid is preferably removed with a filter following the dispersion. Removal of the agglomerates having a large particle size enables to inhibit generation of streaks, etc., in the coating liquid.

The degree of dispersion of the coating liquid is preferably to a granularity of 0.1 µm or greater and 100 µm or smaller, as measured with a fineness gauge. The upper limit for the degree of dispersion is more preferably to a granularity of no greater than 80 µm, and more preferably to a granularity of no greater than 50 µm. It is not preferred when the granularity is 0.1 µm or smaller, because the size will be less than the particle diameter of each starting powder containing the positive electrode active material, which means that the material will have been crushed during preparation of the coating liquid. When the granularity is no greater than 100 µm, there will be no clogging during discharge of the coating liquid or formation of streaks in the coating film, which enables more stable coating.

The viscosity ($\eta$b) of the coating liquid of the positive electrode precursor is preferably 1,000 mPa·s or higher and 20,000 mPa·s or lower, and more preferably 1,500 mPa·s or higher and 10,000 mPa·s or lower, and still more preferably 1,700 mPa·s or higher and 5,000 mPa·s or lower. When the viscosity (ηb) is 1,000 mPa·s or higher, liquid dripping during formation of the coating film will be inhibited, and the coating film width and thickness can be satisfactorily controlled. Moreover, when it is no higher than 20,000 mPa·s, there will be less pressure loss in the flow channel of the coating liquid when a coating machine is used, which enables stable coating to be carried out, and facilitates control to less than the prescribed coating film thickness. In the present embodiment, when the viscosity of the positive electrode coating liquid is ηb and the viscosity after allowing to stand it with an elapse of 24 hours after measurement of $\eta b_1$ is $\eta b_2$, $\eta b_2/\eta b_1$ is preferably 0.40 or greater and 1.30 or less. When $\eta b_2/\eta b_1$ is 0.50 or greater, the maldistribution of the binder in the coating liquid is inhibited, which enables to increase the peel strength of the positive electrode precursor and to suppress missing of the positive electrode active material layer during pre-doping. When $\eta b_2/\eta b_1$ is 1.20 or less, the modification of the binder in the coating liquid by the alkali compound is inhibited, which enables to increase the peel strength of the positive electrode precursor and to suppress missing of the positive electrode active material layer upon pre-doping. In general, the time required for coating of the positive electrode precursor is often 24 hours or shorter per reel of the electrode, and by evaluating $\eta b_1$ and $\eta b_2$ which is the viscosity with an elapse of 24 hours after measuring $\eta b_1$, the uniformity of the electrode such as the basis weight, the film thickness, etc., from the coating start point to the coating end point, can be ensured.

In the present embodiment, the TI value (thixotropy index value) of the coating liquid is preferably 1.1 or greater, more preferably 1.2 or greater, and even more preferably 1.5 or greater. When the TI value is 1.1 or greater, the coating film width and thickness can be satisfactorily controlled. In the present embodiment, when the thixotropy index value of the positive electrode coating liquid is $TI_1$, and the thixotropy index value after allowing to stand for 24 hours after measurement of $TI_1$ is $TI_2$, $TI_2/TI_1$ is 0.50 or greater and 1.20 or less. When $TI_2/TI_1$ is 0.50 or greater, liquid dripping during electrode coating can be inhibited, and the capacity can be increased by making the thickness of the positive electrode active material layer uniform. $TI_2/TI_1$ of 1.20 or less enables to inhibit a local increase in the thickness of the edge portion of the positive electrode active material layer and also suppress missing of the positive electrode active material layer during pre-doping. By evaluating $TI_1$ and $TI_2$ which is a TI value with an elapse of 24 hours after measuring $TI_1$, the uniformity of the basis weight and the thickness of the coating film edge portion from the coating start point to the coating end point, can be ensured.

The viscosity (ηb) and the TI value in the present embodiment are values obtained by the following methods, respectively. First, a stable viscosity (ηa) is obtained after measurement thereof for 2 minutes or longer at a temperature of 25° C. and a shear rate of 2 s$^{-1}$ by using an E-type viscometer. Next, the viscosity (ηb) is obtained under the same conditions as above except that the shear rate was changed to 20 s$^{-1}$. The TI value is calculated according to the equation TI value=ηa/ηb by using the values of the viscosity obtained above. When increasing the shear rate from 2 s$^{-1}$ to 20 s$^{-1}$, the shear rate may be increased in one step, or it may be increased in multiple steps within the above range while the viscosity at the corresponding shear rate is appropriately obtained. $TI_1$ and $\eta b_1$ in the present embodiment are measured by the above method after dispersing for 1 minute at a speed of 600 rpm by using a rotation/revolution mixer. Subsequently, the coating liquid is allowed to stand in a sealed state for 24 hours in a 25° C. environment. The values measured thereafter again by the above method are $TI_2$ and $\eta b_2$. The weight of the positive electrode coating liquid used for the measurement is not particularly limited and is preferably 10 g or greater and 100 g or less from the viewpoint of reducing the measurement variation. The weight of 10 g or greater ensures reproducibility of measurement. When the weight is 100 g or less, the sample is excellent in handleability.

[Production of Positive Electrode Precursor]

In the present embodiment, the positive electrode precursor that is to be the positive electrode of the nonaqueous lithium electric storage element, can be produced by publicly known production techniques of electrodes for lithium ion batteries, electrical double layer capacitors, etc. For example, the coating liquid is prepared in the same manner as described above, and one or both sides of a positive electrode current collector are coated with the coating solution to form a coating film, which is dried to obtain a positive electrode precursor. Further, the obtained positive electrode precursor may also be pressed to adjust the film thickness or bulk density of the positive electrode active material layer. An alternative method may also be employed, in which the positive electrode active material and alkali metal compound, as well as the other optional components used as necessary, are mixed in a dry state without using a solvent, and the obtained mixture is subjected to press molding, after which a conductive adhesive is used for attachment to the positive electrode current collector, or to heat pressing on the positive electrode current collector to form the positive electrode active material layer.

Formation of a coating film of the positive electrode precursor is not particularly restricted, and a coating machine such as a die coater or comma coater, knife coater, gravure coating machine, etc., may be suitably used. The coating film may be formed by monolayer coating or by multilayer coating. In the case of multilayer coating, the coating liquid compositions may be adjusted so that the alkali metal compound content differs within each layer of the coating film. When the surface of the positive electrode current collector is coated with a coating liquid, multiple coating, intermittent coating, or multiple/intermittent coating may be employed. Alternatively, sequential coating may be applied, in which one side of the positive electrode current collector is coated and dried, and the other side is coated and dried may be applied, or both-side simultaneous coating may be carried out, in which both sides of the positive electrode current collector are simultaneously coated with the coating liquid and dried. When both sides of the positive electrode current collector are coated with the coating liquid, the ratios of the carbon material, lithium transition metal oxide, and alkali metal compound on the front side and the back side are each preferably 10% or less. For example, the ratio $A_1$ (front)/$A_1$ (back) of the weight ratio $A_1$ (front) of the carbon material on the surface of the positive electrode current collector to $A_1$ (back) of the carbon material on the back surface is 0.9 or greater and 1.1 or less. Further, the ratio of the thickness of the positive electrode active material layer on the front surface to the thickness of the positive electrode active material layer on the back surface is preferably 10% or less. As the weight ratio and thickness ratio between the front surface and the back surface are closer to 1.0, the charge/discharge load is not concentrated on one surface, and thereby the high-load charge/discharge cycle characteristics are improved.

Moreover, to make the edge portion thinner than the center portion is preferred in the TD (direction perpendicular to the machine direction MD) of the positive electrode active material layer. When an electrode body to be described below is formed, stress is loaded to a portion near the terminal portion, and the positive electrode active material layer is likely to be missed. Therefore, when the positive electrode active material layer at the edge is made thinner, the stress is relieved, which suppresses missing of the positive electrode active material layer. With regard to a range for thinning of the edge portion, the thickness of the positive electrode active material layer within the range of up to 10% from the edge of the longest line segment of the positive electrode active material layer to the center side along with the TD of the positive electrode active material layer, is preferably 90% or greater and less than 100% of the thickness of the positive electrode active material layer at the center of the longest line segment of the positive electrode active material layer.

The coating speed is preferably 0.1 m/minute or faster and 100 m/minute or slower. More preferably, it is 0.5 m/minute or faster and 70 m/minute or slower, and still more preferably 1 m/minute or faster and 50 m/minute or slower. When the coating speed is 0.1 m/min or faster, the stable coating is possible. On the other hand, the coating speed of 100 m/minute or slower sufficiently ensures the coating accuracy.

One example of the production method of the positive electrode precursor according to the present embodiment comprises a step of drying a coating film of the positive electrode precursor obtained above by infrared ray (IR) or hot air; and/or a step of slitting the coating film of the positive electrode precursor obtained above and pressing thereof.

Drying of the coating film of the positive electrode precursor is carried out by using a drying method such as hot air drying or infrared ray (IR) drying, etc., and more preferably the drying is carried out by far infrared ray, near infrared ray, or hot air at 80° C. or higher. Drying of the coating film may be drying at a single temperature, or it may be drying while varying the temperature in different stages. Several drying methods may also be used in combination for drying. The drying temperature is preferably 25° C. or higher and 200° C. or lower, more preferably 40° C. or higher and 180° C. or lower, and even more preferably 50° C. or higher and 160° C. or lower. When the drying temperature is 25° C. or higher, it will be possible to adequately volatilize off the solvent in the coating film. When it is no higher than 200° C., on the other hand, it will be possible to reduce cracking of the coating film by rapid volatilization of the solvent or maldistribution of the binder by migration, and oxidation of the positive electrode current collector or positive electrode active material layer.

The water content contained in the dried positive electrode precursor is preferably 0.1% or greater and 10% or less, with the weight of the positive electrode active material layer being 100%. When the water content is 0.1% or more, deterioration of the binder due to excessive drying can be inhibited to reduce the resistance. When the water content is 10% or less, deactivation of alkali metal ions in the nonaqueous lithium electric storage element can be inhibited to increase the capacity.

When N-methyl-2-pyrrolidone (NMP) is used for preparing the coating liquid, the content of NMP in the dried positive electrode precursor is 0.1% or greater and 10% or less with respect to the weight of the positive electrode active material layer as 100%. When the content of NMP is 0.1% or greater, deterioration of the binder due to excessive drying can be inhibited to reduce the resistance. When the content of NMP is 10% or less, the self-discharge characteristics of the nonaqueous lithium electric storage element can be improved.

The water content in the positive electrode precursor can be measured, for example, by the Karl Fischer titration method (JIS #0068 (2001) "Method for measuring water content of chemical products").

Moreover, NMP contained in the positive electrode precursor was quantified by extracting NMP through immersion of the positive electrode precursor in ethanol at a 50 to 100-fold amount with respect to the weight of the positive electrode active material layer in a 25° C. environment for 24 hours, and then carrying out GC/MS measurement thereof, based on the preliminarily prepared calibration curve.

In order to press the positive electrode precursor, a pressing machine such as a hydraulic press or vacuum pressing machine, etc., may be suitably used. The film thickness, bulk density and electrode strength of the positive electrode active material layer can be adjusted by the pressing pressure, the gap between press rolls, and the surface temperature of the pressed portion, as described below. The pressing pressure is preferably 0.5 kN/cm or greater and 20 kN/cm or less, more preferably 1 kN/cm or greater and 10 kN/cm less, and even more preferably 2 kN/cm or greater and 7 kN/cm or less. When the pressing pressure is 0.5 kN/cm or greater, it will be possible to adequately increase the electrode strength. When it is no greater than 20 kN/cm, on the other hand, distortion or wrinkles will not be produced in the positive electrode precursor, and adjustment can be made to the desired film thickness and bulk density for the positive electrode active material layer. Moreover, the gap between the press rolls may be set to a desired value depending on the film thickness of the dried positive electrode precursor, so that the desired film thickness and bulk density of the positive electrode active material layer is obtained. The pressing speed may also be set to the desired speed, so as to avoid distortion and wrinkles in the positive electrode precursor. Furthermore, the surface temperature of the pressed portion may be room temperature, or it may be heated instead, if necessary. In the case of heating, the lower limit for the surface temperature of the pressed portion is preferably at least the melting point of the binder used minus preferably 60° C., more preferably at least the melting point of the binder used minus 45° C. and even more preferably at least the melting point of the binder used minus 30° C. In the case of heating, the upper limit for the surface temperature of the pressed portion is preferably no higher than the melting point of the binder used plus 50° C., more preferably no higher than the melting point of the binder used plus 30° C. and even more preferably no higher than the melting point of the binder used plus 20° C. For example, when PVdF (polyvinylidene difluoride: melting point=150° C.) is used as the binder, heating to 90° C. or higher and 200° C. or lower is preferred, and more preferably heating to 105° C. or higher and 180° C. or lower and even more preferably 120° C. or higher and 170° C. or lower. Further, when styrene-butadiene copolymer (melting point: 100° C.) is used as the binder, it is preferably heated to 40° C. or higher and 150° C. or lower, or heated to more preferably 55° C. or higher and 130° C. or lower and even more preferably 70° C. or higher and 120° C. or lower.

The melting point of the binder can be determined by the endothermic peak position in DSC (Differential Scanning Calorimetry). For example, by using a "DSC7" differential scanning calorimeter by Perkin-Elmer Inc., 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation.

Moreover, pressing may also be carried out multiple times while varying the conditions including the pressing pressure, gap, speed, and pressed portion surface temperature.

When the positive electrode precursor is multiple-coated, slitting is preferably carried out before pressing. When the multiple-coated positive electrode precursor is pressed without slitting, stress is applied to the current collector portion that is not coated with the positive electrode active material layer to form wrinkles. Moreover, the positive electrode precursor can be slit again following pressing.

The thickness of the positive electrode active material layer according to the present embodiment is preferably 10 μm or greater and 200 μm or less for each side of the positive electrode current collector. The thickness of the positive electrode active material layer per side is more preferably 20 μm or greater and 100 μm or less, and even more preferably 30 μm or greater and 80 μm or less, for each side. When the thickness is 10 μm or greater, a sufficient input/output characteristics can be produced. When the thickness is 200 μm or less, a sufficient diffusion resistance of ions in the electrode can be maintained low. Therefore, not only a sufficient output characteristic can be obtained but also the cell volume can be reduced, which therefore enables to increase the energy density. Incidentally, when the current collector has through-holes or ruggedness, the thickness of the positive electrode active material layer is the mean value of the thickness for each side at the sections of the current collector without through-holes or ruggedness.

The peel strength of the positive electrode active material layer of the positive electrode precursor according to the present embodiment is 0.02 N/cm or greater and 3.00 N/cm or less. When the peel strength is 0.02 N/cm or greater, it is possible to suppress missing of the positive electrode active material layer due to gas generation in the pre-doping step, and to inhibit a micro short-circuit. The peel strength of 3.00 N/cm or less refers to absence of an excessive binder, etc., in the positive electrode active material layer, which therefore enables to improve diffusivity of the electrolytic solution to reduce the resistance thereof. The peel strength of the positive electrode active material layer is preferably 0.03 to 2.76 N/cm, and more preferably 0.05 to 1.64 N/cm.

The peel strength of the positive electrode active material layer of the positive electrode precursor is a value measured after the pressing described above, a value after the final pressing in the case of carrying out pressing multiple times, and a value measured without pressing in the case of fabricating an electrode body without pressing.

The peel strength of the positive electrode active material layer can be measured by publicly known methods. For example, a peel test in accordance with JIS Z0237 (2009) "Testing method of adhesive tape/adhesive sheet" or the test method as described in Examples, may be used.

The peel strength of the positive electrode active material layer of the positive electrode according to the present embodiment is 0.02 N/cm or greater and 2.40 N/cm or less. When the peel strength is 0.02 N/cm or greater, it is possible to suppress missing of the positive electrode active material layer and to inhibit a micro short-circuit. The peel strength of 2.40 N/cm or less refers to absence of an excessive binder, etc., in the positive electrode active material layer, which therefore enables to improve the diffusivity of the electrolytic solution and to reduce the resistance thereof.

The peel strength of the positive electrode active material layer of the positive electrode can be measured as follows. The nonaqueous lithium electric storage element adjusting the voltage thereof to 2.9 V was disassembled to take out an electrode laminated body, cut out the positive electrode from the electrode laminated body, and wash with an organic solvent. The organic solvent is not particularly limited provided that the decomposed product of the electrolytic solution deposited on the surface of the positive electrode can be removed, and an organic solvent having a lithium compound solubility of 2% or less inhibits an elution of the lithium compound. Such an organic solvent including, for example, polar solvents such as methanol, ethanol, acetone, methyl acetate, etc., are preferably used. The obtained positive electrode is vacuum-dried, and the peel strength can be measured by the method described above.

The pore volume, micropore volume, and mean fine pore diameter of the positive electrode precursor or the positive electrode are each a value determined by the following respective methods. The positive electrode precursor or the positive electrode is vacuum-dried at 200° C. for a day and a night, and the adsorption/desorption isotherm is measured by using nitrogen as the adsorbate. By using the obtained isotherm on the adsorption side, the BET specific surface area is calculated by the multipoint BET method or single point BET method, the mesopore volume is calculated by the BJH method, and the micropore volume is calculated by the MP method, respectively. By dividing the obtained BET specific surface area, mesopore volume, and micropore volume each by the positive electrode precursor area or the positive electrode area, the BET specific surface area per unit area of the positive electrode precursor $B_1$ ($m^2/cm^2$) or the BET specific surface area per unit area of the positive electrode $B_2$ ($m^2/cm^2$), mesopore volume per unit area of positive electrode precursor $D_1$ ($\mu L/cm^2$) or mesopore volume per unit area of positive electrode $D_2$ ($\mu L/cm^2$), and the micropore volume per unit area of the positive electrode precursor $E_1$ ($\mu L/cm^2$) or the micropore volume per unit area of the positive electrode $E_2$ ($\mu L/cm^2$) can be calculated.

In the present embodiment, the BET specific surface area per unit area of the positive electrode precursor $B_1$ ($m^2/cm^2$) is preferably 0.20 or greater and 10.00 or less. When $B_1$ is 0.20 or greater, the nonaqueous electrolytic solution can be sufficiently impregnated into the positive electrode precursor, and therefore the reaction of the alkali metal compound is promoted to enable to complete the pre-doping step in a short time. When $B_1$ is 10.00 or less, the contact area between the positive electrode active material and the alkali metal compound increases, which enables to reduce the reaction overvoltage of the alkali metal compound. $B_1$ satisfies more preferably $0.28 \leq B_1 \leq 9.54$, and still more preferably, $0.33 \leq B_1 \leq 8.98$. The BET specific surface area per unit area of the positive electrode precursor $B_1$ is measured by a BET method on one surface of the positive electrode precursor.

In the present embodiment, the mesopore volume per unit area of the positive electrode precursor $D_1$ ($\mu L/cm^2$) is preferably 0.10 or greater and 5.00 or less. When $D_1$ is 0.10 or greater, the output characteristics become excellent. When $D_1$ is 5.00 or less, the bulk density of the positive electrode precursor can be increased.

Further, the micropore volume per unit area of the positive electrode precursor $E_1$ ($\mu L/cm^2$) is preferably 0.20 or greater and 10.00 or less. When $E_1$ is 0.20 or greater, the energy density can be increased. When $E_1$ is 10.00 or less, the bulk density of the positive electrode precursor can be increased.

The BET specific surface area per unit area of the positive electrode $B_2$ (m²/cm²) is preferably 0.20 or greater and 10.00 or less. When $B_2$ is 0.20 or greater, the area where ions can be adsorbed and desorbed becomes large to be able to increase the capacity. When $B_2$ is 10.00 or less, the resistance can be reduced because diffusion of ions is improved. The BET specific surface area per unit area of the positive electrode $B_2$ is measured on one side of the positive electrode by the BET method.

In the present embodiment, the mesopore volume per unit area of the positive electrode $D_2$ (μL/cm²) is preferably 0.10 or greater and 5.00 or less. When $D_2$ is 0.10 or greater, the output characteristic becomes excellent. When $D_2$ is 5.00 or less, the bulk density of the positive electrode can be increased.

Further, the micropore volume per unit area of the positive electrode $E_2$ (μL/cm²) is preferably 0.20 or greater and 10.00 or less. When $E_2$ is 0.20 or greater, the energy density can be increased. When $E_2$ is 10.00 or less, the bulk density of the positive electrode can be increased.

From the viewpoints described above, the bulk density of the positive electrode active material layer comprised in the positive electrode precursor or the positive electrode according to the present embodiment is preferably 0.4 g/cc or greater and 1.2 g/cc or less and more preferably 0.5 to 1.1 g/cc.

Incidentally, the electrode body according to the present embodiment comprises the positive electrode precursor described above and a negative electrode described below, if desired.

The degree of dispersion for the present invention is the value determined based on a dispersion evaluation test by using a fineness gauge conforming to JIS K5600. Specifically, a sufficient amount of sample can flow into the tip of a fineness gauge having a groove with the prescribed depth corresponding to the particle size, through the deep part of the groove, and is allowed to slightly spill over from the groove. Next, with the long side of a scraper parallel to the widthwise direction of the gauge, and placed with the blade edge in contact with the deep tip of the groove of the fineness gauge, the scraper is held on the surface of the gauge, the surface of the gauge is pulled at an even speed perpendicular to the long side direction of the groove to a groove depth of 0 for a period of 1 to 2 seconds, observation is made with light irradiated at an angle of 20° to 300 within 3 seconds after the pulling has ended, and the depth at which particles appear in the groove of the fineness gauge is read off.

The viscosity (ηb) and TI value in the present invention are the values determined by the following respective methods. First, an E-type viscometer is used to determine the viscosity (ηa) stabilized after measurement for 2 minutes or longer under conditions with a temperature of 25° C. and a shear rate of 2 s$^{-1}$. Next, the viscosity (ηb) is determined as measured under the same conditions except for changing the shear rate to 20 s$^{-1}$. The viscosity values as obtained above are used to calculate the TI value as: TI value=ηa/ηb. When increasing the shear rate from 2 s$^{-1}$ to 20 s$^{-1}$, it may be increased in a single stage, or the shear rate may be increased in stages within the range specified above, while appropriately determining the viscosity at each shear rate.

<Negative Electrode>

The negative electrode has a negative electrode current collector and a negative electrode active material layer present on one side or both sides thereof.

[Negative Electrode Active Material Layer]

The negative electrode active material layer contains a negative electrode active material that can intercalate and release lithium ions. It may also contain optional components such as a conductive filler, binder, dispersion stabilizer, etc., as necessary.

[Negative Electrode Active Material]

A substance capable of intercalating and releasing lithium ions can be used for the negative electrode active material. Specifically, the negative electrode active material includes carbon materials, titanium oxide, silicon, silicon oxide, silicon alloys, silicon compounds, tin and tin compounds, etc. The content of the carbon material based on the total amount of the negative electrode active material is preferably 50% by weight or greater and more preferably 70% by weight or greater. Although the content of the carbon material may be 100% by weight, from the viewpoint of favorably obtaining effects resulting from the combined use of other materials, the content of the carbon material is, for example, preferably 90% by weight or less and more preferably 80% by weight or less. The upper limits and lower limits of the content range can be arbitrarily combined.

The carbon materials include, for example, hardly graphitizable carbon materials; easily graphitizable carbon materials; carbon black; carbon nanoparticles; activated carbon; artificial graphite; natural graphite; graphitized mesophase carbon microspheres; graphite whiskers; amorphous carbonaceous materials such as polyacene-based materials, etc.; carbonaceous materials obtained by heat treatment of carbonaceous material precursors such as petroleum-based pitch, coal-based pitch, mesocarbon microspheres, coke or synthetic resins (such as phenol resin, etc.); thermal decomposition products of furfuryl alcohol resin or novolac resin, fullerene, carbon nanohorn; and composite carbon materials thereof.

The BET specific surface area of the composite carbon material is preferably 100 m²/g or greater and 350 m²/g or less and more preferably 150 m²/g or greater and 300 m²/g or less. When the BET specific surface area is 100 m²/g or greater, the pre-doping amount of alkali metal ions can be sufficiently increased, and thereby the thickness of the negative electrode active material layer can be made thinner. Moreover, when the BET specific surface area is 350 m²/g or less, the coatability of the negative electrode active material layer is excellent.

The initial charge capacity obtained when the composite carbon material was charged with a constant current of 0.5 mA/cm² at a measurement temperature of 25° C. until the voltage reached 0.01V by using a lithium metal as a counter electrode and then charged with a constant voltage until the current value reached 0.01 mA/cm², is preferably 300 mAh/g or greater and 1600 mAh/g or less, more preferably 400 mAh/g or greater and 1,500 mAh/g or less, and still more preferably 500 mAh/g or greater and 1,450 mAh/g or less, per unit weight of the composite carbon material. When the initial charge capacity is 300 mAh/g or greater, the pre-doping amount of the alkali metal ion can be sufficiently increased, and thereby high output characteristics can be obtained even when the negative electrode active material layer is made thinner. Further, when the initial charge capacity is 1,600 mAh/g or less, the swelling and shrinkage of the composite carbon material when doping and undoping the composite carbon material with alkali metal ions, is reduced, and the strength of the negative electrode is maintained.

In order to obtain a favorable internal resistance value, the negative electrode active material described above is particularly preferably a composite porous material satisfying the following both conditions (1) and (2).

(1) The mesopore volume $Vm_1$ (cc/g) (the volume of fine pores having a diameter of 2 nm or larger and 50 nm or smaller) calculated by the aforementioned BJH method satisfies the condition $0.01 \leq Vm_1 < 0.10$.

(2) The micropore volume $Vm_2$ (cc/g) (the volume of fine pores having a diameter of smaller than 2 nm) calculated by the MP method described above satisfies the condition $0.01 \leq Vm_2 < 0.30$.

The negative electrode active material is preferably in particulate form. The particle diameter of the aforementioned silicon, silicon oxide, silicon alloys, silicon compounds, tin and tin compounds is 0.1 μm or larger and 30 μm or smaller. When the particle diameter is 0.1 μm or larger, the contact area with the electrolytic solution is increased to enable to reduce the resistance of the nonaqueous lithium electric storage element. Moreover, when the particle diameter is no larger than 30 μm, the swelling and shrinkage of the negative electrode due to doping and undoping of lithium ions to the negative electrode accompanied by charge/discharge, is small and the strength of the negative electrode is maintained.

The aforementioned silicon, silicon oxide, silicon alloy and silicon compound, and tin and tin compound can be micronized by pulverization by using a jet mill with a classifier, a stirring ball mill, etc. The pulverizer is provided with a centrifugal classifier, and micronized particles pulverized under an inert gas environment such as nitrogen or argon, etc., can be collected by a cyclone or a dust collector.

The content proportion of the negative electrode active material in the negative electrode active material layer of the negative electrode precursor is preferably 70% by weight or greater and more preferably 80% by weight or greater, based on the total weight of the negative electrode active material layer.

(Optional Component of Negative Electrode Active Material Layer)

The negative electrode active material layer according to the present embodiment may comprise, if necessary, optional components such as a binder, conductive filler, dispersion stabilizer, etc., in addition to the negative electrode active material.

For example, polyvinylidene difluoride (PVdF), polytetrafluoroethylene (PTFE), fluorine rubber, latex, an acrylic polymer, etc., may be used for the binder. The amount of binder used in the negative electrode active material layer is preferably 3 parts by weight to 25 parts by weight and more preferably 5 parts by weight to 20 parts by weight with respect to 100 parts by weight of the negative electrode active material. When the amount of binder is nor more than 3 parts by weight, the adhesion between the current collector in the negative electrode (precursor) and the negative electrode active material layer cannot be sufficiently secured, and the interfacial resistance between the current collector and the active material layer is increased. On the other hand, when the amount of binder is greater than 25 parts by weight, the surface of the active material of the negative electrode (precursor) is excessively covered with the binder, which increases the diffusion resistance of ions inside fine pores of the active material.

The conductive filler described above preferably consist of a conductive carbonaceous material having a higher conductivity than the negative electrode active material. Such a conductive filler is preferably, for example, Ketjen black, acetylene black, vapor grown carbon fibers, graphite, carbon nanotubes, as well as mixtures thereof, etc.

The mixed amount of conductive filler in the negative electrode active material layer is preferably not greater than 20 parts by weight and more preferably in the range of 1 to 15 parts by weight with respect to 100 parts by weight of the negative electrode active material. The conductive filler is preferably mixed from the viewpoint of a high input. However, as the amount of the conductive filler mixed is greater than 20 parts by weight, the content proportion of the negative electrode active material in the negative electrode active material layer becomes less, and the energy density per volume of the negative electrode active material layer is reduced, which is not preferred.

[Negative Electrode Current Collector]

The material constituting the negative electrode current collector of the present embodiment is preferably a metal foil with high electron conductivity and without degradation by elution into the electrolytic solution or reaction with the electrolyte or ion, etc. There are no particular restrictions on such metal foils which include, for example, aluminum foils, copper foils, nickel foils, stainless steel foils, etc. The negative electrode current collector in the nonaqueous lithium electric storage element of the present embodiment is preferably a copper foil. The metal foil may be a metal foil without ruggedness or through-holes, or it may be a metal foil having ruggedness formed by embossing, chemical etching, electrolytic deposition or blasting, etc., or it may be a metal foil having through-holes, such as an expanded metal, punching metal or etching foil, etc.

The thickness of the negative electrode current collector is not particularly restricted provided that it allows the shape and strength of the negative electrode to be maintained, but 1 to 100 μm, for example, is preferred.

[Production of Negative Electrode]

The negative electrode comprises a negative electrode active material layer on one or both sides of a negative electrode current collector. According to a typical mode, the negative electrode active material layer is anchored to the negative electrode current collector.

The negative electrode can be produced by publicly known electrode production techniques for lithium ion batteries or electrical double layer capacitors, etc. For example, different materials containing a negative electrode active material may be dispersed and dissolved in water or an organic solvent to prepare a slurry-like coating liquid, and one or both sides of the negative electrode current collector is coated with the coating liquid to form a coating film, which is dried to obtain a negative electrode. The obtained negative electrode may also be pressed to adjust the thickness or bulk density of the negative electrode active material layer.

The thickness of the negative electrode active material layer is preferably 10 μm or thicker and 70 μm or thinner and more preferably 20 μm or thicker and 60 μm or thinner. When the thickness is 10 μm or thicker, a favorable charge/discharge capacity can be produced. When the thickness is 70 μm or thinner, the cell volume can be reduced and the energy density can be increased. When the negative current collector has pores, the thickness of the negative electrode active material layer refers to an average value per one side of the portion without pores of the current collector.

<Separator>

The positive electrode precursor and negative electrode may be laminated or wound via a separator, to form an electrode laminated body or electrode wound body comprising a positive electrode precursor, negative electrode and separator.

The separator used may be a polyethylene microporous membrane or polypropylene microporous membrane used in lithium ion secondary batteries or a cellulose nonwoven sheet used in electrical double layer capacitors, etc. A film composed of organic or inorganic microparticles may also be laminated on one or both sides of these separators. Moreover, organic or inorganic microparticles may also be included inside a separator.

The thickness of the separator is preferably 5 μm or greater and no greater than 35 μm. The thickness is preferably 5 μm or greater, as this will tend to reduce self-discharge due to internal micro short-circuit. The thickness is also preferably no greater than 35 μm, on the other hand, as this will tend to result in a higher output characteristic of the electric storage element.

Moreover, the thickness of a film composed of organic or inorganic microparticles is preferably 1 μm or greater and no greater than 10 μm. The thickness of a film composed of organic or inorganic microparticles of 1 μm or greater is preferred, as this will tend to reduce self-discharge due to internal micro short-circuit. The thickness no greater than 10 μm is also preferred as this will tend to result in a higher output characteristic of the electric storage element.

<Casing>

A metal can or laminated film, etc., can be used for the casing. The metal can is preferably an aluminum can. The metal can may be in the form of, for example, a quadrate, circular, cylinder shape, etc. The laminated film is preferably a film obtained by laminating a metal foil and resin film, and an example of the laminate film is that having a three-layer configuration consisting of an outer layer resin film, metal foil and inner resin film. The outer layer resin film serves to prevent the metal foil from being damaged by contact, etc., and a resin such as nylon or polyester, etc., can be used preferably. The metal foil is for preventing permeation of moisture and gas, and aluminum foil or stainless steel foil, etc., can be used preferably. Moreover, the inner resin film protects the metal foil from the nonaqueous electrolytic solution housed therein while also serving to melt-seal the casing during heat-sealing, and polyolefin or acid-modified polyolefin, etc., can be used preferably.

[Electrolytic Solution]

The electrolytic solution in the present embodiment is a nonaqueous electrolytic solution. Namely, the nonaqueous electrolytic solution contains an alkali metal salt of 0.5 mol/L or greater based on the total amount of the nonaqueous electrolytic solution, and i.e., the nonaqueous electrolytic solution contains an alkali metal salt as an electrolyte. The nonaqueous solvent contained in the nonaqueous electrolytic solution include, for example, cyclic carbonates represented by ethylene carbonate, propylene carbonate, etc., and linear carbonates represented by dimethyl carbonate, diethyl carbonate, ethyl methyl carbonate, etc.

As electrolyte salts containing an alkali metal ion dissolved in such a nonaqueous solvent as described above, MFSI, MBF4, MPF$_6$, etc., can be used, where M denotes Li, Na, K, Rb or Cs. The nonaqueous electrolytic solution in the present embodiment may contain at least one or more alkali metal ions, and may contain two or more alkali metal salts, or may contain alkaline earth metal salts selected from alkali metal salts and beryllium salts, magnesium salts, calcium salts, strontium salts, and barium salts. When the nonaqueous electrolytic solution contains two or more alkali metal salts, the presence of cations having different Stokes radii in the nonaqueous electrolytic solution can inhibit an increase in viscosity at lowered temperatures, which improves the lowered temperature characteristics of the nonaqueous lithium electric storage element. When the nonaqueous electrolytic solution contains an alkaline earth metal ion other than the alkali metal ions described above, the capacity of the nonaqueous lithium electric storage element can be increased since beryllium ion, magnesium ion, calcium ion, strontium ion, and barium ion are divalent cations.

There are no particular restrictions on a method of containing two or more of the alkali metal salts described above in the nonaqueous electrolytic solution or a method of containing the alkali metal salt and alkaline earth metal salt in the nonaqueous electrolytic solution, but alkali metal salts consisting of two or more types of alkali metal ions may be preliminarily dissolved in the nonaqueous electrolytic solution, and an alkali metal salt and an alkaline earth metal salt may be dissolved in the nonaqueous electrolytic solution. Moreover, a method of containing in the nonaqueous electrolytic solution one or more compounds from among the following formulas:

carbonates such as $M_2CO_3$, etc., oxides such as $M_2O$, etc., hydroxides such as MOH, etc., halides such as MF or MCl, etc., carboxylates such as RCOOM wherein in the formula, R is H, an alkyl group or an aryl group, etc., where M denotes one or more selected from Na, K, Rb, and Cs, and/or one or more of alkaline earth metal carbonates selected from among $BeCO_3$, $MgCO_3$, $CaCO_3$, $SrCO_3$ or $BaCO_3$, and alkaline earth metal oxides, alkaline earth metal hydroxides, alkaline earth metal halides, and alkaline earth metal carboxylates, and decomposing them during the pre-doping step as will be described below, etc., are included.

The electrolyte salt concentration in the nonaqueous electrolytic solution is preferably 0.5 to 2.0 mol/L. When the salt concentration is 0.5 mol/L or greater, anions will be sufficiently present to allow sufficiently the electric storage element to maintain the capacity thereof. When the salt concentration is 2.0 mol/L or lower, on the other hand, the salt sufficiently dissolves in the nonaqueous electrolytic solution and the appropriate viscosity and conductance of the electrolytic solution is maintained.

When two or more of the alkali metal salts are contained in the nonaqueous electrolytic solution or the alkali metal salt and alkali earth metal salt are contained therein, the total value of these salt concentrations is preferably 0.5 mol/L or greater and more preferably in the range of 0.5 to 2.0 mol/L.

<Production Method of Nonaqueous Lithium Electric Storage Element>

[Assembly Step: Fabrication of Electrode Body]

In one embodiment of the assembly step, for example, the electrode laminated body is fabricated by connecting a positive electrode terminal and a negative electrode terminal to a laminated body obtained by laminating a positive electrode precursor and negative electrode cut into the form of sheets with a separator interposed therebetween. In another embodiment, the electrode wound body may be fabricated by connecting a positive electrode terminal and a negative electrode terminal to a wound body obtained by winding a positive electrode precursor and negative electrode with a separator interposed therebetween. The shape of the electrode wound body may be a cylindrical shape or a flat type.

There are no particular limitations on the method used to connect the positive electrode terminal and negative electrode terminal and, a method such as resistance welding or ultrasonic welding may be employed.

The residual solvent is preferably removed by drying the electrode body (electrode laminated body or electrode wound body) to which the terminals are connected. The drying method is not limited but drying can be carried out by vacuum-drying, etc. The amount of the residual solvent is preferably 1.5% by weight or less based on the total weight of the positive electrode active material layer or the negative electrode active material layer. When the residual solvent is greater than 1.5% by weight, the solvent remains in the system, and the self-discharge characteristic is deteriorated, which is not preferable.

The dried electrode body is preferably housed into a casing represented by a metal can or laminated film in a dry air environment at a dew point of −40° C. or lower and sealed leaving one opening portion for injecting the non-aqueous electrolytic solution. When the dew point is higher than −40° C., moisture adheres on the electrode and water remains in the system, which deteriorates the self-discharge characteristic and is not preferred. The method for sealing the casing is not particularly restricted, and methods such heat sealing and impulse sealing, etc., may be applied.

[Solution Injection, Impregnation and Sealing Steps]

Following completion of the assembly step, the nonaqueous electrolytic solution is injected into the electrode body housed in the casing. Following completion of this solution injection step, further impregnation is preferably carried out to thoroughly immerse the positive electrode, negative electrode and separator in the nonaqueous electrolytic solution. In the state in which at least a portion of the positive electrode, negative electrode and separator is immersed in the nonaqueous electrolytic solution, the alkali metal doping proceeds unevenly in the alkali metal doping step to be subsequently described, and resistance of the resulting nonaqueous lithium electric storage element increases or durability thereof decreases. There are no particular limitations on the method used for the aforementioned impregnation, and for example, a method that can be used consists of installing the electrode body in pressure reduction chamber following injection of electrolytic solution with the casing left open, reducing pressure inside the chamber by using a vacuum pump, and then returning the pressure inside the chamber to atmospheric pressure, etc. Following completion of the impregnation step, the electrode body with the casing open is sealed while reducing pressure to seal inside the casing.

[Alkali Metal Doping Step]

In the alkali metal doping step, the negative electrode active material layer is preferably pre-doped with alkali metal ions by decomposing the alkali metal compound in the positive electrode precursor by applying a voltage between the positive electrode precursor and negative electrode to release alkali metal ions followed by reducing alkali metal ions at the negative electrode.

In the alkali metal doping step, gas such as $CO_2$, etc., is generated accompanying oxidative decomposition of the alkali metal compound in the positive electrode precursor. Consequently, when applying a voltage, it is preferable to devise a means for releasing the generated gas outside the casing. Such means include, for example, a method consisting of applying voltage with a portion of the casing open, and a method consisting of applying voltage with a suitable gas release means such as a gas venting valve or gas-permeable film, etc., installed in a portion of the casing, etc.

[Aging Step]

Aging is preferably carried out on the electrode body following completion of the alkali metal doping step. Solvent present in the nonaqueous electrolytic solution is decomposed at the negative electrode in the aging step, and a solid polymer coating layer that is permeable to alkali metal ions is formed on the surface of the negative electrode.

There are no particular limitations on the aging method, and for example, a method consisting of allowing the solvent present in the nonaqueous electrolytic solution to react in an elevated temperature environment, etc., can be used.

[Gas Venting Step]

Following completion of the aging step, gas venting is preferably carried out to reliably remove gas remaining in the nonaqueous electrolytic solution, positive electrode and negative electrode. In a state in which gas remains in at least a portion of the nonaqueous electrolytic solution, positive electrode and negative electrode, resistance of the resulting nonaqueous lithium electric storage element ends up increasing due to prevention of ion conduction.

There are no particular limitations on the method used to carry out the gas venting, and a method that can be used consists of installing the electrode body in a pressure reduction chamber with the casing left open and then reducing pressure inside the chamber by using a vacuum pump, etc. Following completion of the gas venting, a nonaqueous lithium electric storage element can be fabricated by sealing the casing to seal inside the casing.

<Characteristic Evaluation of Nonaqueous Lithium Electric Storage Element>

[Electrostatic Capacitance]

In the present description, the electrostatic capacitance Q (Ah) refers to a value obtained by the following method:

First, a cell corresponding to the nonaqueous lithium electric storage elements is charged with a constant current charge at a current value of 2 C until the voltage reaches 4.0 V in a thermostatic bath set to 25° C., and then charged with application of a constant voltage of 4.0 V for a total of 30 minutes. Subsequently, the capacitance obtained when it is discharged down to 2.2 V with a constant current discharge at a current value of 2 C, refers to Q (Ah).

Here, the discharge rate of the current (also referred to as "C rate") is a relative ratio of the current at the time of discharge to the discharge capacity. In general, when carrying out a constant current discharge from the upper limit voltage to the lower limit voltage, the current value at which the discharge is completed within 1 hour, is referred to as 1C. In the present description, the current value at which the discharge is completed in 1 hour when a constant current discharge is carried out from the upper limit voltage of 4.0 V to the lower limit voltage of 2.2 V, is defined as 1C.

[Internal Resistance]

In the present description, internal resistance Ra (Ω) refers to the value obtained according to the method indicated below.

First, a cell corresponding to the nonaqueous lithium electric storage element is charged with a constant current charge at a current value of 20 C until reaching 4.0 V in a thermostatic chamber set to 25° C., and subsequently charged with a constant voltage charge by applying a constant voltage of 4.0 V for a total of 30 minutes. Continuing, it is discharged down to 2.2 V with a constant current discharge at a current value of 20 C to obtain a discharging curve (time vs. voltage) under the sampling intervals of 0.05 seconds. The internal resistance is the value calculated from equations consisting of voltage drop ΔE=4.0−Eo, and Ra=ΔE/(current value of 20 C) when the voltage at a discharge time of 0 seconds, obtained by extrapolating by linear approximation from the voltages at discharge times of 1 second and 2 seconds in the discharging curve, is defined as Eo.

(High-Load Charge/Discharge Cycle Test)

Throughout the present specification, the resistance change ratio after high-load charge/discharge cycle test is measured by the following method.

(Resistance Change Ratio after High-Load Charge/Discharge Cycle Test)

First, in a thermostatic bath set to 25° C., a cell corresponding to the nonaqueous lithium electric storage element is charged with a constant current charge at the 200 C current value until 3.8 V is reached, and then discharged with a constant current discharge at the 200 C current value until 2.2 V is reached. The high-load charge/discharge cycle is repeated 60,000 times followed by measurement of the internal resistance after completion of the high-load charge/discharge cycle test Rb according to the aforementioned measurement method of internal resistance. Rb/Ra is defined as a resistance change ratio after the high-load charge/discharge cycle.

The resistance change ratio after the high-load charge/discharge cycle test Rb/Ra is preferably 2.0 or less, more preferably 1.5 or less, and further preferably 1.2 or less. When the resistance increase ratio after the high-load charge/discharge cycle test is 2.0 or less, the characteristics of the nonaqueous lithium electric storage element are maintained even after the charge/discharge are repeated. Therefore, excellent input/output characteristics can be stably obtained for a long period of time, which leads to longevity of the nonaqueous lithium electric storage element. The lower limit of Rb/Ra is preferably 0.9 or greater.

[Micro Short-Circuit Inspection Test]

In the present description, the micro short-circuiting of the nonaqueous lithium electric storage element is determined by the following method.

First, a voltage of an electrode body is adjusted to 3.5 V by the procedure where the cell was discharged with a constant current discharge at a current value of 100 mA until 2.5 V was reached, further charged with a constant current of 100 mA until a voltage of 3.5 V was reached, and subsequently charged continuously with a constant voltage of 3.5 V for 2 hours. Thereafter, the electrode body is allowed to stand undisturbed for one week in a thermostat set at 25° C. while being pressurized at a pressure of 10 kPa, and a state of a voltage dropping to 3.0 V or lower is judged as micro short-circuiting.

<Quantification of Carbon Material, Lithium Transition Metal Oxide, and Alkali Metal Compound in Positive Electrode Active Material Layer of Positive Electrode Precursor>

The method of quantifying the weight ratio $A_1$ of the carbon material contained in the positive electrode active material layer of the positive electrode precursor, the weight ratio $A_2$ of the lithium transition metal oxide, and the weight ratio $A_3$ of the alkali metal compound, are not particularly limited and, for example, can be determined by the following method.

The area of the positive electrode precursor to be measured is not particularly limited but is preferably 5 cm$^2$ or greater and 200 cm$^2$ or less and more preferably 25 cm$^2$ or more and 150 cm$^2$ or less, from the viewpoint of reducing measurement variations. When the area is 5 cm$^2$ or greater, measurement reproducibility is ensured. When the area is 200 cm$^2$ or less, the sample is excellent in handleability.

First, the positive electrode precursor is cut into the area described above and dried under vacuum. The conditions for vacuum drying are preferably such that the residual water content in the positive electrode precursor is 1% by weight or less in the ranges of a temperature of 100 to 200° C., pressure of 0 to 10 kPa, and time of 5 to 20 hours. The remaining amount of water can be determined by a Karl Fischer method.

The weight of the positive electrode precursor obtained after vacuum drying ($M_{0A}$) is measured. Subsequently, it is thoroughly immersed for 3 days or longer in distilled water at a 100- to 150-fold amount with respect to the weight of the positive electrode precursor to elute the alkali metal compound in the water. During the immersion, the vessel is preferably capped so that the distilled water does not volatilize off. After the immersion for 3 days or longer, the positive electrode precursor is taken out from the distilled water, and similarly vacuum-dried. The weight of the obtained positive electrode precursor ($M_{1A}$) is measured and the positive electrode active material layer, with which one side or both sides of the positive electrode current collector are coated, is removed off by using a spatula, brush, bristles, etc. The weight of the remaining positive electrode current collector $M_{2A}$ is measured and the weight proportion of the alkali metal compound $A_3$ is determined by the following equation (1).

$$A_3=(M_{0A}-M_{1A})/(M_{0A}-M_{2A})\times100 \tag{1}$$

In order to calculate $A_1$ and $A_2$, a TG curve is subsequently measured for the positive electrode active material layer obtained by removing the alkali metal compound under the following conditions.

Sample pan: platinum
Gas: under air atmosphere or compressed air
Temperature-elevating rate: 0.5° C./min or less
Temperature range: 25° C. to 500° C. or higher and the melting point of lithium transition metal oxide minus 50° C. or lower.

The weight at 25° C. in the obtained TG curve refers to $M_{3A}$, and the weight at the first temperature at which the weight reduction rate is $M_{3A}\times0.01$/min or less at a temperature of 500° C. or higher, is determined as $M_{4A}$.

All the carbon materials are oxidized and burned by heating them at a temperature of 500° C. or lower under an oxygen-containing atmosphere (for example, an air atmosphere). The weight of the lithium transition metal oxide, on the other hand, is not decreased up to the melting point of the lithium transition metal oxide minus 50° C. even in the oxygen-containing atmosphere. Therefore, the content $A_2$ of the lithium transition metal oxide in the positive electrode active material layer can be calculated by the following equation (2).

$$A_2=(M_{4A}/M_{3A})\times\{1-(M_{0A}-M_{1A})/(M_{0A}-M_{2A})\}\times100 \tag{2}$$

Moreover, the content $A_1$ of the carbon material in the positive electrode active material layer can be calculated by the following equation (3).

$$A_1=\{(M_{3A}-M_{4A})/M_{3A}\}\times\{1-(M_{0A}-M_{1A})/(M_{0A}-M_{2A})\}\times100 \tag{3}$$

Incidentally, when a plurality of alkali metal compounds are contained in the positive electrode active material layer; when oxides such as $M_2O$, etc., hydroxides such as MOH, etc., halides such as MF, MCl, etc., oxalates such as $M_2(CO_2)_2$, etc., or carboxylates such as RCOOM wherein in the formula, R is H, an alkyl group or an aryl group, etc., where M denotes one or more selected from among Na, K, Rb and Cs in the above formulae, are contained in addition to the alkali metal compound; and when the positive electrode active material layer contains alkaline earth metal carbonates selected from among $BeCO_3$, $MgCO_3$, $CaCO_3$, $SrCO_3$ and $BaCO_3$, or alkaline earth metal oxides, alkaline earth metal hydroxides, alkaline earth metal halides, alkaline earth metal oxalates or alkaline earth metal carboxylates, the total amount thereof is calculated as the amount of the alkali metal compound.

When the positive electrode active material layer contains a conductive material, binder, thickener, etc., the total amount of the carbon materials and these materials is calculated as $A_1$.

<Quantification of Carbon Material, Lithium Transition Metal Oxide, and Alkali Metal Compound in Positive Electrode Coating Liquid>

The method of quantifying the weight ratio $X_1$ of the carbon material contained in the positive electrode coating liquid, the weight ratio $X_2$ of the lithium transition metal oxide, and the weight ratio $X_3$ of the alkali metal compound is not particularly limited and can be quantified by the following method.

The weight of the positive electrode coating liquid to be measured is not particularly limited, but is preferably 10 g or greater and 100 g or less from the viewpoint of reducing measurement variations. When the weight is 10 g or greater, measurement reproducibility is ensured. When the weight is 100 g or less, the sample is excellent in handleability.

First, the positive electrode coating liquid is heated at a temperature of 200° C. or lower by using a hot plate, thermobalance, hot air dryer, TG measurement apparatus, etc., and dried by evaporating the dispersion solvent to obtain a powder containing the carbon material, lithium transition metal oxide, and the alkali metal compound. The obtained powder may be further dried under vacuum as necessary, and dried until the residual water content in the obtained powder becomes 1% by weight or less. The remaining amount of water can be determined by a Karl Fischer method. Thereafter, the weight of this powder $M_{1X}$ is measured. Then, this powder is immersed in distilled water at a 100-fold amount with respect to $M_{1X}$ and stirred for 24 hours in a 25° C. environment. Thereafter, the aqueous solution is filtered, and the residue that is a mixture of the carbon material and the lithium transition metal oxide, is dried until the water content becomes 1% or less, and the weight $M_{2X}$ is measured. The weight ratio $X_3$ of the alkali metal compound is calculated from equation (4).

$$X_3 = (M_{1X} - M_{2X})/M_{1X} \times 100 \tag{4}$$

According to the calculation method of $A_2$ and $A_3$ described above, the corresponding $M_{3X}$ and $M_{4X}$ each are measured, and $X_2$ and $X_1$ are calculated from equations (5) and (6).

$$X_2 = (M_{4X}/M_{3X}) \times \{1 - (M_{1X} - M_{2X})/M_{1X}\} \times 100 \tag{5}$$

$$X_1 = \{(M_{3X} - M_{4X})/M_{3X}\} \times \{1 - (M_{1X} - M_{2X})/M_{1X}\} \times 100 \tag{6}$$

<Quantification of Carbon Material, Lithium Transition Metal Oxide, and Alkali Metal Compound in Positive Electrode Active Material Layer of Positive Electrode>

The method of quantifying the weight proportion $Y_1$ of the carbon material contained in the positive electrode active material layer of the positive electrode, the weight proportion $Y_2$ of the lithium transition metal oxide, and the weight proportion $Y_3$ of the alkali metal compound is not particularly limited, and can be quantified by the following method.

The nonaqueous lithium electric storage element in which the voltage has been adjusted to 2.9 V is disassembled in an argon box to take out the electrode laminated body, and the positive electrode is cut out from the electrode laminated body and washed with an organic solvent. The organic solvent used for washing is not particularly restricted, and may be any solvent that can remove the decomposed products of the electrolytic solution deposited on the positive electrode surface, and the use of an organic solvent having a lithium compound solubility of 2% or less inhibits elution of the lithium compound. Such an organic solvent includes polar solvents, for example, methanol, ethanol acetone, methyl acetate, etc., and is suitable for use. The area of the positive electrode to be measured is not particularly restricted, but from the viewpoint of reducing measurement variation it is preferably 5 $cm^2$ or larger and 200 $cm^2$ or smaller and more preferably 25 $cm^2$ or larger and 150 $cm^2$ or smaller. Measurement reproducibility can be ensured when the area is at least 5 $cm^2$. The handleability of the sample will be excellent when the area is no greater than 200 $cm^2$.

According the quantification method of $A_1$, $A_2$, and $A_3$ described above, the corresponding $M_{1Y}$, $M_{2Y}$, $M_{3Y}$ and $M_{4Y}$ are measured and $Y_1$, $Y_2$, and $Y_3$ are determined by equations (7), (8), and (9).

$$Y_3 = (M_{0Y} - M_{1Y})/(M_{0Y} - M_{2Y}) \times 100 \tag{7}$$

$$Y_2 = (M_{4Y}/M_{3Y}) \times \{1 - (M_{0Y} - M_{1Y})/(M_{0Y} - M_{2Y})\} \times 100 \tag{8}$$

$$Y_1 = \{(M_{3Y} - M_{4Y})/M_{3Y}\} \times \{1 - (M_{0Y} - M_{1Y})/(M_{0Y} - M_{2Y})\} \times 100 \tag{9}$$

<Quantification Method of Alkali Metal Compound>

The method of quantifying the alkali metal compound contained in the positive electrode precursor, positive electrode coating liquid, and positive electrode is not particularly limited, and, for example, can be quantified by the following method. The quantification method of the alkali metal compound is preferably combined with a plurality of analysis methods described below.

When the alkali meal compound cannot be identified by the analysis method, solid-state $^7$Li-NMR, XRD (X-ray diffraction), TOF-SIMS (Time-Of-Flight Secondary Ion Mass Spectrometry), AES (Auger Electron Spectroscopy), TPD/MS (Temperature Programmed Desorption-Mass Spectrometry), DSC (Differential Scanning Calorimetry), etc., may be used as an alternative analysis method to identify the alkali metal compound.

[Microscopic Raman Spectroscopy]

The alkali metal carbonate salt and the positive electrode active material can be discriminated by Raman imaging of the carbonate ion on the positive electrode precursor surface measured at an observational magnification of 1000-4000×. The measuring conditions may be, for example, an excitation light of 532 nm, an excitation light intensity of 1%, 50× long working of objective lens, a diffraction grating of 1800 gr/mm, point scanning as the mapping system (slit: 65 mm, binning: 5 pix), a 1 mm step, an exposure time per point of 3 seconds, a number of scans of 1, and with a noise filter. For the measured Raman spectrum, a straight baseline is set in the range of 1071 to 1104 $cm^{-1}$, a value positive from the baseline is considered a carbonate ion peak, and the area is calculated and the frequency is estimated, but the frequency of the noise component with respect to the area of the carbonate ion peak approximated by a Gaussian function is subtracted from the carbonate ion frequency distribution.

[X-Ray Photoelectron Spectroscopy (XPS)]

The electronic state of the alkali metal compound can be analyzed by XPS to discriminate the bonded state of the compound. The measuring conditions may be, for example, monochromatized AlKα as the X-ray source, an X-ray beam diameter of 100 μmφ (25 W, 15 kV), narrow scan for path energy: 58.70 eV, with charge neutralization, narrow scan for sweeping: 10 times (carbon, oxygen), 20 times (fluorine), 30 times (phosphorus), 40 times (lithium), 50 times (silicon), narrow scan for energy step: 0.25 eV. The surface of the positive electrode is preferably cleaned by sputtering before XPS measurement. As the sputtering conditions, cleaning of the positive electrode surface may be carried out, for example, with an acceleration voltage of 1.0 kV, and for 1 minute in a range of 2 mm×2 mm (1.25 nm/min as $SiO_2$).

In the obtained XPS spectrum, the following assignments may be made:

For Li1s bond energy, peaks having a bond energy of 50 to 54 eV as $LiO_2$ or Li—C bond,
and peaks of 55 to 60 eV as LiF, $Li_2CO_3$, and $Li_xPO_yF_z$ wherein, in the formula, x, y and z are integers of 1 to 6, for C1s bond energy, a peak of 285 eV as C—C bond, a peak of 286 eV as C—O bond, a peak of 288 eV as COO, and peaks of 290 to 292 eV as $CO_3^{2-}$ and C—F bond, for O1s bond energy, a peak of 527 to 530 eV as $O^{2-}$ ($Li_2O$), peaks of 531 to 532 eV as CO, $CO_3$, OH, $PO_x$ wherein in the formula, x is an integer of 1 to 4, and $SiO_x$ wherein in the formula, x is an integer of 1 to 4, and peaks of 533 eV as C—O and $SiO_x$ wherein in the formula, x is an integer of 1 to 4, for F1s bond energy, a peak of 685 eV as LiF, and peaks of 687 eV as C—F bond, $Li_xPO_yF_z$ wherein in the formula, x, y and z are integers of 1 to 6, and $PF_6^-$, for P2p bond energy, peaks of 133 eV as $PO_x$ wherein in the formula, x is an integer of 1 to 4, and peaks of 134 to 136 eV as $PF_x$ wherein in the formula, x is an integer of 1 to 6, and for Si2p bond energy, peaks of 99 eV as Si and silicide, and peaks of 101 to 107 eV as $Si_xO_y$ wherein in the formula, x and y are any integers.

When peaks overlap in the obtained spectrum, the spectrum is preferably assigned upon separating the peaks with the assumption of a Gaussian function or Lorentz function. The alkali metal compound that is present can be identified based on the obtained results of measuring the electronic state, and the existing element ratio.

[Ion Chromatography]

A carbonate ion eluted in water can be identified by washing the positive electrode precursor or positive electrode with distilled water and analyzing the water washing fluid by ion chromatography. The columns used may be an ion-exchange type, ion exclusion type and reversed-phase ion pair type. The detector used may be an electric conductance detector, ultraviolet-visible absorption intensity detector or electrochemical detector, etc., and a suppressor system with a suppressor installed before the detector, or a non-suppressor system without installation of a suppressor by using a solution with low electric conductance as the eluent, may be used. Moreover, the measurement can also be carried out by combining a mass spectrometer or a charged particle detector with a detector.

The sample holding time is the same for each ion species component when the conditions such as the column, eluent used are fixed while the size of the peak response differs for each ion species but is proportional to the concentration. By premeasuring standard solutions of known concentrations with ensured traceability, it is possible to qualitatively and quantitatively analyze the ion species components.

<Alkali Metal Element Quantitation Method: ICP-MS>

The alkali metal compound as a measuring sample is decomposed by using a strong acid such as concentrated nitric acid, concentrated hydrochloric acid or aqua regalis, and the obtained solution is diluted with purified water to an acid concentration of 2% to 3%. The acid decomposition may be decomposition with appropriate heating and pressure. The obtained diluted solution is analyzed by ICP-MS, during which time it is preferred to add an element of known amount as an internal standard. When the alkali metal element to be measured is at a concentration above the measurable limit, it is preferably further diluted while maintaining the acid concentration of the diluted solution. Each element can be quantified from the obtained measurement results, based on the preliminarily prepared calibration curve by using a standard solution for chemical analysis.

[Application of Nonaqueous Lithium Electric Storage Element]

An electric storage module can be fabricated by comprising the nonaqueous lithium electric storage element according to the present embodiment. For example, a plurality of nonaqueous lithium electric storage elements according to the present embodiment may be connected in series or in parallel to fabricate the desired electric storage module.

Since the electric storage module according to the present embodiment can achieve high input/output characteristics as well as safety at elevated temperatures, they may be suitably utilized in a power regeneration assist system, power load-leveling system, uninterruptible power supply system, contactless power supply system, energy harvesting systems, electric storage system, solar power generation and storage system, electric power steering system, emergency power supply system, in-wheel motor system, idling stop system, rapid charging system, smart grid system, etc.

The electric storage system is suitably used for natural power generation such as solar power generation or wind power generation, etc., the power load-leveling system is suitably used for micro grid, etc., the uninterruptible power supply system is suitably used for factory production facilities, etc., respectively. In the non-contact power supply system, the nonaqueous lithium electric storage element is utilized for leveling voltage fluctuations of microwave transmission or electric field resonance, etc., and in an energy harvesting system, the nonaqueous lithium electric storage element is suitably utilized in order to use the electric power generated by vibration power generation, etc., respectively.

In an electric storage system, as a cell stack, a plurality of nonaqueous lithium electric storage elements are connected in series or in parallel, or a nonaqueous lithium electric storage element and a lead-acid battery, a nickel metal hydride battery, a lithium ion secondary battery or a fuel cell are connected in series or in parallel.

Moreover, since the nonaqueous lithium electric storage element according to the present embodiment can achieve both high input/output characteristics and safety at elevated temperatures, it can be installed in, for example, vehicles such as electric vehicles, plug-in hybrid vehicles, hybrid vehicles, electric motorcycles, etc. The power regeneration assist system, electric power steering system, emergency power supply system, in-wheel motor system, idling stop system, or a combination thereof is suitably installed on vehicles.

EXAMPLES

The invention will now be explained in greater detail by way of Examples and Comparative examples, with the understanding that the invention is not limited to the examples.

Example 1

<Preparation of Positive Electrode Active Material>

Preparation Example 1a

A carbide was obtained by subjecting crushed coconut shell carbide to carbonization treatment for 3 hours at 500° C. in a compact carbonization furnace in the presence of nitrogen. The resulting carbide was placed in an activation furnace and steam was introduced into the aforementioned activation furnace at the rate of 1 kg/hr while in a warmed state to activate the carbide by raising the temperature to 900° C. over the course of 8 hours. The carbide was removed following activation and cooled in a nitrogen atmosphere to obtain activated carbon. The resulting activated carbon was washed by rinsing with water for 10 hours and then allowed to drain. Subsequently, after drying for 10 hours in an electric dryer held at a temperature of 115° C., pulverization was carried out for 1 hour with a ball mill to obtain activated carbon 1.

Measurement of mean particle diameter of this activated carbon 1 by using a laser diffraction-type particle size distribution measurement apparatus (SALD-2000J) manufactured by Shimadzu Corp. yielded a value of 5.5 μm. Moreover, fine pore size distribution of activated carbon 1 was measured by using a fine pore size distribution measurement apparatus (AUTOSORB-1 AS-1-MP) manufactured by Yuasa Ionics Co., Ltd. As a result, BET specific surface area was 2360 m$^2$/g, mesopore volume ($V_1$) was 0.52 cc/g, micropore volume ($V_2$) was 0.88 cc/g, and $V_1/V_2$=0.59.

Preparation Example 2a

A carbide having a mean particle diameter of 7 μm was obtained by carrying out carbonization treatment on a phenol resin for 2 hours at 600° C. in a calcination furnace in a nitrogen atmosphere followed by pulverization with a ball mill and classification. KOH was mixed with the obtained carbide at a weight ratio of 1:5 followed by activation by heating for 1 hour at 800° C. in the calcination furnace in a nitrogen atmosphere. The activated carbide was taken out, stirred and washed for 1 hour in dilute hydrochloric acid adjusted to 2 mol/L, and the carbide was washed by boiling in distilled water until the pH stabilized between 5 and 6 and then dried to obtain activated carbon 2.

Measurement of mean particle diameter of this activated carbon 2 by using a laser diffraction-type particle size distribution measurement apparatus (SALD-2000J) manufactured by Shimadzu Corp. yielded a value of 7.0 μm. Moreover, fine pore size distribution of this activated carbon 2 was measured by using a fine pore size distribution measurement apparatus (AUTOSORB-1 AS-1-MP) manufactured by Yuasa Ionics Co., Ltd. As a result, BET specific surface area was 3627 m$^2$/g, mesopore volume (VI) was 1.50 cc/g, micropore volume ($V_2$) was 2.28 cc/g, and $V_1/V_2$=0.66.

<Production of Positive Electrode Coating Liquid>

A positive electrode coating solution was prepared by using the activated carbon 1 used for the positive electrode active material.

First, 4.0 parts by weight of Ketjen black and 31.5 parts by weight of lithium carbonate were dry-mixed for 15 minutes at a speed of 20 rpm by using a planetary mixer. 41.5 parts by weight of activated carbon 1 was added and subsequently dry-mixed for 15 minutes at a speed of 20 rpm. Thereafter, 13.5 parts by weight of LiFePO$_4$ having a mean particle diameter of 3.5 μm as the lithium transition metal oxide was added and dry-mixed for 10 minutes at a speed of 10 rpm to obtain powder mixture 1.

In another vessel, 1.5 parts by weight of PVP (polyvinylpyrrolidone), 8.0 parts by weight of PVdF (polyvinylidene fluoride) and NMP (N-methyl-2-pyrrolidone) so that the weight ratio of the solid contents (total amount of activated carbon 1, lithium carbonate, LiFePO$_4$, Ketjen black, PVP and PVdF) was 24.5% were mixed to obtain a mixed liquid 1.

To the obtained powder mixture 1, the mixed liquid 1 was added in five portions for a total of 50 minutes at a speed of 20 rpm, and was dispersed for 3 minutes under conditions of a peripheral velocity of 20 m/s using the FILMIX® (registered trademark) thin-film rotating-type high-speed mixer manufactured by Primix Corp. while cooling the agitated vessel with cooling water to the inside temperature of 10° C. to obtain a positive electrode coating liquid 1.

The viscosity ($\eta b_1$) and TI$_1$ value of the resulting coating liquid were measured in the manner as described above by using the TVE-35H E-type viscometer manufactured by Toki Sangyo Co., Ltd. As a result, viscosity ($\eta b_1$) was 2,690 mPa·s and the TI$_1$ value was 6.6. Moreover, dispersity of the resulting coating liquid 1 was measured by using a particle gauge manufactured by Yoshimitsu Seiki Co., Ltd. As a result, dispersity was 23 μm. Moreover, $X_1$, $X_2$, and $X_3$ were measured by the above method, and calculated as $X_1$=54.9, $X_2$=13.7, and $X_3$=31.4, respectively. After weighing 20 g of the obtained positive electrode coating liquid 1 in a closed vessel and allowing it to stand at 25° C. for 24 hours, the viscosity ($\eta b_2$) and the TI$_2$ value were measured again, and the viscosity ($\eta b_2$) was 2,460 mPa·s and TI$_2$ value was 6.3, TI$_2$/TI$_1$ was 0.95, and $\eta b_2/\eta b_1$ was 0.91.

<Production of Positive Electrode Precursor>

Both sides of an aluminum foil having a thickness of 15 μm were coated with the positive electrode coating liquid 1 under conditions of a coating speed of 1 m/s by using a double-sided die coater manufactured by Toray Engineering Co., Ltd. and the coating film was dried sequentially at 70° C., 90° C., 110° C., and 130° C. in this order in a drying chamber set to these chamber temperatures followed by drying with an IR heater to obtain positive electrode precursor 1. The resulting positive electrode precursor 1 was pressed under conditions of a pressure of 6 kN/cm and pressed surface temperature of 25° C. by using a roll press. The total film thickness of the positive electrode precursor 1 was measured at ten arbitrary locations of the positive electrode precursor 1 by using the GS-551 Linear Gauge Sensor film thickness gauge manufactured by Ono Sokki Co., Ltd. From the obtained measurement results, the film thickness was found to be 60 μm per one side of the positive electrode active material layer of the positive electrode precursor 1.

According to the method described above, $A_1$, $A_2$, and $A_3$ were measured and calculated as $A_1$=54.7, $A_2$=13.6, and $A_3$=31.7, respectively.

<Measurement of Peel Strength>

The positive electrode precursor 1 was cut into a 25 mm width and a 120 mm length (the positive electrode active material layer has a length of 100 mm, and an uncoated portion, the surface of which was not coated with the positive electrode active material layer has the length of the remaining 20 mm) and a Cellotape (registered trade mark, CT405AP-24 manufactured by Nichiban Co., Ltd.) with a 24 mm width was cut into a length of 100 mm and attached to the positive electrode active material layer. The uncoated portion of the positive electrode current collector was pinched onto the lower clip jaw side, and the edge of Cellotape (registered trademark) was pinched onto the upper clip jaw side, and the peel strength was measured under the following conditions by using a Tensilon (STB-1225S, manufactured by A & D Corporation). The measurement of the peel strength started within 3 minutes after attachment of Cellotape (registered trademark) to the positive electrode active material layer.

Ambient temperature: 25° C.
Sample width: 25 mm
Stroke: 100 mm
Speed: 50 mm/min
Data acquisition: Integrated average load from 25 to 65 mm.

The measurement was carried out on a total of three samples, and the average value was 0.56 N/cm.

<Calculation of $B_1$, $D_1$, and $E_1$>

The positive electrode precursor 1 was cut into a size of 4.0 cm×1.0 cm to obtain a sample 1. The sample 1 was vacuum-dried at 150° C. and 3 kPa for 12 hours. The sample 1 after vacuum drying was divided into 8 equal parts of 0.5 cm×0.5 cm, and the fine pore distribution was measured by using a fine pore distribution measurement apparatus (AUTOSORB-1 AS-1-MP) manufactured by Yuasa Ionics Co., Ltd. As a result, the BET specific surface area calculated of 19.45 m$^2$, the mesopore volume of 5.58 µL, the micropore volume of 8.21 µL, $B_1$ of 4.86 m$^2$/cm$^2$, $D_1$ of 1.40 µL/cm$^2$, and $E_1$ of 2.05 µL/cm$^2$ were obtained.

<Determination of C>
[Preparation of Sample]

A small 1 cm×1 cm piece was cut out from positive electrode precursor 1, and the front side was coated by sputtering of gold in a vacuum of 10 Pa.

[Surface SEM and EDX Measurement]

The surface of the prepared positive electrode sample was measured by SEM and EDX with atmospheric exposure, under the conditions described below.

(SEM-EDX Measuring Conditions)
Measurement apparatus: Electrolytic emission scanning electron microscope FE-SEM S-4700 manufactured by Hitachi High-Technologies Corp. and Energy dispersive X-ray analyzer EMAX manufactured by HORIBA, Ltd.
Acceleration voltage: 10 kV
Emission current: 10 µA
Measurement magnification: 2000×
Electron beam incident angle: 90°
X-ray take-off angle: 30°
Dead time: 15%
Mapping elements: C, O, F
Measurement pixel count 256×256 pixels
Measuring time: 60 sec
Number of scans: 50
Adjustment of the luminance and contrast so that no pixel reached the maximum luminance value in the mapping image and the average value of brightness fell within the range of 40% to 60% of the maximum luminance value.

(SEM-EDX Analysis)

Image analysis software (ImageJ) was used for binarization based on the average value of brightness, for the obtained oxygen mapping. The oxygen mapping area during this time $C_1$ was 45.2% of the total image.

[Cross-Sectional SEM and EDX Measurement]

A small 1 cm×1 cm piece was cut out from positive electrode precursor 1, and an SM-09020CP by JEOL Ltd. was used to create a cross-section perpendicular to the in-plane direction of positive electrode precursor 1 by using argon gas, under conditions with an acceleration voltage of 4 kV and a beam diameter of 500 µm. Next, SEM and EDX measurements of the positive electrode precursor cross-section were carried out by the methods described above.

The oxygen mapping and fluorine mapping were binarized in the same manner as described above, for the SEM-EDX cross-section image of the obtained positive electrode precursor. The oxygen mapping area during this time $C_2$ was 46.2% of the total image.

From the SEM-EDX measurement results, it was found that $C_1/A_3=1.43$ and $C_2/A_3=1.46$.

<Production of Negative Electrode>

84 parts by weight of artificial graphite having a mean particle diameter of 4.5 µm, 10 parts by weight of acetylene black, 6 parts by weight of PVdF (polyvinylidene difluoride) and NMP (N-methyl-2-pyrrolidone) were mixed so that the weight proportion of the solid content was 24.5% by weight, and the mixture was dispersed under conditions of a peripheral velocity of 17 m/s by using the FILMIX® (registered trademark) thin-film rotating-type high-speed mixer manufactured by Primix Corp. to obtain a negative electrode coating liquid.

The viscosity (ηb) and TI value of the resulting coating solution were measured by using the TVE-35H E-type viscometer manufactured by Toki Sangyo Co., Ltd. As a result, viscosity (ηb) was 2,440 mPa·s and the TI value was 4.1.

Both sides of an electrolytic copper foil having a thickness of 10 µm were coated with the negative coating liquid under conditions of a coating speed of 1 m/s by using a die coater manufactured by Toray Engineering Co., Ltd., and the coating film was dried at a drying temperature of 120° C. to obtain negative electrode 1. The resulting negative electrode 1 was pressed under conditions of a pressure of 5 kN/cm and pressed surface temperature of 25° C. by using a roll press. The total film thickness of the pressed negative electrode 1 was measured at ten arbitrary locations of the negative electrode 1 by using the GS-551 Linear Gauge Sensor film thickness gauge manufactured by Ono Sokki Co., Ltd. From the obtained measurement results, the film thickness of the negative electrode active material layer of the negative electrode 1 was found to be 30 µm per one side.

<Preparation of Electrolytic Solution>

Nonaqueous electrolytic solution was obtained by using an organic solvent in the form of a mixed solvent of ethylene carbonate (EC) and ethyl methyl carbonate (EMC) at a ratio (volume ratio) of 33:67 and dissolving electrolyte salts so as to be a concentration of $LiPF_6$ of 1.2 mol/L.

<Fabrication of Nonaqueous Lithium Electric Storage Element>

The obtained positive electrode precursor 1 was cut into 20 positive electrode precursors 1 with the positive electrode active material layers at sizes of 10.0 cm×10.0 cm (100 cm$^2$). Next, 21 negative electrodes 1 were cut out with the negative electrode active material layers at sizes of 10.1 cm×10.1 cm (102 cm$^2$), and 40 10.3 cm×10.3 cm (106 cm$^2$) polyethylene separators (thickness: 10 µm, product of ASAHI KASEI KABUSHIKI KAISHA) were prepared. They were laminated in the order: positive electrode precursor 1, separator, negative electrode 1, and separator, with the positive electrode active material layers and negative electrode active material layers facing each other across the separators, and the negative electrode 1 as the outermost layers, to obtain an electrode body. The positive electrode terminal and negative electrode terminal were ultrasonically welded to the obtained electrode body and placed in a vessel formed of an aluminum laminate package material, and 3 sides including the electrode terminal section were sealed by heat sealing.

Approximately 70 g of the nonaqueous electrolytic solution 1 was injected into the electrode body housed in the aluminum laminate package material under atmospheric pressure, in a dry air environment with a temperature of 25° C. and a dew point of no higher than −40° C. Next, the aluminum laminate package material housing the electrode laminated body and nonaqueous electrolytic solution was placed in a pressure reduction chamber and the pressure was reduced from atmospheric pressure to −87 kPa, after which it was restored to atmospheric pressure and allowed to stand for 5 minutes. The step of reducing the pressure from atmospheric pressure to −87 kPa and then restoring to atmospheric pressure was subsequently repeated 4 times, and it was then allowed to stand for 15 minutes. The pressure was again reduced from atmospheric pressure to −91 kPa, and then restored to atmospheric pressure. A step of pressure reduction and restoration to atmospheric pressure in the same manner was repeated 7 times (the pressure reduction was to −95, −96, −97, −81, −97, −97 and −97 kPa, respectively.). The electrode laminated body was impregnated with the nonaqueous electrolytic solution 1 by this procedure.

Next, the electrode laminated body in which the nonaqueous electrolytic solution was impregnated was placed in a pressure-reducing sealing machine, and with the pressure reduced to −95 kPa, it was sealed at 180° C. for 10 seconds at a pressure of 0.1 MPa to seal the aluminum laminate package material.

[Alkali Metal Doping Step]

The obtained electrode body after sealing was placed in a dry box at a temperature of 40° C. and a dew point of −40° C. or lower. The excess portion of the aluminum laminate package material was cut to unseal it, and the electrode body was subjected to initial charging by a method of a constant-current charge with a current value of 500 mA until reaching a voltage of 4.5 V, followed by constant-voltage charge at 4.5 V continued for 10 hours, for alkali metal doping of the negative electrode. Upon completion of the alkali metal doping, a heat sealer by Fuji Impulse Co., Ltd. (FA-300) was used to seal the aluminum laminate.

[Aging Step]

The alkali-doped electrode body was removed from the dry box and subjected to constant-current discharging in an environment of 25° C. at 100 mA until reaching a voltage of 3.8 V, and then constant-current discharge at 3.8 V for 1 hour, to adjust the voltage to 3.8 V. The electrode body was then stored for 48 hours in a thermostatic bath at 60° C.

[Degassing Step]

A portion of the aluminum laminate package material of the aged electrode body was unsealed in a dry air environment with a temperature of 25° C. and a dew point of −40° C. Next, the electrode body was placed in a pressure reduction chamber, and a step of using a diaphragm pump for pressure reduction over a period of 3 minutes from atmospheric pressure to −80 kPa, followed by restoration to atmospheric pressure over a period of 3 minutes, was repeated 3 times. Next, the electrode body was placed in a pressure-reducing sealing machine, and after pressure reduction to −90 kPa, it was sealed at 200° C. for 10 seconds at a pressure of 0.1 MPa to seal the aluminum laminate package material and a nonaqueous lithium electric storage element was fabricated.

[Micro Short-Circuit Inspection Step]

Ten nonaqueous lithium electric storage elements were fabricated according to the steps described above, and the aforementioned micro short-circuit inspection test was carried out. As a result, the number of micro short-circuiting was 0 (i.e., the micro short-circuit ratio was 0%).

[Measurement of $Y_1$, $Y_2$, and $Y_3$]

The positive electrode was removed by the method described above, for one of the obtained nonaqueous lithium electric storage elements, and $Y_1$, $Y_2$, and $Y_3$ were measured and calculated as $Y_1$=54.7, $Y_2$=13.6, and $Y_3$=31.7.

[Measurement of Positive Electrode Peel Strength]

The coated portion, the surface of which was coated with the positive electrode active material layer was cut into a width of 25 mm and a length of 100 mm, for the obtained positive electrode and dried in vacuum at 160° C. for 2 hours. Thereafter, the peel strength of the positive electrode was measured for a total of three samples, and the average value was 0.44 N/cm.

<Calculation of $B_2$, $D_2$, and $E_2$>

The positive electrode obtained above was cut into a size of 4.0 cm×1.0 cm to obtain a sample 2, which was vacuum-dried at 150° C. and 3 kPa for 12 hours. The vacuum-dried sample 2 was divided into 8 equal parts of 0.5 cm×0.5 cm, and the fine pore distribution was measured by using a fine pore distribution analyzer (AUTOSORB-1 AS-1-MP) manufactured by Yuasa Ionics Co., Ltd.

<Evaluation of Nonaqueous Lithium Electric Storage Element>

[Capacitance Q Measurement]

Capacitance Q of one of the obtained nonaqueous lithium electric storage elements, was measured by the method described above by using a charge and discharge apparatus (5 V, 360 A) manufactured by Fujitsu Telecom Networks Ltd. in a thermostatic chamber at 25° C., to be 910 mAh.

[Internal Resistance Ra Measurement]

Internal resistance Ra of the nonaqueous lithium electric storage element, was measured by the method described above by using a charge and discharge apparatus (5 V, 360 A) manufactured by Fujitsu Telecom Networks Ltd. in a thermostatic chamber at 25° C., to be 0.98 mΩ.

[High-Load Charge/Discharge Cycle Test]

The nonaqueous lithium electric storage element was charged with a constant current charge at a current value of 200 C (160 A) until 3.8 V is reached by using a charge and discharge apparatus (5 V, 360 A) manufactured by Fujitsu Telecom Networks Ltd. in a thermostatic chamber at 25° C., and subsequently discharged with a constant current discharge at a current value of 200 C until 2.2 V is reached. The charge/discharge step was repeated 60,000 times without stop. The internal resistance after completion of the cycle was found to be 1.08 mΩ and Rb/Ra=1.10.

Example 2

A nonaqueous lithium electric storage element was fabricated in the same manner as in Example 1 except that 44.0 parts by weight of activated carbon 1, 7.0 parts by weight of LiFePO$_4$, 40.0 parts by weight of lithium carbonate, 3.0 parts by weight of Ketjen black, 1.0 part by weight of PVP (polyvinylpyrrolidone), and 5.0 parts by weight of PVDF (polyvinylidene difluoride) were used.

Example 3

A nonaqueous lithium electric storage element was fabricated in the same manner as in Example 1 except that 42.0 parts by weight of activated carbon 1, 6.0 parts by weight of LiFePO$_4$, 38.5 parts by weight of lithium carbonate, 4.0 parts by weight of Ketjen black, 1.5 parts by weight of PVP (polyvinylpyrrolidone), and 8.0 parts by weight of PVDF (polyvinylidene difluoride) were used.

Example 4

A nonaqueous lithium electric storage element was fabricated in the same manner as in Example 1 except that 38.5 parts by weight of activated carbon 1, 19.0 parts by weight of LiFePO$_4$, 30.0 parts by weight of lithium carbonate, 3.0 parts by weight of Ketjen black, 1.5 parts by weight of PVP (polyvinylpyrrolidone), and 8.0 parts by weight of PVDF (polyvinylidene difluoride) were used.

Example 5

A nonaqueous lithium electric storage element was fabricated in the same manner as in Example 1 except that 28.0 parts by weight of activated carbon 1, 28.0 parts by weight of LiFePO$_4$, 25.0 parts by weight of lithium carbonate, 3.0 parts by weight of Ketjen black, 1.0 part by weight of PVP (polyvinylpyrrolidone), and 15.0 parts by weight of PVDF (polyvinylidene difluoride) were used.

Example 6

A nonaqueous lithium electric storage element was fabricated in the same manner as in Example 1 except that 14.0 parts by weight of activated carbon 1, 35.0 parts by weight of LiFePO$_4$, 42.0 parts by weight of lithium carbonate, 3.0 parts by weight of Ketjen black, 1.0 part by weight of PVP (polyvinylpyrrolidone), and 5.0 parts by weight of PVDF (polyvinylidene difluoride) were used.

Example 7

A nonaqueous lithium electric storage element was fabricated in the same manner as in Example 1 except that 16.0 parts by weight of activated carbon 1, 35.0 parts by weight of LiFePO$_4$, 40.0 parts by weight of lithium carbonate, 3.0 parts by weight of Ketjen black, 1.0 parts by weight of PVP (polyvinylpyrrolidone), and 5.0 parts by weight of PVDF (polyvinylidene difluoride) were used.

Example 8

A nonaqueous lithium electric storage element was fabricated in the same manner as in Example 1 except that 15.0 parts by weight of activated carbon 1, 33.0 parts by weight of LiFePO$_4$, 43.0 parts by weight of lithium carbonate, 3.0 parts by weight of Ketjen black, 1.0 part by weight of PVP (polyvinylpyrrolidone), and 5.0 parts by weight of PVDF (polyvinylidene difluoride) were used.

Example 9

A nonaqueous lithium electric storage element was fabricated in the same manner as in Example 1 except that 52.0 parts by weight of activated carbon 1, 13.0 parts by weight of LiFePO$_4$, 23.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Example 10

A nonaqueous lithium electric storage element was fabricated in the same manner as in Example 1 except that 52.0 parts by weight of activated carbon 1, 12.0 parts by weight of LiFePO$_4$, 24.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Example 11

A nonaqueous lithium electric storage element was fabricated in the same manner as in in Example 1 except that 50.0 parts by weight of activated carbon 1, 15.0 parts by weight of LiFePO$_4$, 23.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Example 12

A nonaqueous lithium electric storage element was fabricated in the same manner as in Example 1 except that 30.0 parts by weight of activated carbon 1, 10.0 parts by weight of LiFePO$_4$, 48.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Example 13

A nonaqueous lithium electric storage element was fabricated in the same manner as in Example 1 except that 28.0 parts by weight of activated carbon 1, 14.0 parts by weight of LiFePO$_4$, 46.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Example 14

A nonaqueous lithium electric storage element was fabricated in the same manner as Example 1 except that 23.0 parts by weight of activated carbon 1, 35.0 parts by weight of LiFePO$_4$, 33.0 parts by weight of lithium carbonate, 3.0 parts by weight of Ketjen black, 1.0 part by weight of PVP (polyvinylpyrrolidone), and 5.0 parts by weight of PVDF (polyvinylidene difluoride) were used.

Example 15

A nonaqueous lithium electric storage element was fabricated in the same manner as in in Example 1 except that 34.0 parts by weight of activated carbon 1, 35.0 parts by weight of LiFePO$_4$, 19.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Example 16

A nonaqueous lithium electric storage element was fabricated in the same manner as in Example 1 except that the positive electrode coating liquid was prepared by dispersing for 3 minutes under conditions of a peripheral velocity of 22 m/s.

Example 17

A nonaqueous lithium electric storage element was fabricated in the same manner as in Example 1 except that the positive electrode coating liquid was prepared by dispersing for 2 minutes under conditions of a peripheral velocity of 20 m/s.

Example 18

A nonaqueous lithium electric storage element was fabricated in the same manner as Example 1 except that the positive electrode coating liquid was prepared by dispersing for 4 minutes under conditions of a peripheral velocity of 22 m/s.

Comparative Example 1

A nonaqueous lithium electric storage element was fabricated in the same manner as in Example 1 except that 7.0 parts by weight of activated carbon 1, 35.0 parts by weight of $LiFePO_4$, 46.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 2

A nonaqueous lithium electric storage element was fabricated in the same manner as in Example 1 except that 9.0 parts by weight of activated carbon 1, 35.0 parts by weight of $LiFePO_4$, 44.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 3

A nonaqueous lithium electric storage element was fabricated in the same manner as in Example 1 except that 7.0 parts by weight of activated carbon 1, 28.0 parts by weight of $LiFePO_4$, 53.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 4

A nonaqueous lithium electric storage element was fabricated in the same manner as in Example 1 except that 5.0 parts by weight of activated carbon 1, 28.0 parts by weight of $LiFePO_4$, 55.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 5

A nonaqueous lithium electric storage element was fabricated in the same manner as in Example 1 except that 2.0 parts by weight of activated carbon 1, 29.0 parts by weight of $LiFePO_4$, 57.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 6

A nonaqueous lithium electric storage element was fabricated in the same manner as in Example 1 except that 1.0 parts by weight of activated carbon 1, 28.0 parts by weight of $LiFePO_4$, 59.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 7

A nonaqueous lithium electric storage element was fabricated in the same manner as in Example 1 except that 58.0 parts by weight of activated carbon 1, 9.0 parts by weight of $LiFePO_4$, 21.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 8

A nonaqueous lithium electric storage element was fabricated in the same manner as in Example 1 except that 60.0 parts by weight of activated carbon 1, 10.0 parts by weight of $LiFePO_4$, 18.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 9

A nonaqueous lithium electric storage element was fabricated in the same manner as in Example 1 except that 65.0 parts by weight of activated carbon 1, 8.0 parts by weight of $LiFePO_4$, 15.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 10

A nonaqueous lithium electric storage element was fabricated in the same manner as in Example 1 except that 51.0 parts by weight of activated carbon 1, 5.0 parts by weight of $LiFePO_4$, 32.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 11

A nonaqueous lithium electric storage element was fabricated in the same manner as in Example 1 except that 53.0 parts by weight of activated carbon 1, 5.0 parts by weight of $LiFePO_4$, 30.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 12

A nonaqueous lithium electric storage element was fabricated in the same manner as in Example 1 except that 58.0 parts by weight of activated carbon 1, 3.0 parts by weight of $LiFePO_4$, 27.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 13

A nonaqueous lithium electric storage element was fabricated in the same manner as in Example 1 except that 60.0 parts by weight of activated carbon 1, 3.0 parts by weight of LiFePO$_4$, 25.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 14

A nonaqueous lithium electric storage element was fabricated in the same manner as in Example 1 except that 33.0 parts by weight of activated carbon 1, 3.0 parts by weight of LiFePO$_4$, 52.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 15

A nonaqueous lithium electric storage element was fabricated in the same manner as in Example 1 except that 30.0 parts by weight of activated carbon 1, 3.0 parts by weight of LiFePO$_4$, 55.0 parts by weight of lithium carbonate, 3.0 parts by weight of Ketjen black, 1.0 part by weight of PVP (polyvinylpyrrolidone), and 8.0 parts by weight of PVDF (polyvinylidene difluoride) were used.

Comparative Example 16

A nonaqueous lithium electric storage element was fabricated in the same manner as in Example 1 except that 23.0 parts by weight of activated carbon 1, 28.0 parts by weight of LiFePO$_4$, 25.0 parts by weight of lithium carbonate, 3.0 parts by weight of Ketjen black, 1.0 part by weight of PVP (polyvinylpyrrolidone), and 20.0 parts by weight of PVDF (polyvinylidene difluoride) were used.

Comparative Example 17

A nonaqueous lithium electric storage element was fabricated in the same manner as in Example 1 except that 20.0 parts by weight of activated carbon 1, 28.0 parts by weight of LiFePO$_4$, 25.0 parts by weight of lithium carbonate, 3.0 parts by weight of Ketjen black, 1.0 part by weight of PVP (polyvinylpyrrolidone), and 23.0 parts by weight of PVDF (polyvinylidene difluoride) were used.

Comparative Example 18

A nonaqueous lithium electric storage element was fabricated in the same manner as in Example 1 except that 17.0 parts by weight of activated carbon 1, 28.0 parts by weight of LiFePO$_4$, 28.0 parts by weight of lithium carbonate, 3.0 parts by weight of Ketjen black, 1.0 part by weight of PVP (polyvinylpyrrolidone), and 23.0 parts by weight of PVDF (polyvinylidene difluoride) were used.

Comparative Example 19

A nonaqueous lithium electric storage element was fabricated in the same manner as in Example 1 except that 44.0 parts by weight of activated carbon 1, 7.0 parts by weight of LiFePO$_4$, 40.0 parts by weight of lithium carbonate, 3.0 parts by weight of Ketjen black, 1.0 part by weight of PVP (polyvinylpyrrolidone), and 5.0 parts by weight of PVDF (polyvinylidene difluoride) and the positive electrode coating liquid was prepared by dispersing for 5 minutes under conditions of a peripheral velocity of 25 m/s.

Comparative Example 20

A nonaqueous lithium electric storage element was fabricated in the same manner as in Comparative example 19 except that the positive electrode coating liquid was prepared by dispersing for 7 minutes under conditions of a peripheral velocity of 25 m/s.

Comparative Example 21

A nonaqueous lithium electric storage element was fabricated in the same manner as in Example 1 except that 46.5 parts by weight of activated carbon 1, 7.0 parts by weight of LiFePO$_4$, 40.0 parts by weight of lithium carbonate, 3.0 parts by weight of Ketjen black, 1.0 part by weight of PVP (polyvinylpyrrolidone), and 2.5 parts by weight of PVDF (polyvinylidene difluoride) and the positive electrode coating liquid was prepared by dispersing for 5 minutes under conditions of a peripheral velocity of 25 m/s.

Comparative Example 22

A nonaqueous lithium electric storage element was fabricated in the same manner as in Comparative example 21 except that the positive electrode coating liquid was prepared by dispersing for 7 minutes under conditions of a peripheral velocity of 25 m/s.

Comparative Example 23

Positive electrode precursor 2 was fabricated in the same manner as in Example 1 except that the positive electrode coating liquid was prepared by mixing 24.0 parts by weight of activated carbon 1, 56.0 parts by weight of LiFePO$_4$, 10.0 parts by weight of acetylene black, and 10.0 parts by weight of PVDF (polyvinylidene difluoride) and the mixed product was dispersed by NMP.

An electrode body was assembled in the same manner as Example 1 by using the positive electrode precursor 2 to fabricate a nonaqueous lithium electric storage element so that the pre-doping amount of lithium ions was about 85% of the negative electrode capacity by contacting the lithium metal foil with the negative electrode 1.

Comparative Example 24

A nonaqueous lithium electric storage element was fabricated in the same manner as in Comparative example 23 except that 28.0 parts by weight of activated carbon 1, 60.0 parts by weight of LiFePO$_4$, 10.0 parts by weight of acetylene black, and 2.0 part by weight of PVP (polyvinylpyrrolidone) were used.

The evaluation results of Examples 1 to 18 and Comparative examples 1 to 24 are shown in Tables 1 and 2 and Tables 3 and 4.

TABLE 1

| | Positive electrode coating liquid | | | | | | | Positive electrode precursor | | | | | Positive electrode | | | | |
|---|---|---|---|---|---|---|---|---|---|---|---|---|---|---|---|---|---|
| | $X_1$ | $X_2$ | $X_3$ | $X_2/X_1$ | $X_1/X_3$ | $TI_2/TI_1$ | $\eta b_2/\eta b_1$ | $A_1$ | $A_2$ | $A_3$ | $A_2/A_1$ | $A_1/A_3$ | $Y_1$ | $Y_2$ | $Y_3$ | $Y_2/Y_1$ | $Y_1/Y_3$ |
| Example 1 | 54.9 | 13.7 | 31.4 | 0.25 | 1.75 | 0.95 | 0.91 | 54.7 | 13.6 | 31.7 | 0.25 | 1.73 | 78.4 | 19.5 | 2.1 | 0.25 | 37.3 |
| Example 2 | 54.2 | 7.1 | 38.7 | 0.13 | 1.40 | 0.68 | 0.72 | 54.1 | 7 | 38.9 | 0.13 | 1.39 | 86.1 | 11.1 | 2.8 | 0.13 | 30.8 |
| Example 3 | 56.0 | 6.0 | 38.0 | 0.11 | 1.47 | 0.81 | 0.83 | 56.1 | 6.1 | 37.8 | 0.11 | 1.48 | 87.3 | 9.5 | 3.2 | 0.11 | 27.3 |
| Example 4 | 50.1 | 18.9 | 31.0 | 0.38 | 1.62 | 1.12 | 1.25 | 50 | 18.8 | 31.2 | 0.38 | 1.60 | 71.7 | 26.9 | 1.4 | 0.38 | 51.2 |
| Example 5 | 44.7 | 28.5 | 26.8 | 0.64 | 1.67 | 1.18 | 1.27 | 45.1 | 28.6 | 26.3 | 0.63 | 1.71 | 60.5 | 38.4 | 1.1 | 0.63 | 55.0 |
| Example 6 | 22.1 | 34.4 | 43.5 | 1.56 | 0.51 | 0.56 | 0.49 | 22.3 | 34.3 | 43.4 | 1.54 | 0.51 | 38.0 | 58.4 | 3.6 | 1.54 | 10.6 |
| Example 7 | 25.7 | 34.8 | 39.5 | 1.35 | 0.65 | 0.55 | 0.43 | 25.8 | 34.7 | 39.5 | 1.34 | 0.65 | 40.9 | 54.9 | 4.2 | 1.34 | 9.7 |
| Example 8 | 24.2 | 33.0 | 42.8 | 1.36 | 0.57 | 0.69 | 0.55 | 24 | 32.7 | 43.3 | 1.36 | 0.55 | 40.5 | 55.1 | 4.4 | 1.36 | 9.2 |
| Example 9 | 64.5 | 13.1 | 22.4 | 0.20 | 2.88 | 1.02 | 1.12 | 64.6 | 13 | 22.4 | 0.20 | 2.88 | 81.8 | 16.5 | 1.7 | 0.20 | 48.1 |
| Example 10 | 63.4 | 12.0 | 24.6 | 0.19 | 2.58 | 0.84 | 0.95 | 63.4 | 12 | 24.6 | 0.19 | 2.58 | 83.1 | 15.7 | 1.2 | 0.19 | 69.3 |
| Example 11 | 63.1 | 15.2 | 21.7 | 0.24 | 2.91 | 0.91 | 0.84 | 63.2 | 15.3 | 21.5 | 0.24 | 2.94 | 79.9 | 19.3 | 0.8 | 0.24 | 99.9 |
| Example 12 | 41.0 | 10.2 | 48.8 | 0.25 | 0.84 | 0.95 | 0.86 | 41.2 | 10.3 | 48.5 | 0.25 | 0.85 | 75.1 | 18.8 | 6.1 | 0.25 | 12.3 |
| Example 13 | 40.4 | 14.0 | 45.6 | 0.35 | 0.89 | 0.85 | 0.97 | 40.4 | 14.1 | 45.5 | 0.35 | 0.89 | 70.3 | 24.6 | 5.1 | 0.35 | 13.8 |
| Example 14 | 32.0 | 34.9 | 33.1 | 1.09 | 0.97 | 0.70 | 0.73 | 31.7 | 35 | 33.3 | 1.10 | 0.95 | 45.6 | 50.3 | 4.1 | 1.10 | 11.1 |
| Example 15 | 46.2 | 34.2 | 19.6 | 0.74 | 2.36 | 0.96 | 0.91 | 46 | 34.3 | 19.7 | 0.75 | 2.34 | 56.9 | 42.4 | 0.7 | 0.75 | 81.3 |
| Example 16 | 54.8 | 13.3 | 31.9 | 0.24 | 1.72 | 0.80 | 0.85 | 55 | 13.4 | 31.6 | 0.24 | 1.74 | 79.2 | 19.3 | 1.5 | 0.24 | 52.8 |
| Example 17 | 56.0 | 13.7 | 30.3 | 0.24 | 1.85 | 0.88 | 0.93 | 56.1 | 13.6 | 30.3 | 0.24 | 1.85 | 79.1 | 19.2 | 1.7 | 0.24 | 46.5 |
| Example 18 | 56.8 | 13.8 | 29.4 | 0.24 | 1.93 | 0.75 | 0.68 | 56.7 | 13.8 | 29.5 | 0.24 | 1.92 | 78.7 | 19.1 | 2.2 | 0.24 | 35.8 |
| Comparative example 1 | 19.3 | 35.0 | 45.7 | 1.81 | 0.42 | 0.97 | 1.06 | 19.2 | 35 | 45.8 | 1.82 | 0.42 | 33.1 | 60.4 | 6.5 | 1.82 | 5.1 |
| Comparative example 2 | 21.0 | 34.1 | 44.9 | 1.62 | 0.47 | 0.88 | 0.95 | 21 | 34.3 | 44.7 | 1.63 | 0.47 | 35.5 | 58.0 | 6.5 | 1.63 | 5.5 |
| Comparative example 3 | 18.4 | 27.9 | 53.7 | 1.52 | 0.34 | 0.84 | 0.79 | 18.6 | 27.7 | 53.7 | 1.49 | 0.35 | 37.3 | 55.6 | 7.1 | 1.49 | 5.3 |
| Comparative example 4 | 16.9 | 27.3 | 55.8 | 1.62 | 0.30 | 1.03 | 0.95 | 16.8 | 27.4 | 55.8 | 1.63 | 0.30 | 35.2 | 57.4 | 7.4 | 1.63 | 4.8 |
| Comparative example 5 | 14.3 | 29.2 | 56.5 | 2.04 | 0.25 | 0.71 | 0.68 | 14.1 | 29.3 | 56.6 | 2.08 | 0.25 | 30.1 | 62.4 | 7.5 | 2.07 | 4.0 |
| Comparative example 6 | 13.2 | 27.3 | 59.5 | 2.07 | 0.22 | 0.85 | 0.78 | 13.3 | 27.4 | 59.3 | 2.06 | 0.22 | 29.9 | 61.6 | 8.5 | 2.06 | 3.5 |
| Comparative example 7 | 70.2 | 9.2 | 20.6 | 0.13 | 3.41 | 0.88 | 0.91 | 70 | 9.3 | 20.7 | 0.13 | 3.38 | 87.9 | 11.7 | 0.4 | 0.13 | 219.8 |
| Comparative example 8 | 70.5 | 10.0 | 19.5 | 0.14 | 3.62 | 0.93 | 0.85 | 70.6 | 10.1 | 19.3 | 0.14 | 3.66 | 87.2 | 12.5 | 0.3 | 0.14 | 290.7 |
| Comparative example 9 | 76.3 | 8.0 | 15.7 | 0.10 | 4.86 | 0.82 | 0.76 | 76.2 | 8 | 15.8 | 0.10 | 4.82 | 90.3 | 9.5 | 0.2 | 0.11 | 451.5 |
| Comparative example 10 | 61.5 | 5.1 | 33.4 | 0.08 | 1.84 | 0.80 | 0.78 | 61.7 | 5 | 33.3 | 0.08 | 1.85 | 91.9 | 7.5 | 0.6 | 0.08 | 153.2 |
| Comparative example 11 | 65.8 | 5.1 | 29.1 | 0.08 | 2.26 | 0.75 | 0.82 | 65.7 | 5.1 | 29.2 | 0.08 | 2.25 | 92.4 | 7.2 | 0.4 | 0.08 | 231.0 |
| Comparative example 12 | 68.7 | 2.9 | 28.4 | 0.04 | 2.42 | 0.76 | 0.80 | 68.6 | 2.9 | 28.5 | 0.04 | 2.41 | 95.6 | 4.0 | 0.4 | 0.04 | 239.0 |
| Comparative example 13 | 74.0 | 3.0 | 23.0 | 0.04 | 3.22 | 0.72 | 0.75 | 74.2 | 3.1 | 22.7 | 0.04 | 3.27 | 95.7 | 4.0 | 0.3 | 0.04 | 319.0 |
| Comparative example 14 | 45.6 | 2.9 | 51.5 | 0.06 | 0.89 | 0.68 | 0.76 | 45.5 | 2.9 | 51.6 | 0.06 | 0.88 | 93.6 | 6.0 | 0.4 | 0.06 | 234.0 |
| Comparative example 15 | 42.2 | 3.1 | 54.7 | 0.07 | 0.77 | 0 80 | 0.90 | 42 | 3 | 55 | 0.07 | 0.76 | 92.9 | 6.6 | 0.5 | 0.07 | 185.8 |
| Comparative example 16 | 46.5 | 28.7 | 24.8 | 0.62 | 1.88 | 1.24 | 1.36 | 46.5 | 28.8 | 24.7 | 0.62 | 1.88 | 60.6 | 37.6 | 18 | 0.62 | 33.7 |
| Comparative example 17 | 48.0 | 28.0 | 24.0 | 0.58 | 2.00 | 1.35 | 1.38 | 47.9 | 28.3 | 23.8 | 0.59 | 2.01 | 61.6 | 36.4 | 2.0 | 0.59 | 30.8 |
| Comparative example 18 | 43.3 | 28.8 | 27.9 | 0.67 | 1.55 | 1.33 | 1.40 | 43.1 | 28.6 | 28.3 | 0.66 | 1.52 | 58.5 | 38.8 | 2.7 | 0.66 | 21.7 |
| Comparative example 19 | 54.0 | 7.1 | 38.9 | 0.13 | 1.39 | 0.46 | 0.38 | 54.1 | 7.1 | 38.8 | 0.13 | 1.39 | 85.5 | 11.2 | 3.3 | 0.13 | 25.9 |
| Comparative example 20 | 51.2 | 6.9 | 41.9 | 0.13 | 1.22 | 0.44 | 0.35 | 51.4 | 6.9 | 41.7 | 0.13 | 1.23 | 84.6 | 11.4 | 4.0 | 0.13 | 21.2 |
| Comparative example 21 | 53.2 | 6.7 | 40.1 | 0.13 | 1.33 | 0.41 | 0.33 | 53 | 6.7 | 40.3 | 0.13 | 1.32 | 86.2 | 10.9 | 2.9 | 0.13 | 29.7 |
| Comparative example 22 | 54.9 | 6.7 | 38.4 | 0.12 | 1.43 | 0.38 | 0.35 | 54.6 | 6.8 | 38.6 | 0.12 | 1.41 | 86.2 | 10.7 | 3.1 | 0.12 | 27.8 |
| Comparative example 23 | 45.0 | 55.0 | — | 1.22 | — | — | — | 45 | 55 | — | 1.22 | — | 45.0 | 55.0 | — | 1.22 | — |
| Comparative example 24 | 40.8 | 59.2 | — | 1.45 | — | — | — | 40.9 | 59.1 | — | 1.44 | — | 40.9 | 59.1 | — | 1.44 | — |

TABLE 2

| | Peel strength (positive electrode precursor) N/cm | Peel strength (positive electrode) N/cm | Micro short-circuit ratio | Q (mAh) | Ra (mΩ) | Rb (mΩ) | Ra/Rb |
|---|---|---|---|---|---|---|---|
| Example 1 | 0.56 | 0.44 | 0% | 910 | 0.98 | 1.08 | 1.10 |
| Example 2 | 0.13 | 0.08 | 10% | 890 | 0.95 | 1.12 | 1.18 |
| Example 3 | 0.36 | 0.29 | 0% | 860 | 0.96 | 1.1 | 1.15 |
| Example 4 | 1.64 | 1.33 | 0% | 912 | 1.06 | 1.16 | 1.09 |
| Example 5 | 2.76 | 2.32 | 0% | 863 | 1.15 | 1.25 | 1.09 |
| Example 6 | 0.03 | 0.02 | 10% | 815 | 0.94 | 1.06 | 1.13 |
| Example 7 | 0.05 | 0.03 | 10% | 846 | 0.96 | 1.11 | 1.16 |
| Example 8 | 0.16 | 0.13 | 0% | 850 | 1.02 | 1.18 | 1.16 |
| Example 9 | 0.75 | 0.61 | 0% | 880 | 1.01 | 1.17 | 1.16 |
| Example 10 | 0.36 | 0.23 | 0% | 906 | 0.95 | 1.05 | 1.11 |
| Example 11 | 0.49 | 0.33 | 0% | 859 | 1 | 1.12 | 1.12 |
| Example 12 | 0.56 | 0.43 | 0% | 924 | 1.03 | 1.16 | 1.13 |
| Example 13 | 0.32 | 0.20 | 0% | 859 | 0.98 | 1.08 | 1.10 |
| Example 14 | 0.19 | 0.11 | 0% | 908 | 0.97 | 1.09 | 1.12 |
| Example 15 | 0.75 | 0.58 | 0% | 904 | 0.93 | 1.06 | 1.14 |
| Example 16 | 0.36 | 0.20 | 0% | 915 | 0.97 | 1.12 | 1.15 |
| Example 17 | 0.42 | 0.30 | 0% | 873 | 0.89 | 1.1 | 1.24 |
| Example 18 | 0.2 | 0.12 | 10% | 894 | 0.97 | 1.11 | 1.14 |
| Comparative example 1 | 0.62 | 0.47 | 0% | 760 | 1.08 | 1.38 | 1.28 |
| Comparative example 2 | 0.5 | 0.38 | 0% | 758 | 1.02 | 1.33 | 1.30 |
| Comparative example 3 | 0.44 | 0.33 | 0% | 709 | 1.15 | 1.54 | 1.34 |
| Comparative example 4 | 0.73 | 0.57 | 0% | 721 | 1.13 | 1.52 | 1.35 |
| Comparative example 5 | 0.39 | 0.24 | 0% | 642 | 1.21 | 1.75 | 1.45 |
| Comparative example 6 | 0.51 | 0.39 | 0% | 669 | 1.27 | 1.73 | 1.36 |
| Comparative example 7 | 0.6 | 0.43 | 0% | 710 | 1.27 | 1.76 | 1.39 |
| Comparative example 8 | 0.71 | 0.65 | 0% | 625 | 1.33 | 1.89 | 1.42 |
| Comparative example 9 | 0.44 | 0.30 | 0% | 458 | 1.89 | 2.68 | 1.42 |
| Comparative example 10 | 0.4 | 0.27 | 0% | 690 | 1.15 | 1.36 | 1.18 |
| Comparative example 11 | 0.26 | 0.17 | 10% | 655 | 1.18 | 1.33 | 1.13 |
| Comparative example 12 | 0.35 | 0.22 | 0% | 510 | 1.12 | 1.42 | 1.27 |
| Comparative example 13 | 0.3 | 0.20 | 0% | 504 | 1.2 | 1.56 | 1.30 |
| Comparative example 14 | 0.21 | 0.13 | 10% | 530 | 1.12 | 1.33 | 1.19 |
| Comparative example 15 | 0.4 | 0.25 | 0% | 540 | 1.15 | 1.4 | 1.22 |
| Comparative example 16 | 3.26 | 2.51 | 0% | 902 | 1.35 | 1.52 | 1.13 |
| Comparative example 17 | 4.35 | 3.66 | 0% | 910 | 1.45 | 1.62 | 1.12 |
| Comparative example 18 | 4.22 | 3.41 | 0% | 886 | 1.87 | 2.1 | 1.12 |
| Comparative example 19 | 0.015 | 0.01 | 30% | 890 | 1.1 | 1.54 | 1.40 |
| Comparative example 20 | 0.012 | 0.008 | 50% | 860 | 1.05 | 1.5 | 1.43 |
| Comparative example 21 | 0.008 | 0.005 | 60% | 879 | 0.98 | 1.55 | 1.58 |
| Comparative example 22 | 0.005 | 0.004 | 80% | 869 | 0.99 | 1.58 | 1.60 |
| Comparative example 23 | 0.89 | 0.60 | 0% | 780 | 1.25 | 1.95 | 1.56 |
| Comparative example 24 | 0.005 | 0.003 | 10% | 795 | 1.32 | 2.35 | 1.78 |

From Tables 1 and 2, it is found that when $A_2/A_1$ is 0.10 or greater, the capacity increases because the ratio of the lithium transition metal oxide in the positive electrode active material layer increases. Moreover, it is assumed that when $A_2/A_1$ is 2.00 or less, the decomposition of lithium carbonate is promoted and the lithium doping is sufficiently carried out to the negative electrode to increase the capacity because the ratio of the lithium transition metal oxide in the positive electrode active material layer does not become too high.

It is assumed that when $A_3/A_1$ is 0.50 or greater, the decomposition of lithium carbonate is promoted because the electron conductance in the positive electrode active material layer is enhanced, and the capacity is increased because lithium doping to the negative electrode is sufficiently carried out. Further, it is assumed that when $A_3/A_1$ is 3.00 or less, lithium carbonate was sufficiently present in the positive electrode active material layer, and a sufficient amount of lithium ions was pre-doped by lithium doping, which increased the capacity.

It is assumed that by using the positive electrode coating liquid having $TL_2/TL_1$ of 0.50 or greater and 1.20 or less, the peel strength of the positive electrode active material layer can be 0.02 N/cm or greater and 3.0 N/cm or less, and when the peel strength of the positive electrode active material layer is 0.02 N/cm or greater, the missing of the positive electrode active material layer after lithium doping can be suppressed, to lower the micro short-circuit ratio. Moreover, it is assumed that when the peel strength of the positive electrode active material layer is not greater than 3.00 N/cm, the diffusivity of the electrolytic solution is improved and the resistance is reduced because no excessive binder, etc., is present in the positive electrode active material layer.

TABLE 3

| | Positive electrode precursor | | | | | | | Positive electrode | | |
|---|---|---|---|---|---|---|---|---|---|---|
| | Specific surface area $B_1$ m²/cm² | Meso pore volume $D_1$ μL/cm² | Micro pore volume $E_1$ μL/cm² | Area $C_1$ (%) | Area $C_2$ (%) | $C_1/A_3$ | $C_2/A_3$ | Specific surface area $B_2$ m²/cm² | Meso pore volume $D_2$ μL/cm² | Micro pore volume $E_2$ μL/cm² |
| Example 1 | 4.86 | 1.40 | 2.05 | 45.2 | 46.2 | 1.43 | 1.46 | 4.76 | 1.37 | 2.01 |
| Example 2 | 5.89 | 2.02 | 3.68 | 46.0 | 42.5 | 1.45 | 1.34 | 5.65 | 1.9 | 3.64 |
| Example 3 | 5.02 | 1.54 | 3.01 | 42.5 | 45.5 | 1.34 | 1.44 | 4.97 | 1.49 | 2.83 |
| Example 4 | 3.25 | 1.04 | 1.87 | 48.2 | 46.9 | 1.52 | 1.48 | 3.15 | 1.02 | 1.8 |
| Example 5 | 1.56 | 0.66 | 1.12 | 56.2 | 53.6 | 1.77 | 1.69 | 1.53 | 0.63 | 1.1 |
| Example 6 | 0.28 | 0.11 | 0.22 | 74.5 | 73.5 | 2.35 | 2.32 | 0.28 | 0.11 | 0.21 |
| Example 7 | 0.51 | 0.35 | 0.65 | 72.3 | 74.5 | 2.28 | 2.35 | 0.48 | 0.34 | 0.63 |
| Example 8 | 0.33 | 0.15 | 0.31 | 75.1 | 75.6 | 2.37 | 2.38 | 0.32 | 0.14 | 0.3 |
| Example 9 | 8.98 | 4.57 | 9.47 | 29.5 | 27.6 | 0.93 | 0.87 | 8.8 | 4.3 | 9.09 |
| Example 10 | 9.54 | 4.86 | 9.68 | 27.5 | 25.6 | 0.87 | 0.81 | 8.97 | 4.76 | 9.39 |
| Example 11 | 7.65 | 4.25 | 8.69 | 31.5 | 30.5 | 0.99 | 0.96 | 7.42 | 4.17 | 8.52 |
| Example 12 | 3.98 | 1.23 | 2.21 | 51.6 | 50.8 | 1.63 | 1.60 | 3.9 | 1.16 | 2.12 |
| Example 13 | 3.24 | 1.06 | 2.01 | 58.5 | 58.6 | 1.85 | 1.85 | 3.11 | 1.03 | 1.89 |
| Example 14 | 1.59 | 0.57 | 0.89 | 64.8 | 65.5 | 2.04 | 2.07 | 1.54 | 0.55 | 0.87 |
| Example 15 | 3.2 | 1.11 | 2.03 | 50.6 | 51.8 | 1.60 | 1.63 | 3.14 | 1.1 | 1.97 |
| Example 16 | 4.35 | 1.36 | 2.25 | 43.5 | 44.2 | 1.37 | 1.39 | 4.18 | 1.32 | 2.21 |
| Example 17 | 4.58 | 1.40 | 2.14 | 40.2 | 41.5 | 1.27 | 1.31 | 4.31 | 1.37 | 2.01 |
| Example 18 | 4.77 | 1.24 | 2.30 | 38.5 | 36.1 | 1.21 | 1.14 | 4.67 | 1.22 | 2.21 |
| Comparative example 1 | 0.11 | 0.06 | 0.15 | 82.4 | 81.0 | 2.60 | 2.56 | 0.11 | 0.06 | 0.15 |
| Comparative example 2 | 0.15 | 0.06 | 0.13 | 77.6 | 80.5 | 2.45 | 2.54 | 0.14 | 0.06 | 0.12 |
| Comparative example 3 | 0.12 | 0.04 | 0.11 | 79.5 | 80.0 | 2.51 | 2.52 | 0.12 | 0.04 | 0.11 |
| Comparative example 4 | 0.1 | 0.03 | 0.08 | 81.0 | 80.5 | 2.56 | 2.54 | 0.1 | 0.03 | 0.08 |
| Comparative example 5 | 0.05 | 0.01 | 0.05 | 84.6 | 82.9 | 2.67 | 2.62 | 0.05 | 0.01 | 0.05 |
| Comparative example 6 | 0.03 | 0.01 | 0.03 | 83.2 | 81.5 | 2.62 | 2.57 | 0.03 | 0.01 | 0.03 |
| Comparative example 7 | 11.21 | 5.10 | 10.68 | 24.5 | 24.0 | 0.77 | 0.76 | 10.99 | 4.79 | 10.25 |
| Comparative example 8 | 12.05 | 5.26 | 10.88 | 23.5 | 22.5 | 0.74 | 0.71 | 11.81 | 5.05 | 10.77 |
| Comparative example 9 | 13.52 | 6.74 | 12.65 | 20.5 | 20.3 | 0.65 | 0.64 | 12.71 | 6.67 | 12.27 |
| Comparative example 10 | 10.85 | 5.36 | 11.25 | 33.5 | 30.9 | 1.06 | 0.97 | 10.52 | 5.2 | 11.03 |
| Comparative example 11 | 11.26 | 5.21 | 10.90 | 31.5 | 31.0 | 0.99 | 0.98 | 11.03 | 5 | 10.68 |
| Comparative example 12 | 12.08 | 5.68 | 11.56 | 24.2 | 24.0 | 0.76 | 0.76 | 11.36 | 5.57 | 10.87 |
| Comparative example 13 | 13.5 | 6.60 | 12.36 | 22.1 | 21.2 | 0.70 | 0.67 | 12.96 | 6.2 | 12.11 |
| Comparative example 14 | 3.56 | 1.25 | 2.01 | 50.5 | 50.8 | 1.59 | 1.60 | 3.49 | 1.2 | 1.89 |
| Comparative example 15 | 2.58 | 0.98 | 1.78 | 52.0 | 51.8 | 1.64 | 1.63 | 2.43 | 0.96 | 1.76 |
| Comparative example 16 | 1.58 | 0.77 | 1.25 | 48.9 | 50.9 | 1.54 | 1.61 | 1.52 | 0.72 | 1.21 |
| Comparative example 17 | 2.63 | 0.96 | 1.49 | 49.6 | 51.1 | 1.56 | 1.61 | 2.6 | 0.95 | 1.46 |
| Comparative example 18 | 1.05 | 0.35 | 0.65 | 51.0 | 50.0 | 1.61 | 1.58 | 1.02 | 0.34 | 0.64 |
| Comparative example 19 | 4.89 | 1.58 | 2.57 | 45.0 | 45.6 | 1.42 | 1.44 | 4.69 | 1.55 | 2.42 |
| Comparative example 20 | 5.02 | 1.58 | 2.49 | 43.5 | 44.0 | 1.37 | 1.39 | 4.92 | 1.56 | 2.39 |
| Comparative example 21 | 5.68 | 2.36 | 3.96 | 48.2 | 47.2 | 1.52 | 1.49 | 5.34 | 2.22 | 3.88 |

TABLE 3-continued

| | Positive electrode precursor | | | | | | | Positive electrode | | |
|---|---|---|---|---|---|---|---|---|---|---|
| | Specific surface area $B_1$ $m^2/cm^2$ | Meso pore volume $D_1$ $\mu L/cm^2$ | Micro pore volume $E_1$ $\mu L/cm^2$ | Area $C_1$ (%) | Area $C_2$ (%) | $C_1/A_3$ | $C_2/A_3$ | Specific surface area $B_2$ $m^2/cm^2$ | Meso pore volume $D_2$ $\mu L/cm^2$ | Micro pore volume $E_2$ $\mu L/cm^2$ |
| Comparative example 22 | 4.98 | 2.01 | 3.50 | 43.6 | 44.6 | 1.38 | 1.41 | 4.78 | 1.93 | 3.47 |
| Comparative example 23 | 0.15 | 0.06 | 0.16 | 13.5 | 12.1 | — | — | 0.15 | 0.06 | 0.15 |
| Comparative example 24 | 0.11 | 0.04 | 0.011 | 12.2 | 10.6 | — | — | 0.1 | 0.04 | 0.01 |

TABLE 4

| | Q (mAh) | Ra (mΩ) | Rb (mΩ) | Ra/Rb |
|---|---|---|---|---|
| Example 1 | 910 | 0.98 | 1.08 | 1.10 |
| Example 2 | 890 | 0.95 | 1.12 | 1.18 |
| Example 3 | 860 | 0.96 | 1.10 | 1.15 |
| Example 4 | 912 | 1.06 | 1.16 | 1.09 |
| Example 5 | 863 | 1.15 | 1.25 | 1.09 |
| Example 6 | 815 | 0.94 | 1.06 | 1.13 |
| Example 7 | 846 | 0.96 | 1.11 | 1.16 |
| Example 8 | 850 | 1.02 | 1.18 | 1.16 |
| Example 9 | 880 | 1.01 | 1.17 | 1.16 |
| Example 10 | 906 | 0.95 | 1.05 | 1.11 |
| Example 11 | 859 | 1.00 | 1.12 | 1.12 |
| Example 12 | 924 | 1.03 | 1.16 | 1.13 |
| Example 13 | 859 | 0.98 | 1.08 | 1.10 |
| Example 14 | 908 | 0.97 | 1.09 | 1.12 |
| Example 15 | 904 | 0.93 | 1.06 | 1.14 |
| Example 16 | 915 | 0.97 | 1.12 | 1.15 |
| Example 17 | 873 | 0.89 | 1.10 | 1.24 |
| Example 18 | 894 | 0.97 | 1.11 | 1.14 |
| Comparative example 1 | 760 | 1.08 | 1.38 | 1.28 |
| Comparative example 2 | 758 | 1.02 | 1.33 | 1.30 |
| Comparative example 3 | 709 | 1.15 | 1.54 | 1.34 |
| Comparative example 4 | 721 | 1.13 | 1.52 | 1.35 |
| Comparative example 5 | 642 | 1.21 | 1.75 | 1.45 |
| Comparative example 6 | 669 | 1.27 | 1.73 | 1.36 |
| Comparative example 7 | 710 | 1.27 | 1.76 | 1.39 |
| Comparative example 8 | 625 | 1.33 | 1.89 | 1.42 |
| Comparative example 9 | 458 | 1.89 | 2.68 | 1.42 |
| Comparative example 10 | 690 | 1.15 | 1.36 | 1.18 |
| Comparative example 11 | 655 | 1.18 | 1.33 | 1.13 |
| Comparative example 12 | 510 | 1.12 | 1.42 | 1.27 |
| Comparative example 13 | 504 | 1.20 | 1.56 | 1.30 |
| Comparative example 14 | 530 | 1.12 | 1.33 | 1.19 |
| Comparative example 15 | 540 | 1.15 | 1.40 | 1.22 |
| Comparative example 16 | 902 | 1.35 | 1.52 | 1.13 |
| Comparative example 17 | 910 | 1.45 | 1.62 | 1.12 |
| Comparative example 18 | 886 | 1.87 | 2.10 | 1.12 |
| Comparative example 19 | 890 | 1.10 | 1.54 | 1.40 |
| Comparative example 20 | 860 | 1.05 | 1.50 | 1.43 |
| Comparative example 21 | 879 | 0.98 | 1.55 | 1.58 |
| Comparative example 22 | 869 | 0.99 | 1.58 | 1.60 |
| Comparative example 23 | 780 | 1.25 | 1.95 | 1.56 |
| Comparative example 24 | 795 | 1.32 | 2.35 | 1.78 |

Example 19

A nonaqueous lithium electric storage element was fabricated in the same manner as in Example 1 except that $LiNi_{0.80}Co_{0.15}Al_{0.05}O_2$ was used in place of $LiFePO_4$.

Example 20

A nonaqueous lithium electric storage element was fabricated in the same manner as in Example 1 except that $LiNi_{0.33}Co_{0.33}Mn_{0.33}O_2$ was used in place of $LiFePO_4$.

Example 21

A nonaqueous lithium electric storage element was fabricated in the same manner as in Example 1 except that $LiCoO_2$ was used in place of $LiFePO_4$.

Example 22

A nonaqueous lithium electric storage element was fabricated in the same manner as in Example 1 except that $LiMnPO_4$ was used in place of $LiFePO_4$.

Example 23

A nonaqueous lithium electric storage element was fabricated in the same manner as in Example 1 except that $LiMn_2O_4$ was used in place of $LiFePO_4$.

Example 24

A nonaqueous lithium electric storage element was fabricated in the same manner as in Example 1 except that $Li_3V_2(PO_4)_3$ was used in place of $LiFePO_4$.

Example 25

A nonaqueous lithium electric storage element was fabricated in the same manner as in Example 1 except that sodium carbonate was used in place of lithium carbonate.

Example 26

A nonaqueous lithium electric storage element was fabricated in the same manner as in Example 1 except that potassium carbonate was used in place of lithium carbonate.

Example 27

A nonaqueous lithium electric storage element was fabricated in the same manner as in Example 1 except that a mixture of sodium carbonate and lithium carbonate at a weight ratio of 1:1 was used in place of lithium carbonate.

Example 28

A nonaqueous lithium electric storage element was fabricated in the same manner as in Example 1 except that a mixture of potassium carbonate and lithium carbonate at a weight ratio of 1:1 was used in place of lithium carbonate.

Example 29

A nonaqueous lithium electric storage element was fabricated in the same manner as in Example 1 except that activated carbon 2 was used in place of activated carbon 1.

Example 30

A nonaqueous lithium electric storage element was fabricated in the same manner as in Example 1 except that a mixture of an acrylic polymer and carboxymethyl cellulose at a ratio of 5:1 in place of PVdF, was used and water was used in place of NMP.

Example 31

A nonaqueous lithium electric storage element was fabricated in the same manner as in Example 1 except that a mixture of a styrene-butadiene copolymer and carboxymethyl cellulose at a ratio of 4:1 in place of PVdF, was used and water was used in place of NMP.

Example 32

A nonaqueous lithium electric storage element was fabricated in the same manner as in Example 1 except that a mixture of polyimide and carboxymethyl cellulose at a ratio of 6:1 in place of PVdF, was used and water was used in place of NMP.

Example 33

A nonaqueous lithium electric storage element was fabricated in the same manner as in Example 1 except that a mixture of a latex and carboxymethyl cellulose at a ratio of 7:1 in place of PVdF, was used and water was used in place of NMP.

Example 34

A nonaqueous lithium electric storage element was fabricated in the same manner as in Example 30 except that 0.1 mol/L sulfuric acid was added to the positive electrode coating liquid at a weight ratio of 1%.

Example 35

A nonaqueous lithium electric storage element was fabricated in the same manner as in Example 30 except that 0.1 mol/L acetic acid was added to the positive electrode coating liquid at a weight ratio of 5%.

Example 36

A nonaqueous lithium electric storage element was fabricated in the same manner as in Example 30 except that the positive electrode coating liquid was subjected to $CO_2$ bubbling for 10 minutes with a flow of 100 cc/min.

Comparative Example 25

A nonaqueous lithium electric storage element was fabricated in the same manner as in Comparative example 5 except that $LiNi_{0.80}Co_{0.15}Al_{0.05}O_2$ was used in place of $LiFePO_4$.

Comparative Example 26

A nonaqueous lithium electric storage element was fabricated in the same manner as in Comparative example 5 except that $LiNi_{0.33}Co_{0.33}Mn_{0.33}O_2$ was used in place of $LiFePO_4$.

Comparative Example 27

A nonaqueous lithium electric storage element was fabricated in the same manner as in Comparative example 5 except that $LiCoO_2$ was used in place of $LiFePO_4$.

Comparative Example 28

A nonaqueous lithium electric storage element was fabricated in the same manner as in Comparative example 5 except that $LiMnPO_4$ was used in place of $LiFePO_4$.

Comparative Example 29

A nonaqueous lithium electric storage element was fabricated in the same manner as in Comparative example 5 except that $LiMn_2O_4$ was used in place of $LiFePO_4$.

Comparative Example 30

A nonaqueous lithium electric storage element was fabricated in the same manner as in Comparative example 5 except that $Li_3V_2(PO_4)_3$ was used in place of $LiFePO_4$.

Comparative Example 31

A nonaqueous lithium electric storage element was fabricated in the same manner as in Comparative example 5 except that sodium carbonate was used in place of lithium carbonate.

Comparative Example 32

A nonaqueous lithium electric storage element was fabricated in the same manner as in Comparative example 5 except that potassium carbonate was used in place of lithium carbonate.

Comparative Example 33

A nonaqueous lithium electric storage element was fabricated in the same manner as in Comparative example 5 except that a mixture of sodium carbonate and lithium carbonate at a weight ratio of 1:1 was used in place of lithium carbonate.

Comparative Example 34

A nonaqueous lithium electric storage element was fabricated in the same manner as in Comparative example 5 except that a mixture of potassium carbonate and lithium carbonate at a weight ratio of 1:1 was used in place of lithium carbonate.

Comparative Example 35

A nonaqueous lithium electric storage element was fabricated in the same manner as in Comparative example 5 except that activated carbon 2 was used in place of activated carbon 1.

Comparative Example 36

A nonaqueous lithium electric storage element was fabricated in the same manner as in Comparative example 5 except that a mixture of an acrylic polymer and carboxymethyl cellulose at a ratio of 5:1 in place of PVdF, was used and water was used in place of NMP.

Comparative Example 37

A nonaqueous lithium electric storage element was fabricated in the same manner as in Comparative example 5 except that a mixture of a styrene-butadiene copolymer and carboxymethyl cellulose at a ratio of 4:1 in place of PVdF, was used and water was used in place of NMP.

Comparative Example 38

A nonaqueous lithium electric storage element was fabricated in the same manner as in Comparative example 5 except that a mixture of polyimide and carboxymethyl cellulose at a ratio of 6:1 in place of PVdF, was used and water was used in place of NMP.

Comparative Example 39

A nonaqueous lithium electric storage element was fabricated in the same manner as in Comparative example 5 except that a mixture of a latex and carboxymethyl cellulose at a ratio of 7:1 in place of PVdF, was used and water was used in place of NMP.

Comparative Example 40

A nonaqueous lithium electric storage element was fabricated in the same manner as in Comparative example 36 except that 0.1 mol/L sulfuric acid was added to the positive electrode coating liquid at a weight ratio of 1%.

Comparative Example 41

A nonaqueous lithium electric storage element was fabricated in the same manner as in Comparative example 36 except that 0.1 mol/L acetic acid was added to the positive electrode coating liquid at a weight ratio of 5%.

Comparative Example 42

A nonaqueous lithium electric storage element was fabricated in the same manner as in Comparative example 36 except that the positive electrode coating liquid was subjected to $CO_2$ bubbling for 10 minutes with a flow of 100 cc/min.

The evaluation results of Examples 19 to 36 and Comparative examples 25 to 42 are shown in Tables 5 and 6.

TABLE 5

| | Positive electrode coating liquid | | | | | Positive electrode precursor | | | | | Positive electrode | | | | |
|---|---|---|---|---|---|---|---|---|---|---|---|---|---|---|---|
| | $X_1$ | $X_2$ | $X_3$ | $X_2/X_1$ | $X_1/X_3$ | $A_1$ | $A_2$ | $A_3$ | $A_2/A_1$ | $A_1/A_3$ | $Y_1$ | $Y_2$ | $Y_3$ | $Y_2/Y_1$ | $Y_1/Y_3$ |
| Example 19 | 54.7 | 13.5 | 31.8 | 0.25 | 1.72 | 54.6 | 13.6 | 31.8 | 0.25 | 1.72 | 78.4 | 19.5 | 2.1 | 0.25 | 37.3 |
| Example 20 | 54.8 | 13.6 | 31.6 | 0.25 | 1.73 | 54.9 | 13.5 | 31.6 | 0.25 | 1.74 | 78.7 | 19.3 | 2.0 | 0.25 | 39.4 |
| Example 21 | 55.1 | 13.4 | 31.5 | 0.24 | 1.75 | 55.2 | 13.4 | 31.4 | 0.24 | 1.76 | 78.9 | 19.1 | 2.0 | 0.24 | 39.5 |
| Example 22 | 54.8 | 13.6 | 31.6 | 0.25 | 1.73 | 54.6 | 13.6 | 31.8 | 0.25 | 1.72 | 78.5 | 19.5 | 2.0 | 0.25 | 39.3 |
| Example 23 | 54.6 | 13.6 | 31.8 | 0.25 | 1.72 | 54.8 | 13.7 | 31.5 | 0.25 | 1.74 | 78.3 | 19.6 | 2.1 | 0.25 | 37.3 |
| Example 24 | 51.0 | 13.4 | 35.6 | 0.26 | 1.43 | 55.0 | 13.5 | 31.5 | 0.25 | 1.75 | 78.7 | 19.3 | 2.0 | 0.25 | 39.4 |
| Example 25 | 55.0 | 13.4 | 31.6 | 0.24 | 1.74 | 55.1 | 13.2 | 31.7 | 0.24 | 1.74 | 79.1 | 18.9 | 2.0 | 0.24 | 39.6 |
| Example 26 | 54.7 | 13.1 | 32.2 | 0.24 | 1.70 | 54.6 | 13.3 | 32.1 | 0.24 | 1.70 | 78.8 | 19.2 | 2.0 | 0.24 | 39.4 |
| Example 27 | 54.8 | 13.6 | 31.6 | 0.25 | 1.73 | 54.8 | 13.5 | 31.7 | 0.25 | 1.73 | 78.5 | 19.4 | 2.1 | 0.25 | 37.4 |
| Example 28 | 55.3 | 13.3 | 31.4 | 0.24 | 1.76 | 55.2 | 13.5 | 31.3 | 0.24 | 1.76 | 78.7 | 19.3 | 2.0 | 0.25 | 39.4 |
| Example 29 | 55.0 | 13.6 | 31.4 | 0.25 | 1.75 | 55.1 | 13.7 | 31.2 | 0.25 | 1.77 | 78.5 | 19.5 | 2.0 | 0.25 | 39.3 |
| Example 30 | 55.2 | 12.9 | 31.9 | 0.23 | 1.73 | 55.3 | 12.9 | 31.8 | 0.23 | 1.74 | 79.4 | 18.5 | 2.1 | 0.23 | 37.8 |
| Example 31 | 54.9 | 13.3 | 31.8 | 0.24 | 1.73 | 54.8 | 13.4 | 31.8 | 0.24 | 1.72 | 78.7 | 19.3 | 2.0 | 0.25 | 39.4 |
| Example 32 | 54.7 | 13.3 | 32.0 | 0.24 | 1.71 | 54.9 | 13.1 | 32.0 | 0.24 | 1.72 | 79.1 | 18.9 | 2.0 | 0.24 | 39.6 |
| Example 33 | 54.6 | 13.7 | 31.7 | 0.25 | 1.72 | 54.7 | 13.8 | 31.5 | 0.25 | 1.74 | 78.2 | 19.7 | 2.1 | 0.25 | 37.2 |
| Example 34 | 53.0 | 13.8 | 33.2 | 0.26 | 1.60 | 55.0 | 14.0 | 31.0 | 0.25 | 1.77 | 78.1 | 19.9 | 2.0 | 0.25 | 39.1 |
| Example 35 | 55.0 | 12.9 | 32.1 | 0.23 | 1.71 | 54.8 | 12.9 | 32.3 | 0.24 | 1.70 | 79.2 | 18.7 | 2.1 | 0.24 | 37.7 |
| Example 36 | 55.0 | 13.4 | 31.6 | 0.24 | 1.74 | 55.2 | 13.1 | 31.7 | 0.24 | 1.74 | 79.2 | 18.8 | 2.0 | 0.24 | 39.6 |
| Comparative example 25 | 14.0 | 29.2 | 56.8 | 2.09 | 0.25 | 14.1 | 29.0 | 56.9 | 2.06 | 0.25 | 30.4 | 62.4 | 7.2 | 2.05 | 4.2 |
| Comparative example 26 | 14.1 | 28.7 | 57.2 | 2.04 | 0.25 | 14.0 | 28.8 | 57.2 | 2.06 | 0.24 | 30.4 | 62.5 | 7.1 | 2.06 | 4.3 |
| Comparative example 27 | 13.7 | 29.3 | 57.0 | 2.14 | 0.24 | 13.8 | 29.3 | 56.9 | 2.12 | 0.24 | 29.7 | 63.1 | 7.2 | 2.12 | 4.1 |
| Comparative example 28 | 13.8 | 29.2 | 57.0 | 2.12 | 0.24 | 13.9 | 29.2 | 56.9 | 2.10 | 0.24 | 29.9 | 62.7 | 7.4 | 2.10 | 4.0 |
| Comparative example 29 | 14.0 | 28.9 | 57.1 | 2.06 | 0.25 | 14.0 | 28.8 | 57.2 | 2.06 | 0.24 | 30.3 | 62.3 | 7.4 | 2.06 | 4.1 |
| Comparative example 30 | 14.0 | 29.2 | 56.8 | 2.09 | 0.25 | 14.0 | 29.0 | 57.0 | 2.07 | 0.25 | 30.2 | 62.5 | 7.3 | 2.07 | 4.1 |
| Comparative example 31 | 14.1 | 28.6 | 57.3 | 2.03 | 0.25 | 14.1 | 28.7 | 57.2 | 2.04 | 0.25 | 30.5 | 62.1 | 7.4 | 2.04 | 4.1 |
| Comparative example 32 | 14.3 | 29.4 | 56.3 | 2.06 | 0.25 | 14.2 | 29.3 | 56.5 | 2.06 | 0.25 | 30.2 | 62.4 | 7.4 | 2.07 | 4.1 |
| Comparative example 33 | 13.9 | 29.3 | 56.8 | 2.11 | 0.24 | 13.8 | 29.1 | 57.1 | 2.11 | 0.24 | 29.8 | 62.8 | 7.4 | 2.11 | 4.0 |
| Comparative example 34 | 13.9 | 29.2 | 56.9 | 2.10 | 0.24 | 13.8 | 29.0 | 57.2 | 2.10 | 0.24 | 29.9 | 62.8 | 7.3 | 2.10 | 4.1 |

TABLE 5-continued

| | Positive electrode coating liquid | | | | | Positive electrode precursor | | | | | Positive electrode | | | | |
|---|---|---|---|---|---|---|---|---|---|---|---|---|---|---|---|
| | $X_1$ | $X_2$ | $X_3$ | $X_2/X_1$ | $X_1/X_3$ | $A_1$ | $A_2$ | $A_3$ | $A_2/A_1$ | $A_1/A_3$ | $Y_1$ | $Y_2$ | $Y_3$ | $Y_2/Y_1$ | $Y_1/Y_3$ |
| Comparative example 35 | 14.0 | 28.7 | 57.3 | 2.05 | 0.24 | 14.0 | 28.8 | 57.2 | 2.06 | 0.24 | 30.3 | 62.3 | 7.4 | 2.06 | 4.1 |
| Comparative example 36 | 14.0 | 28.9 | 57.1 | 2.06 | 0.25 | 14.1 | 28.9 | 57.0 | 2.05 | 0.25 | 30.5 | 62.4 | 7.1 | 2.05 | 4.3 |
| Comparative example 37 | 14.4 | 29.2 | 56.4 | 2.03 | 0.26 | 14.6 | 29.2 | 56.2 | 2.00 | 0.26 | 30.9 | 61.9 | 7.2 | 2.00 | 4.3 |
| Comparative example 38 | 13.7 | 29.4 | 56.9 | 2.15 | 0.24 | 13.9 | 29.3 | 56.8 | 2.11 | 0.24 | 29.8 | 62.8 | 7.4 | 2.11 | 4.0 |
| Comparative example 39 | 14.1 | 28.5 | 57.4 | 2.02 | 0.25 | 1.3.8 | 28.7 | 57.5 | 2.08 | 0.24 | 30.2 | 62.7 | 7.1 | 2.08 | 4.3 |
| Comparative example 40 | 14.2 | 29.1 | 56.7 | 2.05 | 0.25 | 14.0 | 29.0 | 57.0 | 2.07 | 0.25 | 30.2 | 62.6 | 7.2 | 2.07 | 4.2 |
| Comparative example 41 | 13.9 | 29.0 | 57.1 | 2.09 | 0.24 | 14.2 | 29.3 | 56.5 | 2.06 | 0.25 | 30.2 | 62.4 | 7.4 | 2.07 | 4.1 |
| Comparative example 42 | 13.8 | 28.7 | 57.5 | 2.08 | 0.24 | 13.7 | 28.7 | 57.6 | 2.09 | 0.24 | 30.0 | 62.7 | 7.3 | 2.09 | 4.1 |

TABLE 6

| | Peel strength (positive electrode precursor) N/cm | Peel strength (positive electrode) N/cm | Micro short-circuit ratio | Q (mAh) | Ra (mΩ) | Rb (mΩ) | Ra/Rb |
|---|---|---|---|---|---|---|---|
| Example 19 | 0.54 | 0.49 | 0% | 879 | 0.97 | 1.07 | 1.10 |
| Example 20 | 0.61 | 0.53 | 0% | 883 | 0.99 | 1.10 | 1.11 |
| Example 21 | 0.52 | 0.46 | 0% | 896 | 1.02 | 1.08 | 1.06 |
| Example 22 | 0.55 | 0.51 | 0% | 875 | 1.03 | 1.09 | 1.06 |
| Example 23 | 0.56 | 0.50 | 10% | 865 | 0.98 | 1.12 | 1.14 |
| Example 24 | 0.59 | 0.52 | 0% | 913 | 0.97 | 1.08 | 1.11 |
| Example 25 | 0.66 | 0.60 | 0% | 846 | 0.94 | 1.06 | 1.13 |
| Example 26 | 0.48 | 0.43 | 0% | 840 | 0.92 | 1.05 | 1.14 |
| Example 27 | 0.59 | 0.52 | 10% | 876 | 0.95 | 1.02 | 1.07 |
| Example 28 | 0.60 | 0.54 | 0% | 880 | 0.93 | 1.06 | 1.14 |
| Example 29 | 0.51 | 0.48 | 0% | 923 | 0.95 | 1.08 | 1.14 |
| Example 30 | 0.47 | 0.42 | 0% | 870 | 1.08 | 1.15 | 1.06 |
| Example 31 | 0.59 | 0.52 | 0% | 886 | 1.05 | 1.18 | 1.12 |
| Example 32 | 0.65 | 0.59 | 0% | 857 | 1.06 | 1.15 | 1.08 |
| Example 33 | 0.55 | 0.52 | 0% | 868 | 1.05 | 1.19 | 1.13 |
| Example 34 | 0.56 | 0.51 | 10% | 879 | 1.03 | 1.12 | 1.09 |
| Example 35 | 0.50 | 0.47 | 0% | 890 | 1.06 | 1.19 | 1.12 |
| Example 36 | 0.67 | 0.58 | 0% | 869 | 1.12 | 1.22 | 1.09 |
| Comparative example 25 | 0.39 | 0.36 | 0% | 612 | 1.25 | 1.70 | 1.36 |
| Comparative example 26 | 0.36 | 0.31 | 0% | 620 | 1.23 | 1.75 | 1.42 |
| Comparative example 27 | 0.29 | 0.26 | 10% | 625 | 1.27 | 1.78 | 1.40 |
| Comparative example 28 | 0.45 | 0.41 | 10% | 614 | 1.22 | 1.73 | 1.42 |
| Comparative example 29 | 0.36 | 0.32 | 0% | 620 | 1.2 | 1.69 | 1.41 |
| Comparative example 30 | 0.40 | 0.37 | 0% | 650 | 1.24 | 1.78 | 1.44 |
| Comparative example 31 | 0.30 | 0.27 | 0% | 584 | 1.15 | 1.72 | 1.50 |
| Comparative example 32 | 0.32 | 0.30 | 10% | 588 | 1.16 | 1.69 | 1.46 |
| Comparative example 33 | 0.33 | 0.30 | 0% | 606 | 1.17 | 1.70 | 1.45 |
| Comparative example 34 | 0.38 | 0.35 | 0% | 610 | 1.17 | 1.75 | 1.50 |
| Comparative example 35 | 0.29 | 0.27 | 0% | 658 | 1.18 | 1.76 | 1.49 |
| Comparative example 36 | 0.35 | 0.30 | 0% | 623 | 1.35 | 1.89 | 1.40 |
| Comparative example 37 | 0.41 | 0.36 | 0% | 614 | 1.32 | 1.80 | 1.36 |
| Comparative example 38 | 0.33 | 0.29 | 10% | 630 | 1.36 | 1.90 | 1.40 |
| Comparative example 39 | 0.40 | 0.36 | 0% | 614 | 1.35 | 1.98 | 1.47 |
| Comparative example 40 | 0.40 | 0.35 | 0% | 625 | 1.29 | 1.96 | 1.52 |

TABLE 6-continued

|  | Peel strength (positive electrode precursor) N/cm | Peel strength (positive electrode) N/cm | Micro short-circuit ratio | Q (mAh) | Ra (mΩ) | Rb (mΩ) | Ra/Rb |
|---|---|---|---|---|---|---|---|
| Comparative example 41 | 0.36 | 0.35 | 10% | 635 | 1.32 | 1.86 | 1.41 |
| Comparative example 42 | 0.39 | 0.36 | 0% | 618 | 1.33 | 1.94 | 1.46 |

From Tables 5 and 6, it has been confirmed that when the lithium transition metal oxide was changed, the alkali metal carbonate was changed, the activated carbon was changed, and even water was used as the dispersant, the nonaqueous lithium electric storage element having a high capacity and low resistance can be produced if $A_2/A_1$ or $X_2/X_1$ of 0.10 or greater and 2.00 or less and $A_1/A_3$ or $X_1/X_3$ of 0.50 or greater and 3.00 or less are satisfied.

Example 37

The positive electrode precursor 1 was cut into a size of 12.0 cm×210.0 cm (the size of the positive electrode active material layer was 10.0 cm×210.0 cm, and the size of the uncoated portion of the positive electrode, i.e., the portion of the positive electrode current collector, the surface of which was not coated with the positive electrode active material layer, was 2.0 cm×210.0 cm.), the negative electrode 1 was cut into a size of 12.1×220.0 cm (the size of the negative electrode active material layer is 10.1 cm×220.0 cm and the size of the uncoated portion of the negative electrode, i.e., the portion of the negative electrode current collector, the surface of which was not coated with the negative electrode active material layer, was 2.0 cm×210.0 cm), and an electrode wound body was fabricated by winding the cut positive electrode precursor and the negative electrode via a polyethylene separator (manufactured by ASAHI KAKSEI KABUSHIKI KAISHA, thickness: 10 μm).

The obtained electrode wound was connected with terminals, inserted into a metal square can consisting of aluminum, and sealed. The electrolytic solution 1 was injected from the opening of the square metal can, and then a detachable check valve was attached. The obtained element was placed in a dry box at a temperature of 40° C. and a dew point of −40° C. or lower, pressed at a pressure of 100 kPa, and charged with a constant current charge at a current of 500 mA until a voltage of 4.5 V was reached. Subsequently, initial charging was carried out by constant-voltage charging at 4.5 V continued for 10 hours to dope an alkali metal to the negative electrode. Thereafter, aging was carried out under the same conditions as in Example 1, degassing was carried out following removal of the aforementioned check valve, and the opening was sealed.

When evaluation was carried out in the same manner as in Example 1, it was found that $X_1$=55.1, $X_2$=13.5, $X_3$=31.4, $X_2/X_1$=0.25, $X_1/X_3$=1.75, $A_1$=55.1, $A_2$=13.5, $A_3$=31.4, $A_2/A_1$=0.25, $A_1/A_3$=1.75, micro short-circuit ratio was 0%, capacitance Q=901 mAh, internal resistance Ra=0.96 mΩ, internal resistance after the high-load charge/discharge cycle Rb=1.06 mΩ2, and Rb/Ra=1.10.

INDUSTRIAL APPLICABILITY

The nonaqueous lithium electric storage element of the present invention can be suitably used, for example, as an electric storage element for power assist of instantaneous peak power in a hybrid drive system of vehicles, etc.

The nonaqueous lithium electric storage element of the present invention is preferred since the advantageous effects of the present invention is maximized when applied as, for example, lithium ion capacitors or lithium ion secondary batteries.

The invention claimed is:

1. A positive electrode precursor having a current collector and a positive electrode active material layer disposed on the current collector, wherein
   the positive electrode active material layer comprises all of a carbon material, lithium transition metal oxide, and an alkali metal compound, a weight proportion $A_1$ of the carbon material in the positive electrode active material layer accounts for 50% by weight or greater and 65% by weight or less, a weight proportion $A_2$ of the lithium transition metal oxide in the positive electrode active material layer accounts for 10% by weight or greater and 30% by weight or less, a weight proportion $A_3$ of the alkali metal compound in the positive electrode active material layer accounts for 24.6% by weight or greater and 50% by weight or less,
   $A_2/A_1$ is 0.19 or greater and 1.10 or less, $A_1/A_3$ is 0.65 or greater and 2.88 or less, and the positive electrode active material layer has a peel strength of 0.02 N/cm or greater and 3.00 N/cm or less,
   the carbon material in the positive electrode active material layer is activated carbon material, and
   the alkali metal compound is at least one selected from the group consisting of lithium carbonate, sodium carbonate, and potassium carbonate.

2. The positive electrode precursor according to claim 1, wherein the expression $0.20 \leq B_1 \leq 10.00$ is satisfied, where a specific surface area per unit area measured by a BET method per one side of the positive electrode precursor is $B_1$ (m²/cm²).

3. The positive electrode precursor according to claim 1, wherein in oxygen mapping obtained by scanning electron microscope-energy dispersive X-ray spectroscopy (SEM-EDX) on a surface of the positive electrode precursor, the expressions $25.0 \leq C_1 \leq 76.0$ and $0.80 \leq C_1/A_3 \leq 2.40$ are satisfied, where an area of oxygen mapping binarized based on an average value of luminance values is $C_1$%.

4. The positive electrode precursor according to claim 1, wherein in oxygen mapping obtained by scanning electron microscope-energy dispersive X-ray spectroscopy (SEM-EDX) on a cross section of the positive electrode precursor processed by a broad ion beam (BIB), the expressions $25.0 \leq C_2 \leq 76.0$ and $0.80 \leq C_2/A_3 \leq 2.40$ are satisfied, where an area of oxygen mapping binarized based on an average value of luminance values is $C_2$%.

5. The positive electrode precursor according to claim 1, wherein the expressions $0.10 \leq D_1 \leq 5.00$ and $0.20 \leq E_1 \leq 10.00$ are satisfied, where a mesopore volume per unit area due to pores with a diameter of 20 Å or greater and 500 Å or less calculated by a BJH method per one side of the positive electrode precursor is $D_1$ (μL/cm$^2$), and a micropore volume per unit area due to pores with a diameter of less than 20 Å calculated by a MP method is $E_1$ (μL/cm$^2$).

6. The positive electrode precursor according to claim 1, wherein the lithium transition metal oxide is at least one compound selected from the group consisting of layered-based lithium transition metal oxide, spinel-based lithium transition metal oxide, and olivine-based lithium transition metal oxide.

7. The positive electrode precursor according to claim 1, wherein the lithium transition metal oxide is at least one selected from the group consisting of $Li_xNi_aCo_bAl_{(1-a-b)}O_2$, wherein, in the formula, a and b satisfy the expressions $0.2<a<0.97$ and $0.2<b<0.97$, $Li_xNi_cCo_dMn_{(1-c-d)}O_2$, wherein, in the formula, c and d satisfy the expressions $0.2<c<0.97$ and $0.2<d<0.97$, $Li_xCoO_2$, $Li_xMn_2O_4$, or $Li_xFePO_4$, wherein, in the formulae, x satisfies the expression $0 \le x \le 1$, $Li_xMnPO_4$, wherein, in the formula, x satisfies the expression $0 \le x \le 1$, and $Li_zV_2(PO_4)_3$, wherein, in the formula, z satisfies the expression $0 \le z \le 3$.

8. A positive electrode coating liquid comprising all solid contents containing a carbon material, lithium transition metal oxide, and an alkali metal compound in a dispersion solvent, wherein
a weight proportion $X_1$ of the carbon material accounts for 50.1% by weight or greater and 65% by weight or less, a weight proportion $X_2$ of the lithium transition metal oxide accounts for 10% by weight or greater and 30% by weight or less, a weight proportion $X_3$ of the alkali metal compound accounts for 24.6% by weight or greater and 50% by weight or less, with respect to a total solid content in the positive electrode coating liquid,
$X_2/X_1$ is 0.19 or greater and 1.10 or less, $X_1/X_3$ is 0.65 or greater and 2.88 or less, and $TI_2/TI_1$ is 0.50 or greater and 1.20 or less, where a thixotropy index value of the positive electrode coating liquid is $TI_1$ and a thixotropy index value after the electrode coating liquid has been allowed to stand for 24 hours following measurement of $TI_1$ is $TI_2$,
the carbon material in the positive electrode active material layer is activated carbon material, and
the alkali metal compound is at least one selected from the group consisting of lithium carbonate, sodium carbonate, and potassium carbonate.

9. The positive electrode coating liquid according to claim 8, wherein $\eta b_2/\eta b_1$ is 0.40 or greater and 1.30 or less, where a viscosity of the positive electrode coating liquid is $\eta b_1$ and a viscosity after the positive electrode coating liquid has been allowed to stand for 24 hours following measurement of $\eta b_1$ is $\eta b_2$.

10. A hybrid Lithium Ion Capacitor (LIC) and Lithium Ion Battery (LIB) system, comprising:
the positive electrode precursor according to claim 1,
a negative electrode,
a separator, and
a nonaqueous electrolytic solution containing lithium ions.

11. The system according to claim 10, wherein the positive electrode precursor operates as a positive electrode in both the Lithium Ion Capacitor and in the Lithium Ion Battery.

* * * * *